US012022334B2

(12) United States Patent
Kim et al.

(10) Patent No.: US 12,022,334 B2
(45) Date of Patent: Jun. 25, 2024

(54) METHOD AND DEVICE FOR ACCELERATING DATA PROCESSING OF DOUBLE CONNECTION IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Donggun Kim, Seoul (KR); Seungri Jin, Suwon-si (KR); Gert-Jan Van Lieshout, Apeldoorn (NL); Himke Van Der Velde, Zwolle (NL)

(73) Assignee: Samsung Electronics Co., Ltd., Suwon-si (KR)

(*) Notice: Subject to any disclaimer, the term of this patent is extended or adjusted under 35 U.S.C. 154(b) by 174 days.

(21) Appl. No.: 17/215,592

(22) Filed: Mar. 29, 2021

(65) Prior Publication Data

US 2021/0227431 A1 Jul. 22, 2021

Related U.S. Application Data

(63) Continuation of application No. 16/475,947, filed as application No. PCT/KR2018/000222 on Jan. 5, 2018, now Pat. No. 10,966,126.

(30) Foreign Application Priority Data

| Jan. 6, 2017 | (KR) | ......... 10-2017-0002416 |
| Mar. 14, 2017 | (KR) | ......... 10-2017-0031649 |
| Aug. 25, 2017 | (KR) | ......... 10-2017-0108094 |

(51) Int. Cl.
*H04W 4/70* (2018.01)
*H04W 36/00* (2009.01)
(Continued)

(52) U.S. Cl.
CPC ....... *H04W 36/0069* (2018.08); *H04W 36/08* (2013.01); *H04W 4/70* (2018.02); *H04W 84/042* (2013.01)

(58) Field of Classification Search
CPC . H04W 76/10; H04W 28/08; H04W 36/0069; H04W 36/08
See application file for complete search history.

(56) References Cited

U.S. PATENT DOCUMENTS

| 2010/0254321 A1 | 10/2010 | Kim et al. |
| 2015/0373599 A1 | 12/2015 | Kim et al. |

(Continued)

FOREIGN PATENT DOCUMENTS

| EP | 3288219 A1 * | 2/2018 | ............ H04W 48/18 |
| JP | 2016-039459 A | 3/2016 | |

(Continued)

OTHER PUBLICATIONS

Intel Corporation, "Mobility type support in NR", 3GPP Draft, R2-166875, 3rd Generation Partnership Project (3GPP), Mobile Competence Centre, 650, Route Des Lucioles, F-06921 Sophia-Antipolis Cedex, France, vol. RAN WG2, Kaohsiung, Oct. 10, 2016-Oct. 14, 2016, Oct. 9, 2016, XP051151315, Retrieved from the Internet: URL:http://www.3gpp.org/ftp/Meetings_3GPP_SYNC/RAN2/Docs/.

(Continued)

*Primary Examiner* — Syed Ali
(74) *Attorney, Agent, or Firm* — Jefferson IP Law, LLP

(57) ABSTRACT

Disclose are: a communication technique for merging, with IoT technology, a 5G communication system for supporting a data transmission rate higher than that of a 4G system; and a system therefor. The present disclosure can be applied to an intelligent service (for example, smart home, smart building, smart city, smart car or connected car, health care,
(Continued)

digital education, retail, security and safety-related services, and the like) on the basis of a 5G communication technology and an IoT-related technology. One embodiment of the present invention relates to a method and a device for accelerating data processing of a double connection in a next generation mobile communication system.

16 Claims, 53 Drawing Sheets

(51) Int. Cl.
*H04W 36/08* (2009.01)
*H04W 84/04* (2009.01)

(56) References Cited

U.S. PATENT DOCUMENTS

| | | |
|---|---|---|
| 2016/0143027 A1 | 5/2016 | Kim et al. |
| 2016/0234714 A1 | 8/2016 | Basu Mallick et al. |
| 2016/0338134 A1 | 11/2016 | Nagasaka et al. |
| 2017/0013668 A1 | 1/2017 | Chang et al. |
| 2017/0055187 A1 | 2/2017 | Kang et al. |
| 2017/0303170 A1 | 10/2017 | Uchino et al. |
| 2018/0176710 A1 | 6/2018 | Jang et al. |
| 2018/0199225 A1 | 7/2018 | Kim et al. |
| 2018/0199365 A1* | 7/2018 | Yi ............... H04W 28/0278 |
| 2018/0302834 A1 | 10/2018 | Zhang et al. |
| 2019/0037457 A1 | 1/2019 | Jang et al. |
| 2019/0166576 A1 | 5/2019 | Kim et al. |
| 2019/0313309 A1* | 10/2019 | Tsuboi ............ H04W 88/023 |
| 2020/0177497 A1* | 6/2020 | Xiao ............... H04W 76/15 |
| 2020/0305094 A1 | 9/2020 | Ouchi et al. |
| 2020/0382246 A1* | 12/2020 | Lee ................. H04W 80/02 |
| 2021/0112610 A1* | 4/2021 | Xiao ............... H04L 1/1614 |
| 2021/0144583 A1* | 5/2021 | Xiao ............... H04W 28/04 |
| 2021/0168654 A1* | 6/2021 | Futaki ............. H04L 69/18 |
| 2023/0037980 A1* | 2/2023 | Kim ................ H04W 72/0446 |
| 2023/0080714 A1* | 3/2023 | Pelletier ........... H04W 74/0833 370/254 |
| 2023/0239086 A1* | 7/2023 | Futaki ............. H04W 76/27 370/329 |

FOREIGN PATENT DOCUMENTS

| | | |
|---|---|---|
| KR | 10-2015-0086171 A | 7/2015 |
| KR | 10-2016-0128400 A | 11/2016 |
| KR | 10-2018-0014941 A | 2/2018 |
| WO | 2016/195735 A1 | 12/2016 |
| WO | 2017/003118 A1 | 1/2017 |

OTHER PUBLICATIONS

Huawei, "LTE-NR tight interworking CP procedure", 3GPP Draft, R3-162928, Tight IWK CP Procedures, 3rd Generation Partnership Project (3GPP), Mobile Competence Centre, 650, Route Des Lucioles, F-06921 Sophia-Antipolis Cedex, France, vol. RAN WG3, Reno, Nevada, USA, Nov. 14. 2016-Nov. 18, 2016, Nov. 14, 2016, XP051179028, Retrieved from the Internet: URL:http://www.3gpp.org/ftp/Meetings_3GPP_SYNC/RAN3/Docs/.
Extended European Search Report dated Sep. 26, 2019, issued in European Patent Application No. 18736449.2.
Korean Office Action dated Aug. 30, 2022, issued in a counterpart Korean Application No. 10-2021-0149963.
MediaTek Inc.; Field Description for UL Split Bearer IE; 3GPP TSG-RAN2 #92 Meeting; R2-156382; Nov. 6, 2015, Anaheim, CA, USA.
Korean Office Action dated Jan. 18, 2022, issued in a counterpart Korean Application No. 10-2021-0149963.
3GPP TS 36.323 V13.0.0; 3rd Generation Partnership Project; Technical Specification Group Radio Access Network; Evolved Universal Terrestrial Radio Access (E-UTRA); Packet Data Convergence Protocol (PDCP) specification, Jan. 8, 2016. (Release 13).
Fujitsu; Considerations on the segmentation function in NR; 3GPP TSG-RAN WG2 Meeting #96 R2-168231; Nov. 4, 2016, Reno, USA.
Ericsson; Supported bearer types for Dual Connectivity with NR; 3GPP TSG-RAN WG2 #95 Tdoc R2-165339; Aug. 12, 2016, Gothenburg, Sweden.
Ericsson, "PDCP data transfer procedure for uplink bearer split", 3GPP Draft, R2-152330, 3GPP TSG-RAN WG2 #90, May 15, 2015.
Extended European Search Report dated Oct. 11, 2023, issued in European Patent Application No. 23188676.3.

* cited by examiner

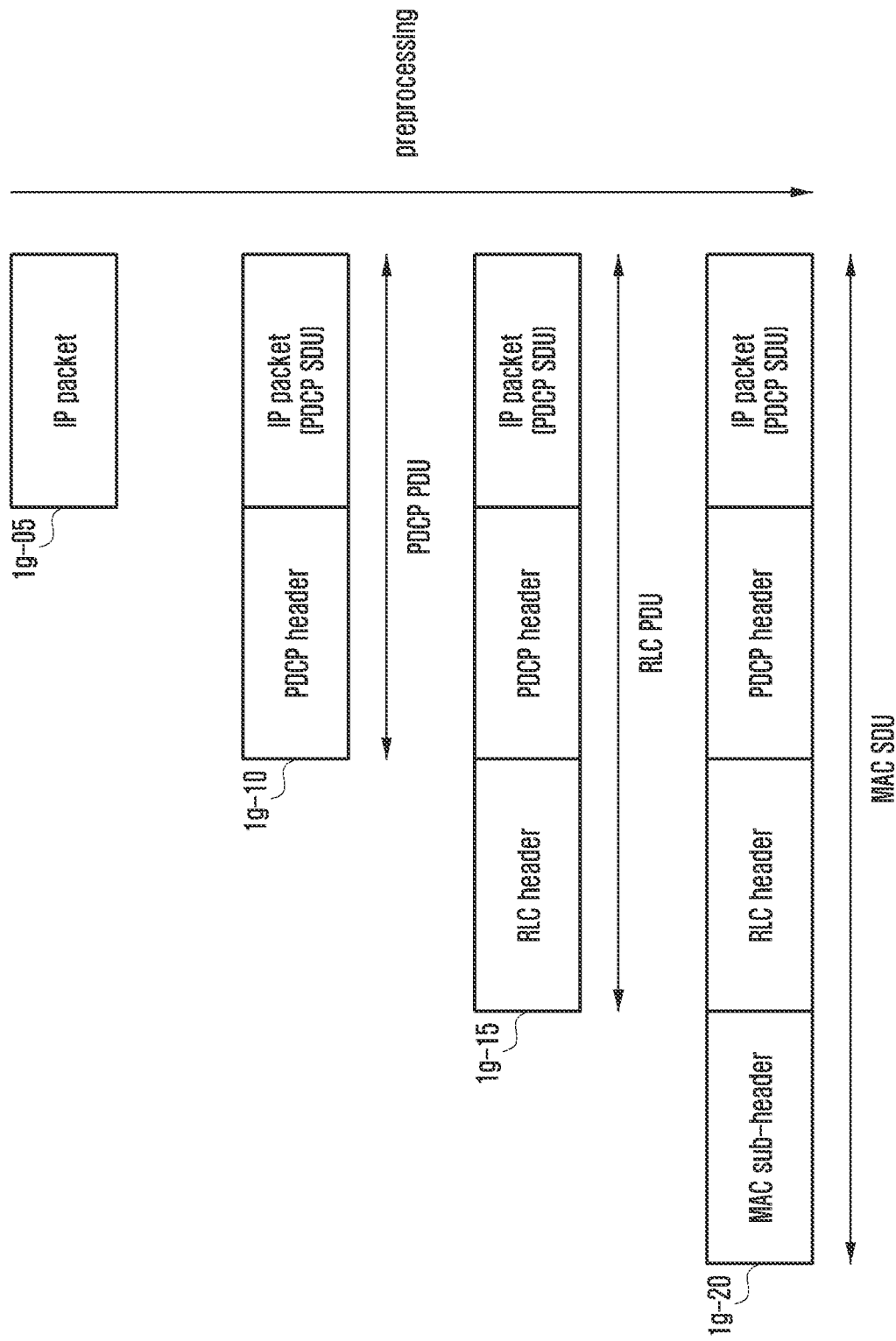

FIG. 1J
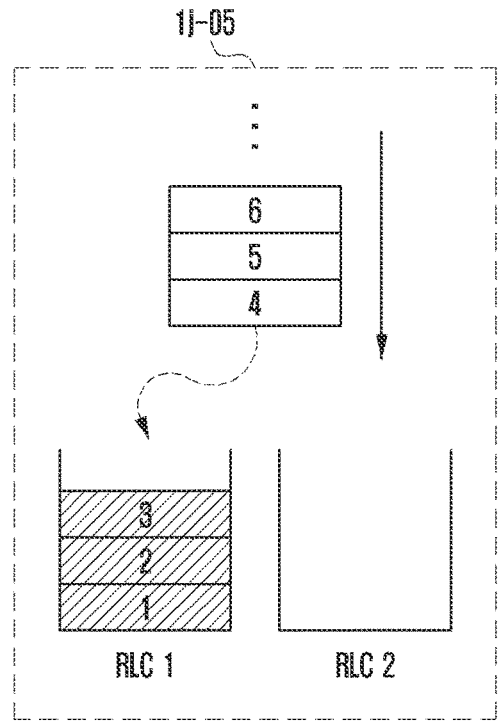
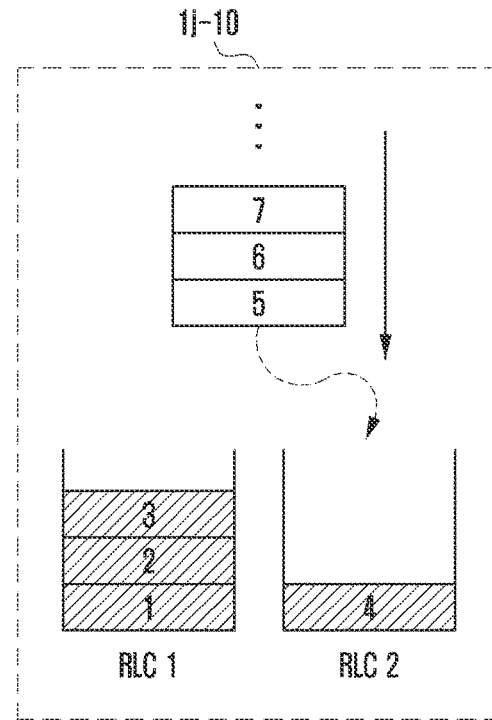
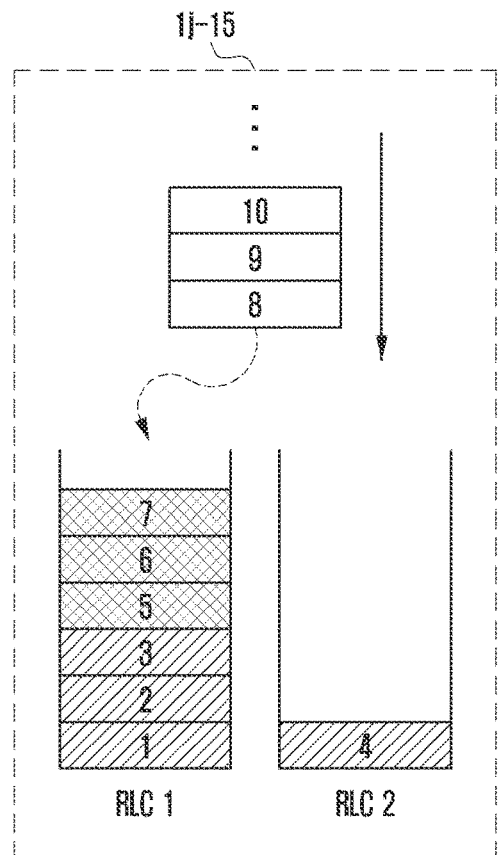
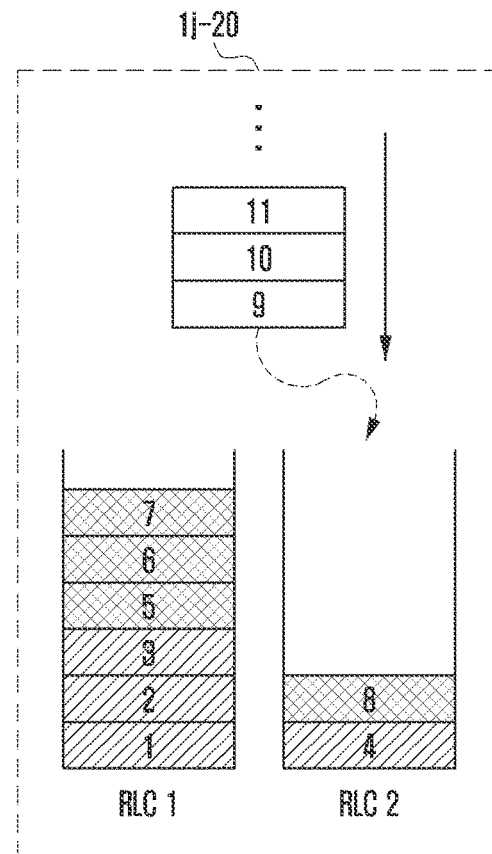

FIG. 1Q
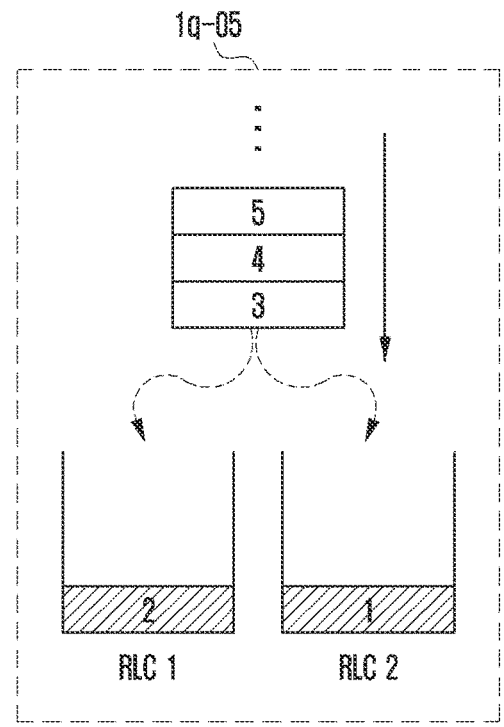
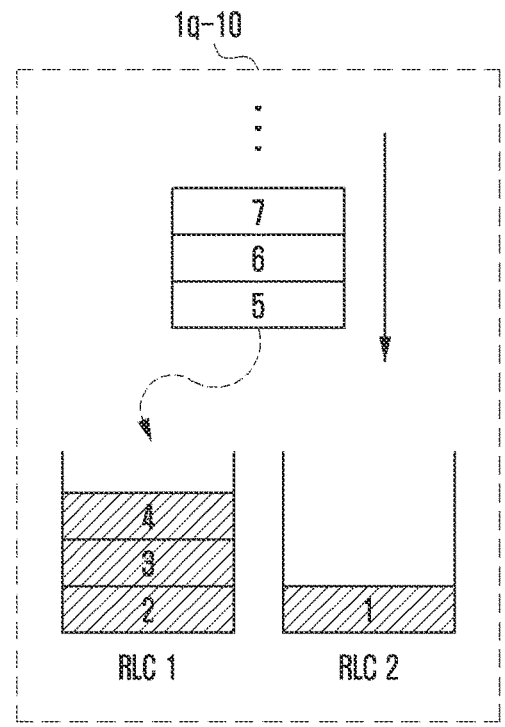
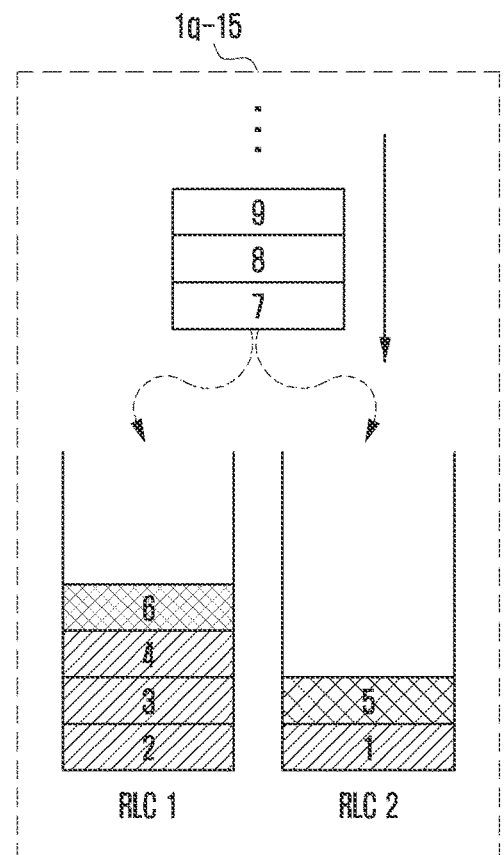
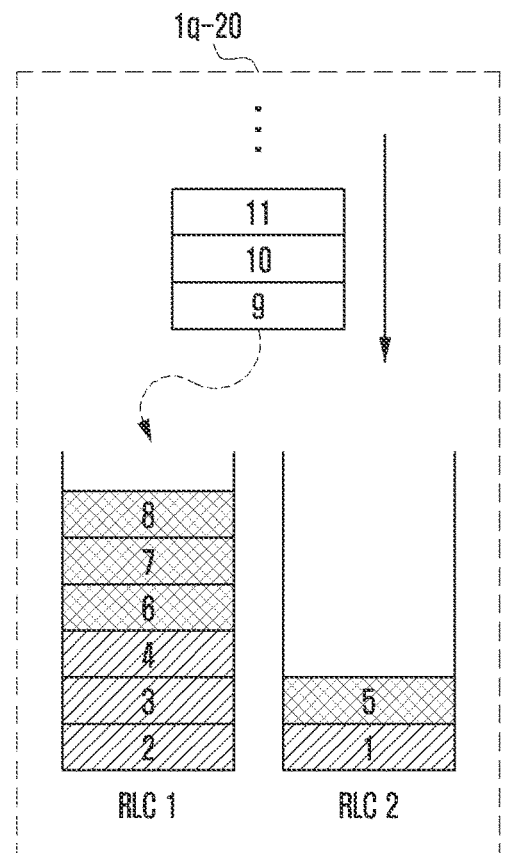

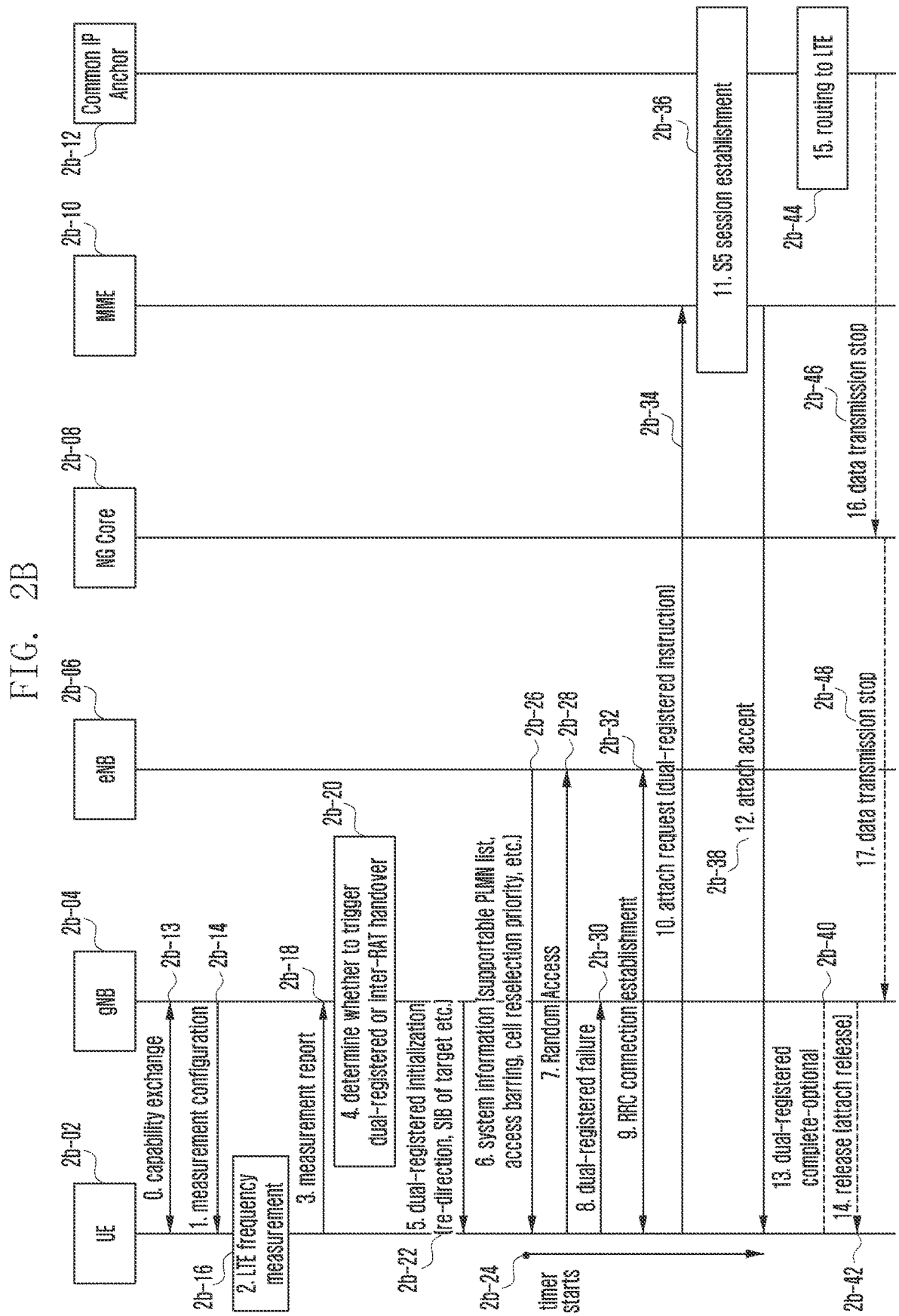

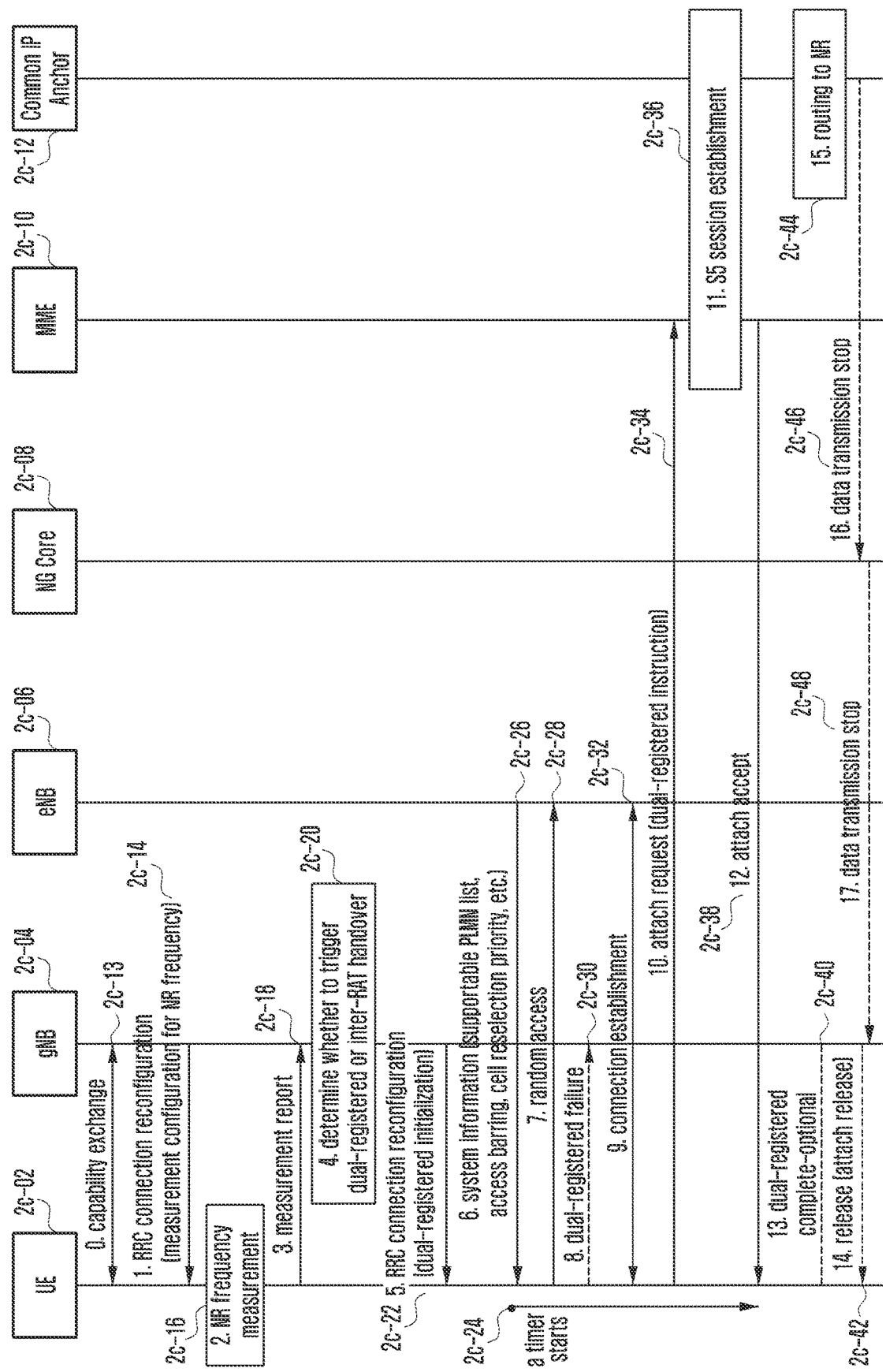

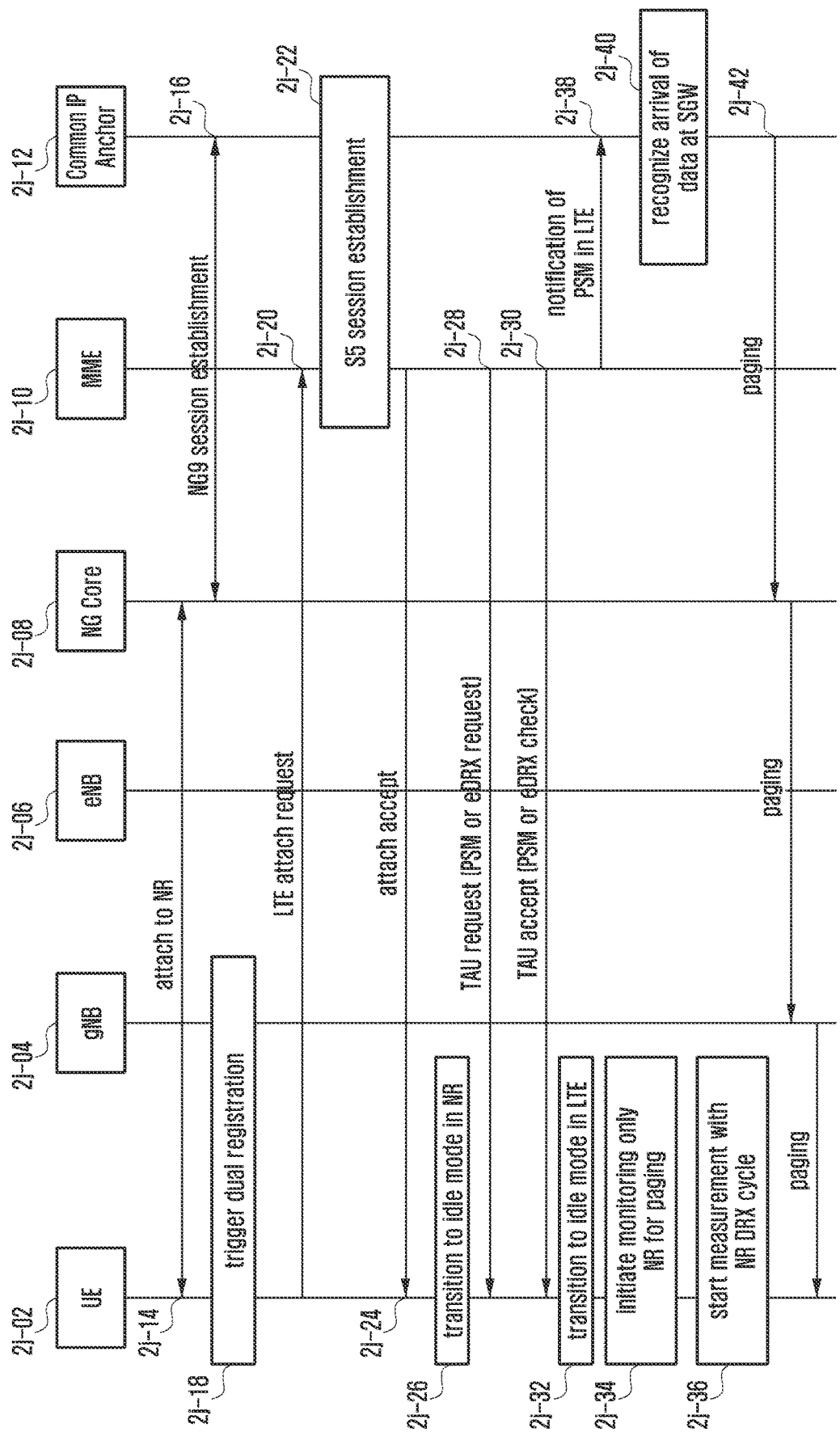

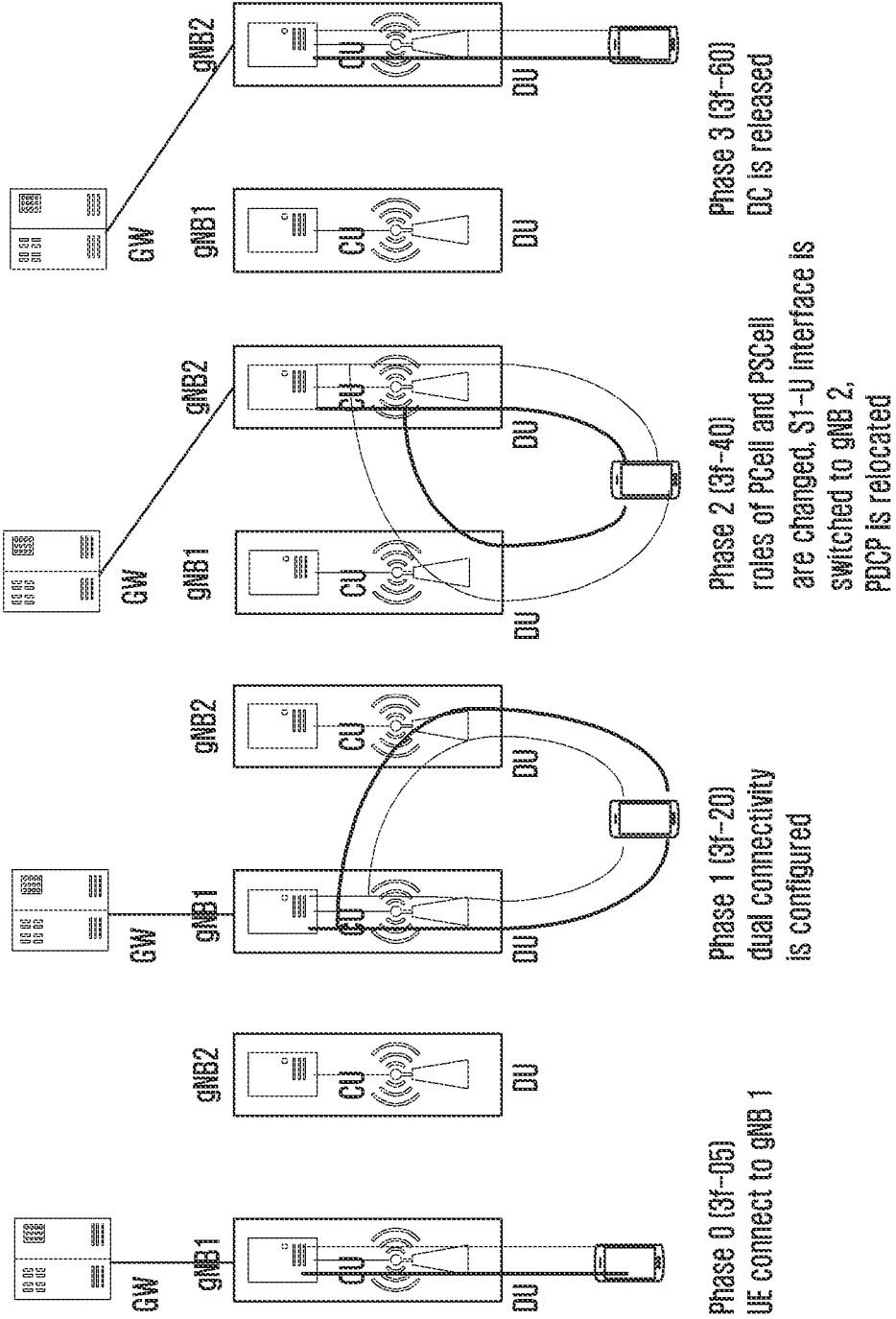

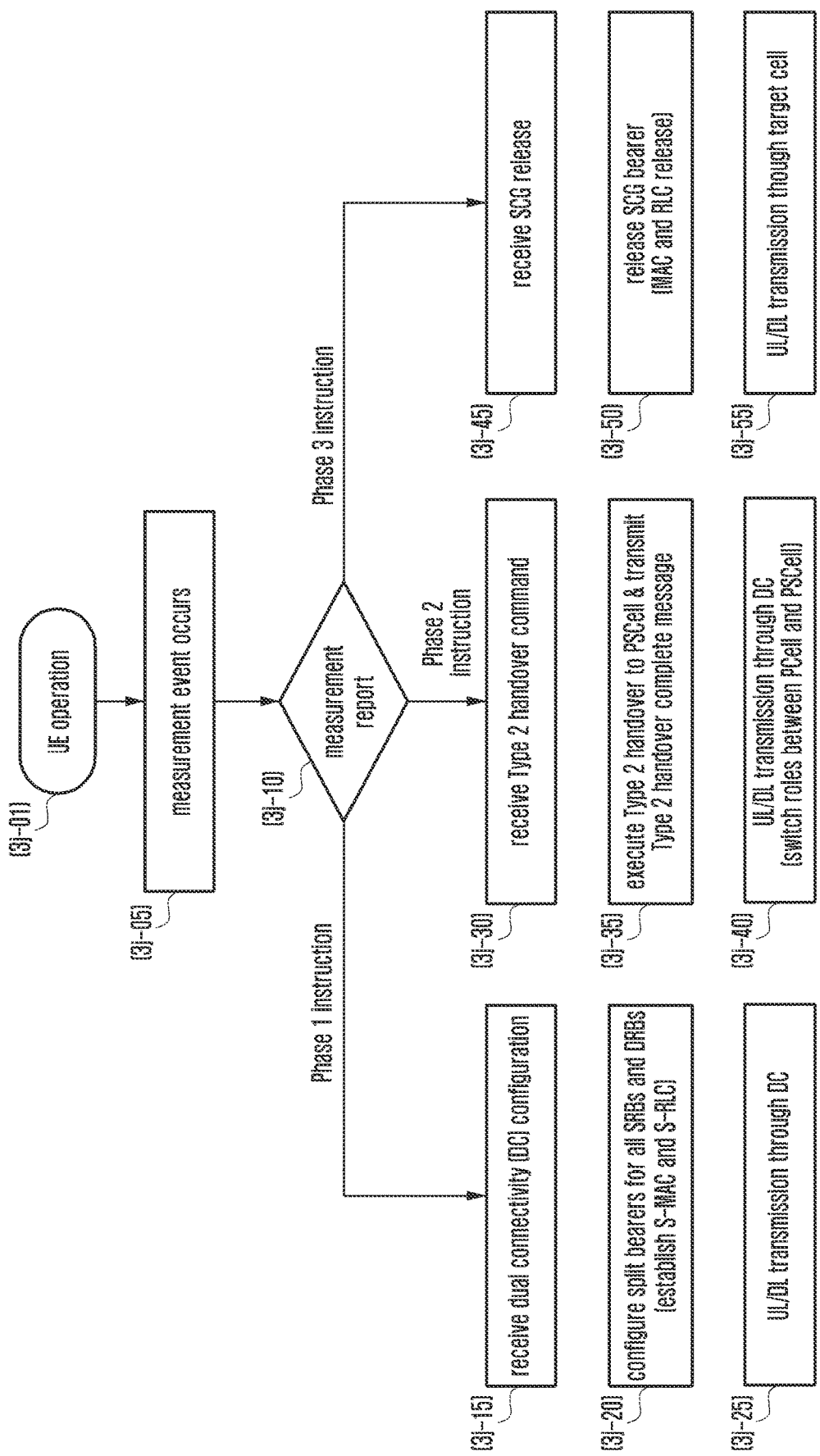

METHOD AND DEVICE FOR ACCELERATING DATA PROCESSING OF DOUBLE CONNECTION IN NEXT GENERATION MOBILE COMMUNICATION SYSTEM

CROSS-REFERENCE TO RELATED APPLICATION(S)

This application is a continuation application of prior application Ser. No. 16/475,947, filed on Jul. 3, 2019, which will be issued as U.S. Pat. No. 10,966,126 on Mar. 30, 2021; which is a U.S. National Stage application under 35 U.S.C. § 371 of an International application number PCT/KR2018/000222, filed on Jan. 5, 2018, which is based on and claimed priority of a Korean patent application number 10-2017-0002416, filed on Jan. 6, 2017, of a Korean patent application number 10-2017-0031649, filed on Mar. 14, 2017, and of a Korean patent application number 10-2017-0108094, filed on Aug. 25, 2017, filed in the Korean Intellectual Property Office, the disclosure of each of which is incorporated by reference herein in its entirety.

TECHNICAL FIELD

The disclosure relates to a method and apparatus for accelerating dual connectivity data processing in a next generation mobile communication system.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments underway for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth.

Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

DISCLOSURE OF INVENTION

Technical Problem

In a next generation mobile communication system, data may be pre-processed before being allocated transmission resources for data processing acceleration. However, it is difficult to pre-process data in the case of using a split bearer for dual connectivity. In the dual connectivity using a split bearer, data pre-processing may be performed after a packet data convergence protocol (PDCP) entity determines one of two radio link control (RLC) entities to which the data packets are to be sent.

That is, the PDCP entity does not send any data packets to either of the two associated RLC entities before transmission resources are allocated to respective connections in dual connectivity and this means that there is no data preprocessing.

Solution to Problem

According to an embodiment of the disclosure, a method of a first base station in a wireless communication system includes transmitting an addition request message to a second base station to request for adding the second base station based on a determination for handover of a terminal being served by the first base station, transmitting to the second base station a handover request message including information for switching from a Primary Cell (PCell) of the first base station to a Primary Secondary Cell (PSCell) and from the PSCell of the second base station to the PCell for the terminal based on a predetermined condition being satisfied, and releasing a connection between the first base station and the terminal based on receiving a release request message from the second base station.

According to an embodiment of the disclosure, a method of a terminal in a wireless communication system includes receiving, from a first base station to which the terminal is wirelessly connected, a radio resource control (RRC) reconfiguration message including configuration information related to a split bearer between the first base station and a second base station added by the first base station, receiving, from the first base station, a handover command message including information indicative of switching from a Primary Cell (PCell) of the first base station to a Primary Secondary Cell (PSCell) and from the PSCell of the second base station to the PCell, and releasing a wireless connection to the first base station.

According to an embodiment of the disclosure, a first base station in a wireless communication system includes a transceiver configured to transmit an addition request message to a second base station to request for adding the second base station based on a determination for handover of a terminal being served by the first base station and a controller configured to control the transceiver to transmit, to the second base station, a handover request message including information for switching from a Primary Cell (PCell) of the first base station to a Primary Secondary Cell (PSCell) and from the PSCell of the second base station to the PCell for the terminal based on a predetermined condition being satisfied and release a connection between the first base station and the terminal based on receiving a release request message from the second base station.

According to an embodiment of the disclosure, a terminal in a wireless communication system includes a transceiver configured to receive, from a first base station to which the terminal is wirelessly connected, a radio resource control (RRC) reconfiguration message including configuration information related to a split bearer between the first base station and a second base station added by the first base station and a controller configured to control the transceiver to receive, from the first base station, a handover command message including information indicative of switching from a Primary Cell (PCell) of the first base station to a Primary Secondary Cell (PSCell) and from the PSCell of the second base station to the PCell and release a wireless connection to the first base station.

Advantageous Effects of Invention

According to an embodiment, the disclosure is advantageous in terms of minimizing a data communication cut-off state occurring during a handover.

According to another embodiment, the disclosure is advantageous in terms of protecting against erroneous operations of a terminal by restricting a validity of configuration information received from a base station only to the corresponding base station and, when the terminal moves to a new base station, allowing the new base station to have all necessary configuration information.

BRIEF DESCRIPTION OF DRAWINGS

FIG. 1G is a diagram illustrating a method for preprocessing data according to an embodiment of the disclosure;

FIG. 1J shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-1 of the disclosure;

FIG. 1O is a diagram illustrating operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-6 of the disclosure;

FIG. 1Q is a diagram illustrating operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-8 of the disclosure;

FIG. 2B is a signal flow diagram illustrating signal flows in a case where a UE moves from a service area of a next generation mobile communication system to a service area of a legacy stem system according to an embodiment of the disclosure;

FIG. 2C is a signal flow diagram illustrating signal flows in a case where a UE moves from a service area of a next generation mobile communication system to a service area of a legacy LTE system according to an embodiment of the disclosure;

FIG. 2J is a signal flow diagram for explaining a second solution according to an embodiment of the disclosure;

FIG. 2O is a block diagram illustrating a configuration of a UE according to an embodiment of the disclosure;

FIG. 3J is a flowchart illustrating a DC- and RLC split bearer-based Type 2 handover procedure of a UE according to an embodiment of the disclosure;

MODE FOR THE INVENTION

The operation principle of the disclosure is described in detail with reference to the accompanying drawings. Detailed descriptions of well-known functions and structures incorporated herein may be omitted to avoid obscuring the subject matter of the disclosure. Further, the following terms are defined in consideration of the functionality in the disclosure, and they may vary according to the intention of a user or an operator, usage, etc. Therefore, the definition should be made on the basis of the overall content of the present specification.

Detailed descriptions of well-known functions and structures incorporated herein may be omitted to avoid obscuring the subject matter of the disclosure. Exemplary embodiments of the disclosure are described hereinafter in detail with reference to the accompanying drawings.

The terms used, in the following description, for indicating access nodes, network entities, messages, interfaces between network entities, and diverse identity informations are provided for convenience of explanation. Accordingly, the terms used in the following description are not limited to specific meanings, and they may be replaced by other terms equivalent in technical meaning.

In the following description, the terms and definitions given in the $3^{rd}$ Generation Partnership Project Long Term Evolution (3GPP LTE) standard are used. However, the disclosure is not limited by the terms and definitions, and it can be applied to other standard communication systems.

First Embodiment

Figure 1A:
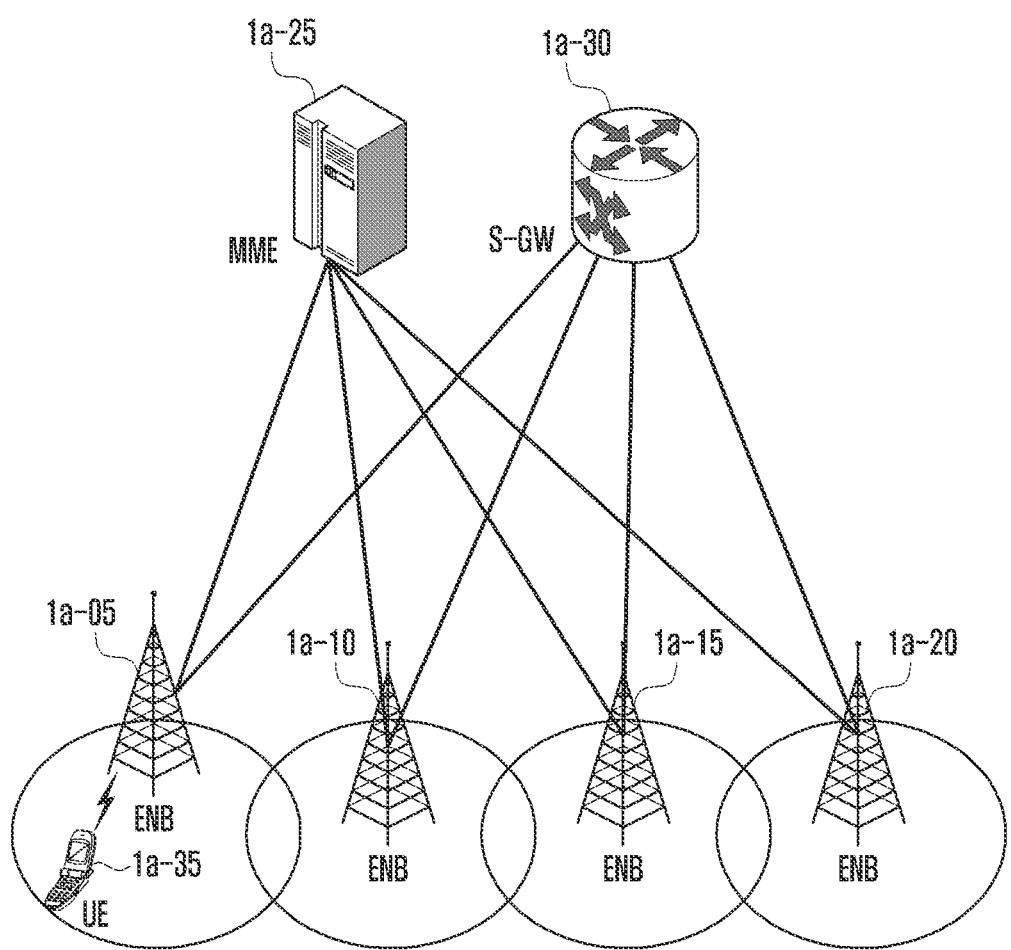
FIG. 1A is a diagram illustrating an architecture of an LTE system.

FIG. 1A is a diagram illustrating architecture of an LTE system.

In reference to FIG. 1A, the radio communication system includes evolved Node Bs (eNBs) 1a-05, 1a-10, 1a-15, and 1a-20; a Mobility Management Entity (MME) 1a-25; and a Serving Gateway (S-GW) 1a-30. The User Equipment (UE or terminal) 1a-35 connects to an external network via the eNBs 1a-05, 1a-10, 1a-15, and 1a-20 and the S-GW 1a-30.

In FIG. 1A, the eNBs 1a-05, 1a-10, 1a-15, and 1a-20 correspond to legacy node Bs of UMTS. The UE 135 connects to one of the eNBs via a radio channel, and the eNB has more complex functions than the legacy node B. In the LTE system where all user traffic including real time services such as Voice over IP (VoIP) is served through shared channels, there is a need of an entity for collecting UE-specific status information (such as buffer status, power headroom status, and channel status) and scheduling the UEs based on the collected information, and the eNBs 1a-05, 1a-10, 1a-15, and 1a-20 take charge of such functions. Typically, one eNB hosts multiple cells. For example, the LTE system adopts Orthogonal Frequency Division Multiplexing (OFDM) as a radio access technology to secure a data rate of up to 100 Mbps in a bandwidth of 20 MHz.

The LTE system also adopts Adaptive Modulation and Coding (AMC) to determine the modulation scheme and channel coding rate in adaptation to the channel condition of the UE. The S-GW 1a-30 handles data bearer functions to establish and release data bearer under the control of the MME 1a-25. The MME 1a-25 handles various control functions for the UE as well as the mobile management function and has connections with the eNBs.

Figure 1B:
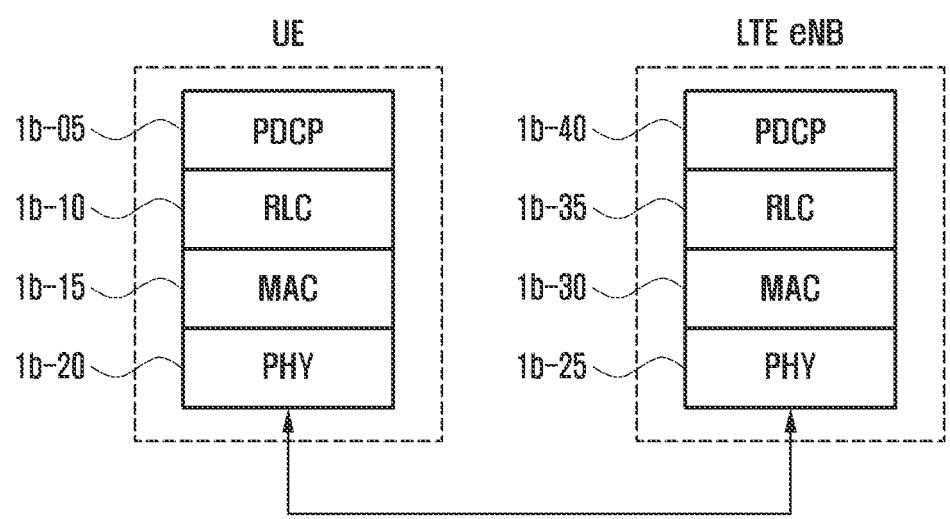
FIG. 1B is a diagram illustrating a protocol stack in an LTE system.

FIG. 1B is a diagram illustrating a protocol stack in an LTE system.

In reference to FIG. 1B, the protocol stack of the interface between the UE and the eNB in the LTE system includes a packet data convergence control (PDCP) layer denoted by reference numbers 1b-05 and 1b-40, radio link control (RLC) layer denoted by reference numbers 1b-10 and 1b-35, and a medium access control (MAC) layer denoted by reference numbers 1b-15 and 1b-30. The PDCP layer denoted by reference numbers 1b-05 and 1b-40 takes charge of compressing/decompressing an IP header. The main functions of the PDCP layer can be summarized as follows.

Header compression and decompression: ROHC only
Transfer of user data
In-sequence delivery of upper layer PDUs at PDCP re-establishment procedure for RLC AM
Reordering for split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The RLC layer designated by reference number 1b-10 and 1b-35 takes charge of reformatting PDCP PDUs in order to fit them into a size for ARQ operation. The main functions of the RLC layer can be summarized as follows.

Transfer of upper layer PDUs
Error Correction through ARQ (only for AM data transfer)
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer denoted by reference numbers 1b-15 and 1b-30 allows for connection of multiple RLC entities established for one UE and takes charge of multiplexing RLC PDUs from the RLC layer into a MAC PDU and demultiplexing a MAC PDU into RLC PDUs. The main functions of the MAC layer can be summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The physical layer denoted by reference numbers 1b-20 and 1b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 1C:
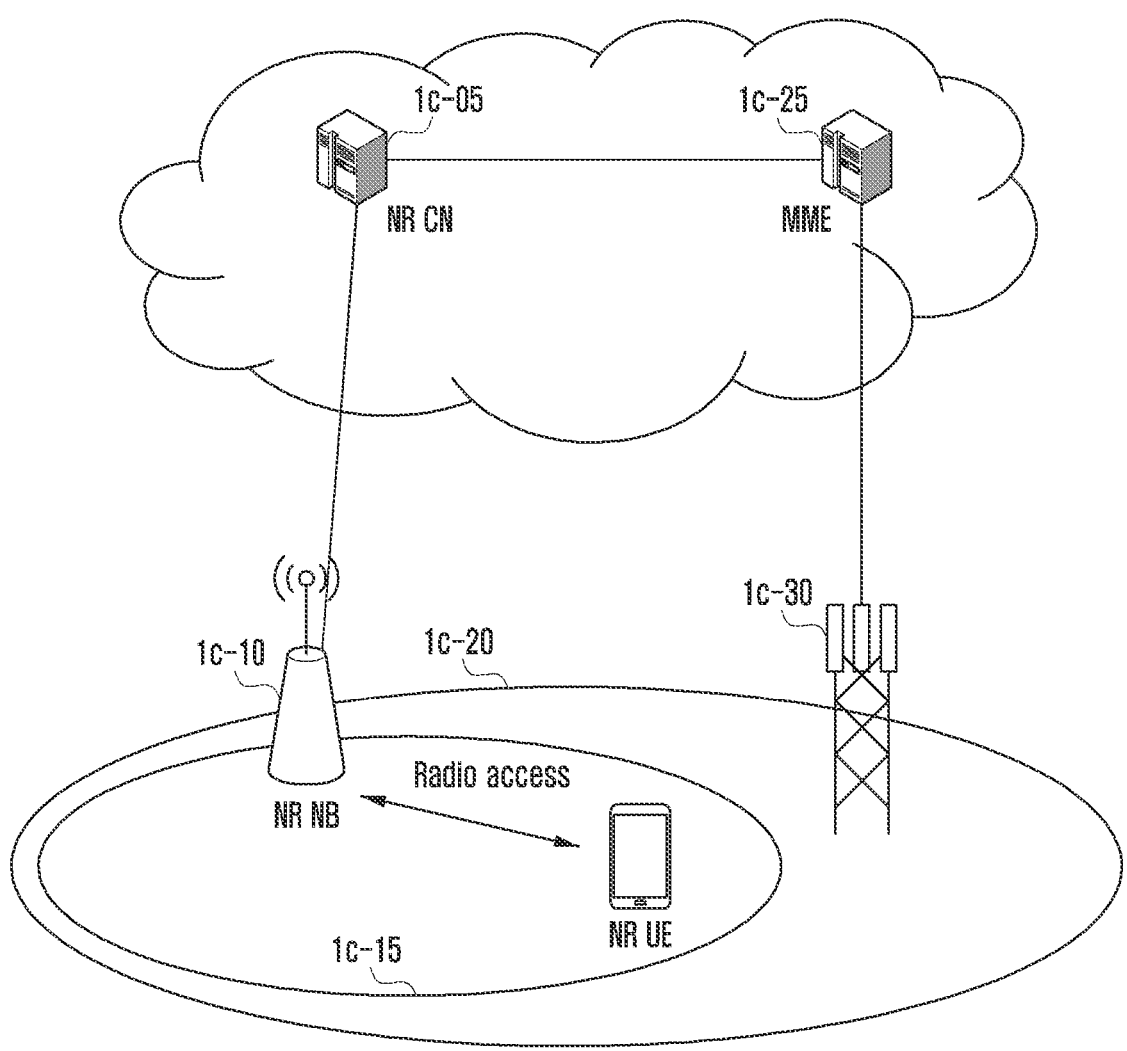
FIG. 1C is a diagram illustrating a next generation mobile communication system architecture proposed in the disclosure.

FIG. 1C is a diagram illustrating a next generation mobile communication system architecture proposed in the disclosure.

As shown in FIG. 1C, the next generation mobile communication system includes a radio access network with a next generation base station (New Radio Node B (NR gNB) or NR base station) 1c-10 and a new radio core network (NR CN) 1c-05. A new radio user equipment (NR UE or NR terminal) 1c-15 connects to an external network via the NR gNB 1c-10 and the NR CN 1c-05.

In FIG. 1C, the NR gNB 1c-10 corresponds to an evolved Node B (eNB) of the legacy LTE. The NR gNB 1c-10 to which the NR UE 1c-15 connects through a radio channel is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR gNB 1c-10 takes charge of this function.

Typically, one NR gNB operates multiple cells. In order to achieve a data rate higher than the peak data rate of legacy LTE systems, the next generation mobile communication system may adopt a beamforming technique along with orthogonal frequency division multiplexing (OFDM) as a radio access technology.

The next generation mobile communication system may also adopt adaptive modulation and coding (AMC) to determine the modulation scheme and channel coding rate in adaptation to the channel condition of the NR UE. The NR CN 1c-05 takes charge of mobility support, bearer setup, and QoS configuration. The NR CN 1c-05 may take charge of an NR UE mobility management function, and a plurality of NR gNBs may connect to the NR CN 1c-05. The next generation mobile communication system may also interoperate with a legacy LTE system and, in this case, the NR CN 1c-05 connects to an MME 1c-25 through a network interface. The MME 1c-25 communicates with at least one eNB 1c-30 as a legacy base station.

Figure 1D:
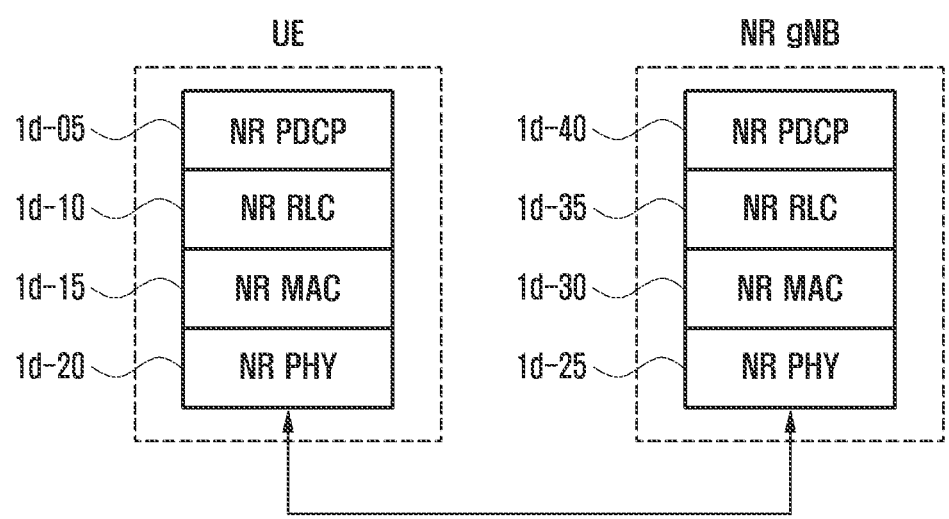
FIG. 1D is a diagram illustrating a protocol stack in a next generation mobile communication system proposed in the disclosure.

FIG. 1D is a diagram illustrating a protocol stack in a next generation mobile communication system proposed in the disclosure.

In reference to FIG. 1D, the protocol stack of the interface between an NR UE and an NR gNB in a next generation mobile communication system includes a NR PDCP layer denoted by reference numbers 1d-05 and 1d-40, an NR RLC layer denoted by reference numbers 1d-10 and 1d-35, and an NR MAC layer denoted by reference numbers 1d-15 and 1*d*-30. The main functions of the NR PDCP layer denoted by reference numbers 1*d*-05 and 1*d*-40 may include some of the following functions.

Header compression and decompression: ROHC only
    Transfer of user data
    In-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink.

The PDCP PDU reordering function of an NR PDCP entity is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC layer denoted by reference numbers 1*d*-10 and 1*d*-35 may include some of the following functions.

Transfer of upper layer PDUs
    In-sequence delivery of upper layer PDUs
    Out-of-sequence delivery of upper layer PDUs
    Error Correction through ARQ
    Concatenation, segmentation, and reassembly of RLC SDUs
    Re-segmentation of RLC data PDUs
    Reordering of RLC data PDUs
    Duplicate detection
    Protocol error detection
    RLC SDU discard
    RLC re-establishment The in-sequence delivery function of an NR RLC entity is to deliver the RLC SDUs received from the lower layer to the upper layer and may include reassembling, when multiple segmented RLC SDUs constituting an original RLC SDU are received, the RLC SDUs and delivering the reassembled RLC SDU to the upper layer; reordering the received RLC PDUs based on the RLC sequence number (SN) or PDCP SN; recording the missing RLC PDUs among the reordered RLC PDUs; transmitting a status report indicating the missing RLC PDUs to the sender; requesting for retransmission of the missing RLC PDUs; and delivering, when there is a missing RLC PDU, the RLC PDUs before the missing RLC PDU in sequence, delivering, if a predetermined timer expires even when there is a missing RLC SDU, all RLC SDUs received before the start of the timer to the upper layer in sequence, or delivering, if a predetermined timer expires even when there is a missing RLC SDU, all RLC SDUs received until then to the upper layer in sequence. It may also be possible to process the RLC PDUs in the receiving sequence (in the order of arrival regardless of sequence number) and deliver the RLC PDUs to the PDCP entity out of order (out-of-sequence delivery) and, if an RLC PDU is transmitted in the form of segments, to store the received segments, or wait until all segments constituting the RLC PDU are received and reassemble the segments into the original RLC PDU, which is delivered to the PDCP entity.

The NR RLC layer may have no concatenation function and, in this case, the concatenation function may be performed in the NR MAC layer or replaced by the multiplexing function of the NR MAC layer.

The out-of-sequence delivery function of an NR RLC entity is to deliver the RLC SDUs received from the lower layer to the upper layer out of order and may include reassembling, when multiple segmented RLC SDUs constituting an original RLC SDU are received, the segmented RLC SDUs, delivering the reassembled RLC SDUs to the upper layer, arranging the received RLC PDUs based on the RLC SN or PDCP SN, and recording the SN of the missing RLC PDUs.

In the NR MAC layer denoted by reference numbers 1*d*-15 and 1*d*-30, an NR MAC entity may be connected to multiple NR RLC entities, and the main functions of the NR MAC entity may include some of the following functions.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding The NR PHY layer denoted by reference numbers 1*d*-20 and 1*d*-25 takes charge of channel-coding and modulation on upper layer data to generate and transmit OFDM symbols over a radio channel and demodulating and channel-decoding on OFDM symbols received over the radio channel to deliver the decoded data to the upper layers.

Figure 1E:
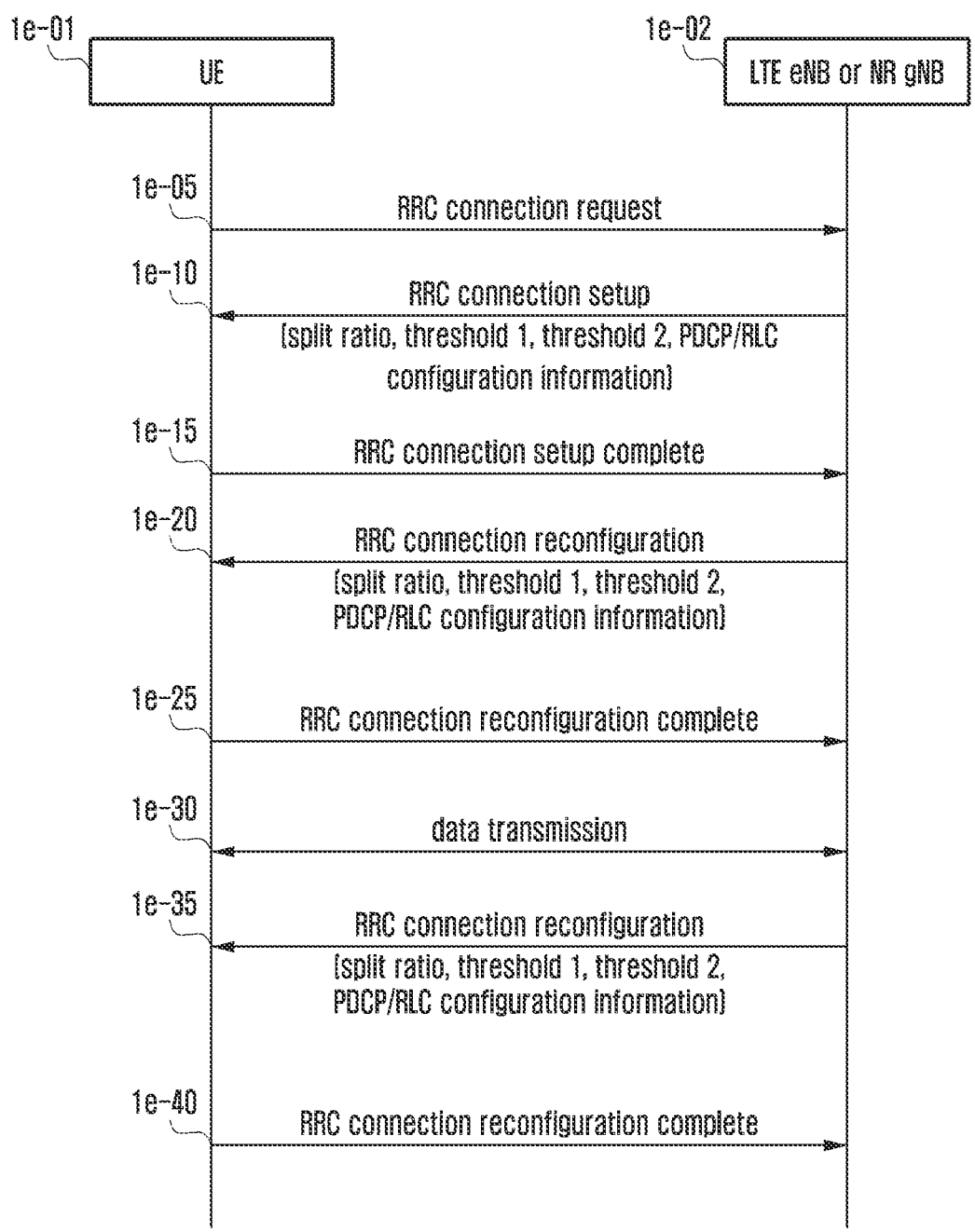
FIG. 1E is a signal flow diagram illustrating a procedure for configuring layer-specific entities at a UE in a next generation mobile communication system according to an embodiment of the disclosure.

FIG. 1E is a signal flow diagram illustrating a procedure for configuring layer-specific entities at a UE in a next generation mobile communication system according to an embodiment of the disclosure.

FIG. 1E shows a procedure for a UE to establish a connection with a network for data communication and configure layer-specific entities according to an embodiment of the disclosure.

If data to be transmitted is generated at the UE 1*d*-01 in an idle mode (hereinafter, referred to as idle mode UE), the UE may initiate a radio resource control (RRC) connection establishment procedure with an LTE eNB or NR gNB 1*d*-02. The UE acquires uplink synchronization with the eNB or gNB through a random access procedure and transmits an RRC Connection Request (RRCConnectionRequest) message to the eNB gNB at step 1*d*-05. This message includes an identifier of the UE and a reason for establishing the connection.

The eNB or gNB transmits an RRC connection setup (RRCConnectionSetup) message to the UE at step 1*d*-10. This message may include RRC connection configuration information and layer-specific configuration information. That is, this message may include PHY or NR PHY entity configuration information, MAC or NR MAC entity configuration information, RLC or NR RLC entity configuration information, PDCP or NR PDCP entity configuration information, and information for configuring specific functions among the functions supported by the layer-specific entities (layer-specific functions described with reference to FIG. 1B or FIG. 1D). This message may also include a predetermined bearer split ratio value to be applied at the PDCP entity or information on whether to configure RLC entities, threshold 1, or threshold 2.

The RRC connection is also referred to as a signaling radio bearer (SRB) and used for communicating RRC messages as control messages being exchanged between the UE and the eNB or gNB. After establishing the RRC connection, the UE transmits an RRC Connection Setup Complete (RRCConnectionSetupComplete) message to the eNB or gNB at step 1*d*-15.

The eNB or gNB transmits an RRC Connection Reconfiguration (RRCConnectionReconfiguration) message to the UE at step 1d-20 for setting up a data radio bearer (DRB). This message may include layer-specific configuration information. That is, this message may include PHY or NR PHY entity configuration information, MAC or NR MAC entity configuration information, RLC or NR RLC entity configuration information, PDCP or NR PDCP entity configuration information, and information for configuring specific functions among the functions supported by the layer-specific entities (layer-specific functions described with reference to FIG. 1B or FIG. 1D). This message may also include a predetermined bearer split ratio value to be applied at the PDCP entity or information on whether to configure RLC entities, threshold 1, or threshold 2.

This message may also include configuration information on DRB for processing user data, and the UE establishes a DRB and configures layer-specific functions based on the above information and transmits an RRC Connection Reconfiguration Complete (RRCConnectionReconfigurationComplete) message to the eNB or gNB at step 1d-25.

Once the above procedure is completed, the UE and the eNB or gNB communicate data at step 1d-30. If necessary, the eNB or gNB may transmit the RRCConnectionReconfiguration message to the UE at step 1d-35, during the data communication, for reconfiguring the layer-specific configurations of the UE. That is, this message may include PHY or NR PHY entity configuration information, MAC or NR MAC entity configuration information, RLC or NR RLC entity configuration information, PDCP or NR PDCP entity configuration information, and information for configuring specific functions among the functions supported by the layer-specific entities (layer-specific functions described with reference to FIG. 1B or FIG. 1D).

This message may also include a predetermined bearer split ratio value to be applied at the PDCP entity or information on whether to configure RLC entities, threshold 1, or threshold 2. This message may also include configuration information on interworking between the LTE eNB (or NR gNB) and an NR gNB). The configuration information on interworking between the LTE eNB and the NR gNB may include information indicating type 3C or type 1A and layer-specific entity information per type.

Once the layer-specific entity configuration is completed based on the above message, the UE transmits an RRCConnectionReconfigurationComplete message to the eNB or gNB at step 1d-40.

Figure 1F:
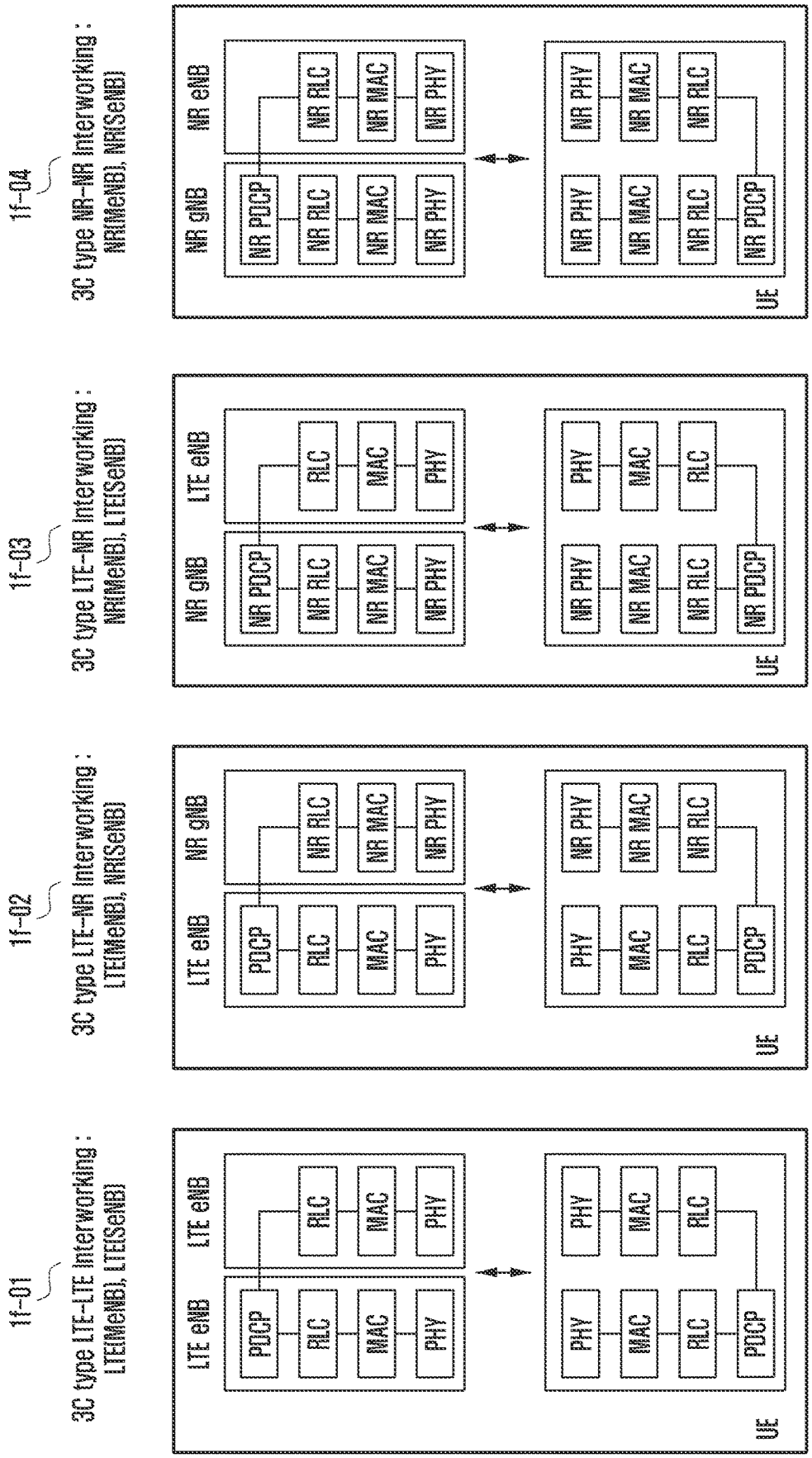
FIG. 1F is a diagram for explaining scenarios for a UE to receive a service via an LTE eNB or an NR gNB in a next generation mobile communication system according to an embodiment of the disclosure.

FIG. 1F is a diagram for explaining scenarios for a UE to receive a service via an LTE eNB or an NR gNB in a next generation mobile communication system according to an embodiment of the disclosure.

In FIG. 1F, reference number 1f-01 denotes a scenario of type 3C interworking between two LTE eNBs of which one is associated with a master cell group (MCG) and the other is associated with a secondary cell group (SCG), reference number 1f-02 denotes a scenario of type 3C interworking between an LTE eNB associated with an MCG and an NR gNB associated with an SCG, reference number 1f-03 denotes a scenario of type 3C interworking between an LTE eNB associated with an SCG and an NR gNB associated with an MCG, and reference number 1f-04 denotes a scenario of type 3C interworking between two NR gNBs of which one is associated with an MCG and the other is associated with an SCG.

FIG. 1G is a diagram illustrating a method for preprocessing data according to an embodiment of the disclosure.

In the scenarios as denoted by reference numbers 1f-01, 1f-02, 1f-03, and 1f-04 in FIG. 1F, a data packet 1f-05 from a higher layer in a user plane may be preprocessed at an NR gNB or a UE of the next generation mobile communication system. Preprocessing the data means preprocessing an IP packet to generate a PDCP PDU 1f-10 of the PDCP layer, an RLC PDU 1f-15 of the RLC layer, or a MAC SDU 1f-20 of the MAC layer along with a MAC sub-header.

Figure 1H:
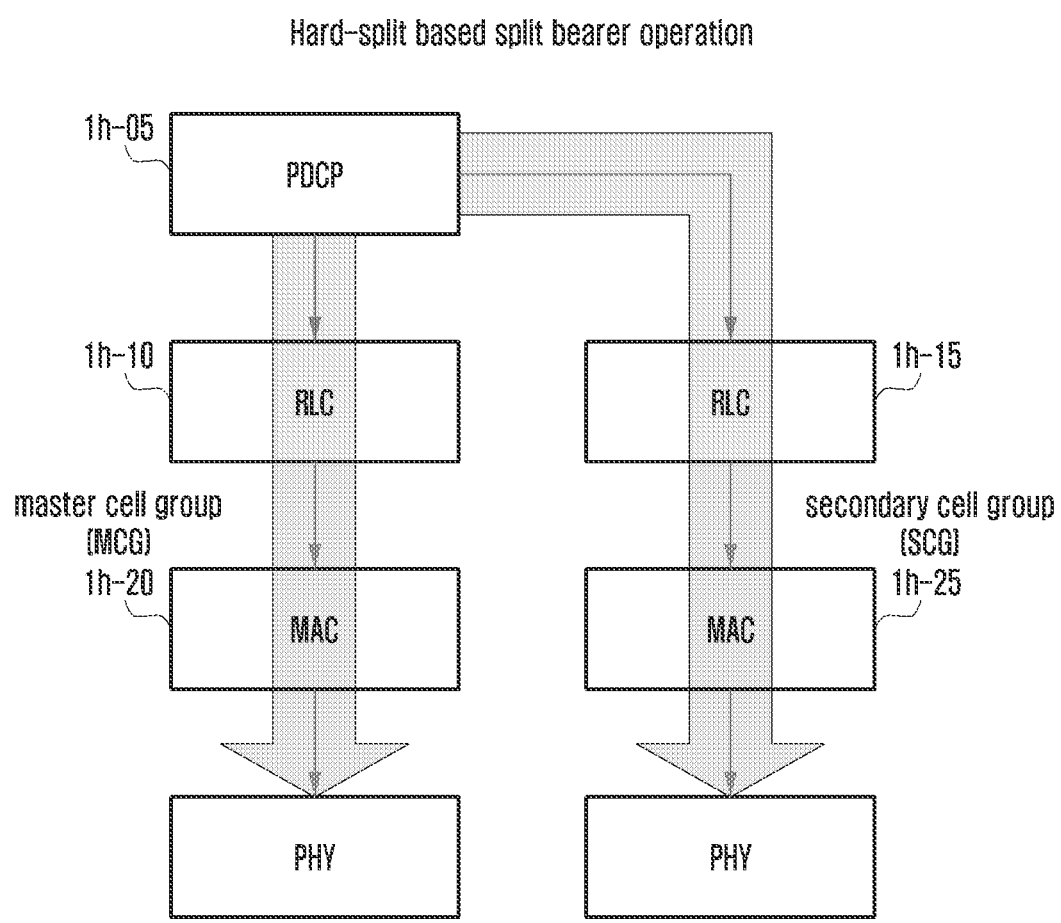
FIG. 1H is a diagram for explaining a data preprocessing method in a dual connectivity split bearer environment in a next generation mobile communication system according to an embodiment of the disclosure.
Figure 11A:
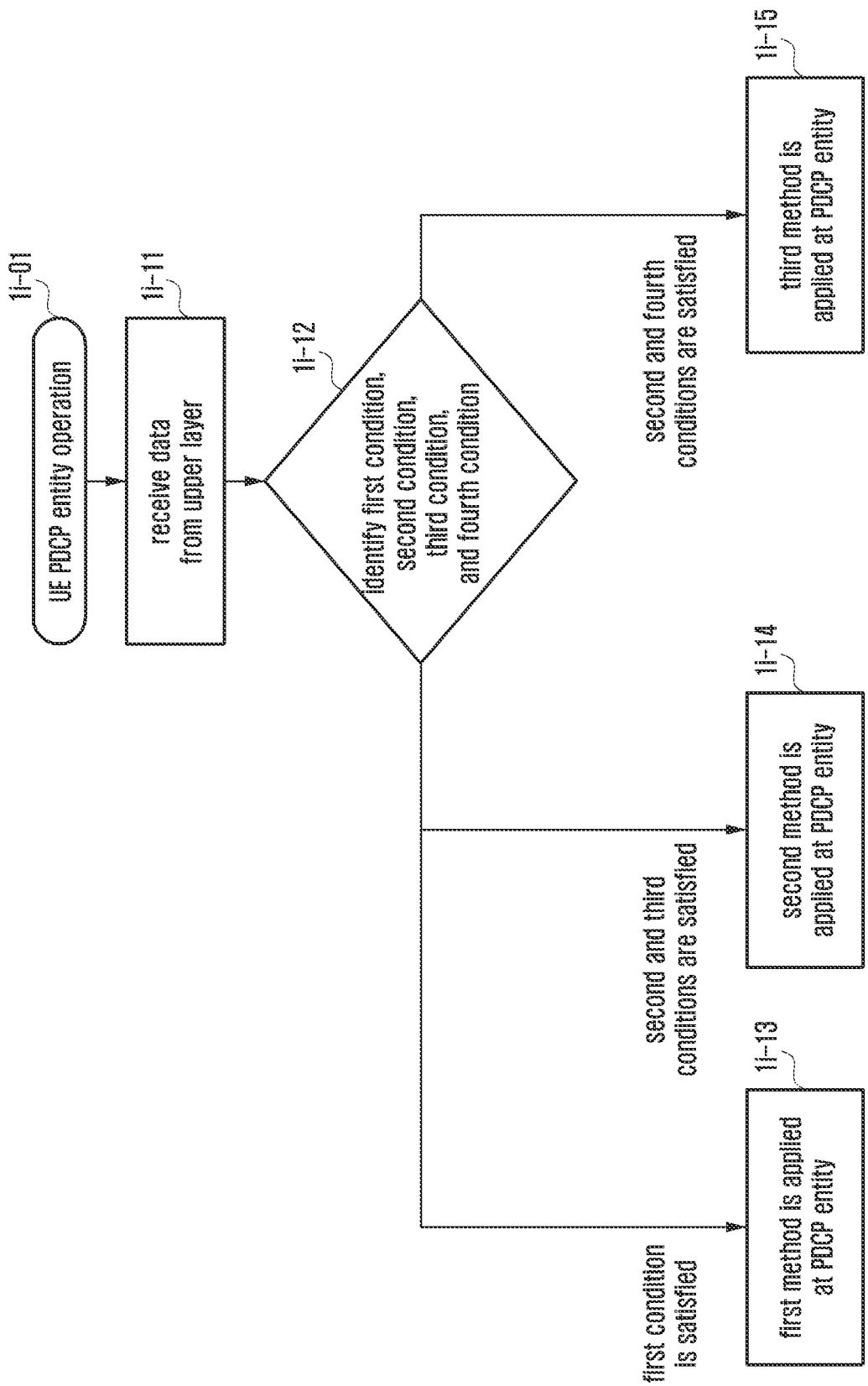

FIG. 1H is a diagram for explaining a data preprocessing method in a dual connectivity split bearer environment in a next generation mobile communication system according to an embodiment of the disclosure.

Hereinafter, a description is made of the data preprocessing in the dual connectivity split bearer environment in a next generation mobile communication system according to embodiment 1-1 of the disclosure. The split bearer is a DRB that is capable of increasing a data rate by allowing a PDCP entity 1h-05 to send data packets in a distributed manner to two RLC entities 1h-10 and 1h-15 that transmit data through different cells.

According to an embodiment of the disclosure, the dual connectivity environment may include the scenarios 1f-01, 1f-02, 1f-03, and 1f-04 of FIG. 1F of which each may be applicable to a situation of using a dual connectivity downlink (DL) split bearer at a base station and a situation of using a dual connectivity uplink (UL) split bearer at a UE. The disclosure may be applied to the above scenarios.

In the case of using a split bearer in a dual connectivity environment, the PDCP entity 1h-05 may process data packets (IP packets or PDCP SDUs) into PDCP PDUs and send the PDCP PDUs to a first RLC entity 1h-10 and a second RLC entity 1h-15 according to a predetermined ratio. The predetermined ratio may be determined by a network (or base station of an MCG or an SCG) and transmitted to a UE via an RRC message (or a newly defined MAC CE or a newly defined PDCP control PDU) (in downlink, the PDCP entity of the MCG may immediately acquire information on the predetermined ratio from the network).

For example, the base station may transmit the predetermined ratio and information on whether the first and second RLC entities are established to the UE via the RRCConnectionSetup message at step 1e-10 or the RRCConnectionReconfiguration message at steps 1e-20 and 1e-35 in FIG. 1E. If the predetermined ratio is configured and the first and second RLC entities are established, the PDCP entity 1h-05 sends data to the first and second RLC entities 1h-10 and 1h-15 according to the ratio. It may also be possible to tag the data packets with MCG or SCG according to the ratio and make a record thereof. Here, it may be possible to interpret that the MCG and SCG correspond respectively to the first and second RLC entities.

For example, if the predetermined ratio is set to 2:1, two data packets are sent to the first RLC entity while one data packet is sent to the second RLC entity. The PDCP entity may repeat the above procedure.

The data packets 1g-10 sent to the first and second RLC entities may be preprocessed into a MAC SDU 1g-20 along with a MAC sub-header as described with reference to FIG. 1G. The data preprocessing process may be continuously performed when the total size of the preprocessed data packets is equal to or less than a predetermined threshold 1.

If the total size of the preprocessed data packets is equal to or greater than the predetermined threshold 1, the preprocessing process may be stopped. If transmission resources are allocated and data transmission is completed such that the total size of the preprocessed data packets become less than the predetermined threshold 1, the preprocessing process may be resumed.

If transmission resources are allocated to the MCG or SCG for data transmission, the MCG or SCG generates MAC PDUs fit in size to the transmission resources with the preprocessed data packets and, if the size of the transmission resources is less than the size of the preprocessed data packets, it may segment the last MAC SDU, update the MAC sub-header correspondingly, and generate a MAC PDU.

Threshold 1 may be determined by a network (or base station of the MCG or SCG) and transmitted to a UE via an RRC message (or a newly defined MAC CE or a newly defined PDCP control PDU) (in downlink, the PDCP entity of the MCG may immediately acquire information on threshold 1 from the network).

For example, the base station may transmit threshold 1 to the UE via the RRCConnectionSetup message at step 1e-10 or the RRCConnectionReconfiguration message at steps 1e-20 and 1e-35 of FIG. 1E. Depending on UE capability, the UE may determine the value autonomously. That is, the UE may set threshold 1 to a value corresponding to a size of the largest transport block (TB) or a TB for a highest data rate (highest rate TB). The UE may also set threshold 1 to a value obtained by multiplying the highest rate by a round trip time (RTT). Threshold 1 may be defined by a number of data packets or bytes indicative of data size.

In embodiment 1-1 of the disclosure, the PDCP entity 1h-05, the RLC entities 1h-10 and 1h-15, and the MAC entities 1h-20 and 1h-25 operate as follows.

If a first condition is fulfilled, the PDCP entity 1h-05 follows a first method; if a second condition and a third condition are fulfilled, the PDCP entity 1h-05 follows a second method; if the second condition and a fourth condition are fulfilled, the PDCP entity 1h-05 follows a third method.

The first condition is that the PDCP entity receives data packets from a higher layer and one of the first and second RLC entities is configured to process and send the data packets (whether the first RLC entity and/or the second RLC entity is configured may be determined by the network (or a base station of the MCG or SCG) and notified to the UE via an RRC message (or a newly defined MAC CE, a newly defined PDCP control PDU, etc.) (in downlink, the PDCP entity of the MCG may directly acquire RLC entity configuration information from the network). For example, the base station may notify the UE whether the first and second RLC entities are configured using the RRCConnectionSetup message at step 1e-10 or the RRCConnectionReconfiguration message at steps 1e-20 and 1e-35 of FIG. 1E.).

The second condition is that the PDCP entity receives data packets from the higher layer and both the first and second RLC entities are configured to process and send the data packets (whether the first RLC entity and/or the second RLC entity is configured may be determined by the network (or a base station of the MCG or SCG) and notified to the UE via an RRC message (or a newly defined MAC CE, a newly defined PDCP control PDU, etc.) (in downlink, the PDCP entity of the MCG may directly acquire RLC entity configuration information from the network). For example, the base station may notify the UE whether the first and second RLC entities are configured using the RRCConnectionSetup message at step 1e-10 or the RRCConnectionReconfiguration message at steps 1e-20 and 1e-35 of FIG. 1E.).

The third condition is that a ratio is predetermined and a size of preprocessed data packets is equal to or less than threshold 1.

The fourth condition is that a ratio is predetermined and a size of preprocessed data packets is greater than threshold 1.

In the first method, the PDCP entity processes the data packets from the higher layer into PDCP PDUs and sends them to one of the first and second RLC entities that is configured to process and send data packets.

In the second method, the PDCP entity processes the data packets from the higher layer into PDCP PDUs and sends the PDCP PDUs to the first and second RLC entities according to a predetermined ratio.

In the third method, the PDCP entity holds the PDCP PDUs generated by processing the data packets from the higher layer without sending them to the first and second RLC entities and waits until the third condition is fulfilled.

The RLC entities 1h-10 and 1h-15 follow the first method for the case where the first condition is fulfilled and the second method for the case where the second condition is fulfilled.

The first condition is the case where the RLC entities are LTE RLC entities or eLTE RLC entities (the eLTE RLC entities are evolved LTE RLC entities updated with new or improved functions).

The second condition is the case where the RLC entities are NR RLC entities (NR RLC entities of the next generation mobile communication system may be characterized by including the functions described with reference to FIG. 1D with the exception of the concatenation function.

In the first method, the RLC entities store the PDCP PDUs received from the PDCP entity, waiting until transmission resources are allocated, generates, if transmission resources are allocated, RLC PDUs by concatenating the PDCP PDUs to be fit in size for the transmission resources and adding RLC headers, and send the RLC PDUs to the corresponding MAC entities.

In the second method, the RLC entities generate RLC PDUs with RLC headers for data preprocessing on the PDCP PDUs received from the PDCP entity as described with reference to FIG. 1G regardless of transmission resources allocation and send the RLC PDUs to the corresponding MAC entities, the MAC entities generating MAC sub-headers and MAC SDUs to complete the data preprocessing.

The MAC entities 1h-20 and 1h-25 follow the first method for the case where the first condition is fulfilled and the second method for the case where the second condition is fulfilled.

The first condition is the case where the MAC entities are LTE MAC entities or eLTE MAC entities (the eLTE MAC entities are evolved LTE MAC entities updated with new or improved functions).

The second condition is the case where the MAC entities are NR MAC entities (NR MAC entities of the next generation mobile communication system may include the functions described with reference to FIG. 1D).

In the first method, the MAC entities stores the RLC PDUs received from the RLC entities, generate MAC PDUs with MAC sub-headers and MAC SDUs to be fit in size for the transmission resources, and send the MAC PDUs to the corresponding PHY entities.

In the second method, the MAC entities configure MAC sub-headers and MAC SDUs by processing the RLC PDUs received from the RLC entities as described with reference to FIG. 1G regardless of transmission resources allocation to complete the data preprocessing. If transmission resources are allocated, the MAC entities generate the MAC PDUs with the MAC sub-headers and MAC SDUs to be fit in size for the transmission resources and, if the size of the transmission resources is less than required, segment the last MAC SDUs, update the MAC sub-header, and send the MAC PDUs to the corresponding PHY entities.

Threshold 1 may be set to a value corresponding to a size of the largest transport block (TB) or a TB for a highest data rate (highest rate TB). Threshold 1 may also be set to a value obtained by multiplying the highest rate by a round trip time (RTT). Threshold 1 may be defined by a number of data packets or bytes indicative of data size.

Threshold 1 indicates a data amount necessary to be preprocessed at the UE. That is, if IP packets are continuously passed down to the PDCP layer in the UE, preprocessing is performed by an amount set by threshold 1 rather than in a continuous manner. Threshold 1 may make it possible to avoid unnecessary preprocessing at the UE.

Because threshold 1 is set to a value corresponding to a maximum UL transmission resource amount (UL grant)/maximum data size (maximum TB) available for the UE, the UE may be able achieve a preprocessing gain without any loss. If the maximum UL transmission resource amount (UL grant)/maximum data size (maximum TB) available for the UE increases by employing a certain technology such as carrier aggregation and multi-connectivity, threshold 1 may be reset to a value in adaptation to the increase.

Threshold 1 may also be set per bearer or connected cell or base station. Threshold 1 may also be used in a single connectivity situation, i.e., a case where the UE connects to one base station for data communication, as well as multi-connectivity situations.

Threshold 1 is configured by the network and broadcast in the system information so as to be set as default to UEs; if threshold 1 is configured through the RRC Connection Setup, RRC Connection Resume, or RRC connection Reconfiguration procedure at steps 1e-10, 1e-20, or 1e-35 of FIG. 1E, the UE may apply the threshold value received via this procedure preferentially rather than the default value broadcast in the system information.

In embodiment 1-1 of the disclosure, the preprocessed data packets may be canceled in a predetermined case. That is, it may be possible to discard the preprocessed data packets and process original data packets (PDCP SDUs) stored in the PDCP entity according to embodiment 1-1. The predetermined case may be the case where the PDCP entity or the RLC entities are reset or reestablished or RLC entities are newly established.

In embodiment 1-1 of the disclosure, if it is necessary for the UE to perform a buffer status report, i.e., if the UE has to make a buffer status report for a certain cell group, the UE may configure the buffer status report by summing the total size of the preprocessed data packets in the cell group and a multiplication of the split ratio for the cell group and a size of the packets that are not preprocessed yet.

In the case where the UE performs a buffer status report for a certain cell group, the buffer status report may be configured to include only the total size of the preprocessed data packets in the corresponding cell groups. In the case where the UE performs a buffer status report for a certain cell group, it may also be possible for the UE to configure the buffer status report to include a multiplication of the total size of data stored in the PDCP entity and a split ratio for the corresponding cell group. In the case where the UE performs a buffer status report for a certain cell group, it may also be possible for the UE to configure the buffer status report to include a size of data for the corresponding cell group according to the split ratio in the total size of the data stored in the PDCP entity.

Embodiment 1-1 may be extended so as to be identically applied to a multi-connectivity situation as well as a dual connectivity situation. For example, the split ratio may be set in an extended format such as 2:1:1 and 2:1:1:1 as well as the original format such as 2:1 for performing the above-described preprocessing; the above-described BSR may also be applied in the same manner.

FIG. 1H is a diagram for explaining a data preprocessing method in a dual connectivity split bearer environment in a next generation mobile communication system according to an embodiment of the disclosure.

Hereinafter a description is made of data preprocessing in the dual connectivity split bearer environment in a next generation mobile communication system according to embodiment 1-2 of the disclosure.

The split bearer is a DRB that is capable of increasing a data rate by allowing a PDCP entity 1h-05 to send data packets in a distributed manner to two RLC entities 1h-10 and 1h-15 that transmit data through different cells.

According to an embodiment of the disclosure, the dual connectivity environment may include the scenarios 1f-01, 1f-02, 1f-03, and 1f-04 of FIG. 1F of which each may be applicable to a situation of using a dual connectivity downlink (DL) split bearer at a base station and a situation of using a dual connectivity uplink (UL) split bearer at a UE. The disclosure may be applied to the above scenarios.

In the case of using a split bearer in a dual connectivity environment, the PDCP entity 1h-05 may process data packets (IP packets or PDCP SDUs) into PDCP PDUs and send the PDCP PDUs to a first RLC entity 1h-10 and a second RLC entity 1h-15 according to a predetermined ratio.

The predetermined ratio may be determined by a network (or base station of an MCG or an SCG) and transmitted to a UE via an RRC message (or a newly defined MAC CE or a newly defined PDCP control PDU) (in downlink, the PDCP entity of the MCG may immediately acquire information on the predetermined ratio from the network). For example, the base station may transmit the predetermined ratio and information on whether the first and second RLC entities are established to the UE via the RRCConnectionSetup message at step 1e-10 or the RRCConnectionReconfiguration message at steps 1e-20 and 1e-35 in FIG. 1E.

In the case where the predetermined ratio is configured and the first and second RLC entities are established, if a size of stored data packets is less than threshold 2, the PDCP entity 1h-05 may process the data for one of the first and second RLC entities. If the RLC entity is an LTE RLC entity, it may store the data packets until transmission resources are allocated; if the RLC entity is an NR RLC entity, it may perform the data preprocessing process as described with reference to FIG. 1G.

In the above procedure, sending the data packets to the first and second RLC entities may mean tagging the data packets with the MCG or the SCG according to the ratio and making a record thereof. Here, it may be possible to interpret that the MCG and SCG correspond respectively to the first and second RLC entities.

If the size of the data packets stored in the PDCP entity 1h-05 is greater than threshold 2, the PDCP entity sends the data to the first and second RLC entities 1h-10 and 1h-15 according to the predetermined ratio.

For example, if the predetermined ratio is set to 2:1, two data packets are sent to the first RLC entity while one data packet is sent to the second RLC entity. The PDCP entity may repeat the above procedure. The data packets 1g-10 sent to the first and second RLC entities may be preprocessed into a MAC SDU 1g-20 along with a MAC sub-header as described with reference to FIG. 1G.

The data preprocessing process may be continuously performed when the total size of the preprocessed data packets is equal to or less than a predetermined threshold 1. If the total size of the preprocessed data packets is equal to or greater than the predetermined threshold 1, the preprocessing process may be stopped. If transmission resources are allocated and data transmission is completed such that the total size of the preprocessed data packets becomes less than the predetermined threshold 1, the preprocessing process may be resumed.

If transmission resources are allocated to the MCG or SCG for data transmission, the MCG or SCG generates MAC PDUs fit in size to the transmission resources with the preprocessed data packets and, if the size of the transmission resources is less than the size of the preprocessed data packets, it may segment the last MAC SDU, update the MAC sub-header correspondingly, and generate a MAC PDU.

Threshold 1 and threshold 2 may be determined by a network (or base station of the MCG or SCG) and transmitted to a UE via an RRC message (or a newly defined MAC CE or a newly defined PDCP control PDU)(in downlink, the PDCP entity of the MCG may immediately acquire information on threshold 1 and threshold 1 from the network).

For example, the base station may transmit threshold 1 and threshold 2 to the UE via the RRCConnectionSetup message at step 1e-10 or the RRCConnectionReconfiguration message at steps 1e-20 and 1e-35 of FIG. 1E. Depending on UE capability, the UE may determine the value autonomously. That is, the UE may set threshold 1 to a value corresponding to a size of the largest transport block (TB) or a TB for a highest data rate (highest rate TB).

The UE may also set threshold 1 to a value obtained by multiplying the highest rate by a round trip time (RTT). The UE may also set threshold 2 to a predetermined value. Threshold 1 and threshold 2 may each be defined by a number of data packets or bytes indicative of data size.

In embodiment 1-2 of the disclosure, the PDCP entity 1h-05, the RLC entities 1h-10 and 1h-15, and the MAC entities 1h-20 and 1h-25 operate as follows.

If a first condition is fulfilled, the PDCP entity 1h-05 follows a first method; if a second condition and a third condition are fulfilled, the PDCP entity 1h-05 follows a second method; if the second condition and a fourth condition are fulfilled, the PDCP entity 1h-05 follows a third method.

The first condition is that the PDCP entity receive data packets from a higher layer and one of the first and second RLC entities is configured to process and send the data packets or that the total size of the data packets received by the PDCP entity is equal to or less than threshold 2 or that the total size of the data packets received by the PDCP entity is less than threshold 2 even if both the first and second RLC entities are configured (information indicating whether the first RLC entity and/or the second RLC entity is configured and threshold 2 may be determined by the network (or base station of the MCG or SCG) and transmitted to the UE via an RRC message (or a newly defined MAC CE or a newly defined PDCP control PDU (in downlink, the PDCP entity of the MCG may directly acquire RLC entity configuration information and threshold 2 from the network). For example, the base station may notify the UE whether the first and second RLC entities are configured using the RRCConnectionSetup message at step 1e-10 or the RRCConnectionReconfiguration message at steps 1e-20 and 1e-35 of FIG. 1E.).

The second condition is that the PDCP entity receives data packets from the higher layer and both the first and second RLC entities are configured to process and send the data packets and the total size of the data packets received by the PDCP entity is greater than threshold 2 (information indicating whether the first RLC entity and/or the second RLC entity is configured and a value of threshold 2 may be determined by the network (or base station of the MCG or SCG) and transmitted to the UE via an RRC message (or a newly defined MAC CE or a newly defined PDCP control PDU) (in downlink, the PDCP entity of the MCG may directly acquire RLC entity configuration information and threshold 2 from the network). For example, the base station may notify the UE whether the first and second RLC entities are configured using the RRCConnectionSetup message at step 1e-10 or the RRCConnectionReconfiguration message at steps 1e-20 and 1e-35 of FIG. 1E.).

The third condition is that a ratio is predetermined and a size of preprocessed data packets is equal to or less than threshold 1.

The fourth condition is that a ratio is predetermined and a size of preprocessed data packets is greater than threshold 1.

In the first method, the PDCP entity processes the data packets from the higher layer into PDCP PDUs and sends them to one of the first and second RLC entities that is configured to process and send data packets.

In the second method, the PDCP entity processes the data packets from the higher layer into PDCP PDUs and sends the PDCP PDUs to the first and second RLC entities according to a predetermined ratio.

In the third method, the PDCP entity holds the PDCP PDUs generated by processing the data packets from the higher layer without sending them to the first and second RLC entities and waits until the third condition is fulfilled.

The RLC entities 1h-10 and 1h-15 follow the first method for the case where the first condition is fulfilled and the second method for the case where the second condition is fulfilled.

The first condition is the case where the RLC entities are LTE RLC entities or eLTE RLC entities (the eLTE RLC entities are evolved LTE RLC entities updated with new or improved functions).

The second condition is the case where the RLC entities are NR RLC entities (NR RLC entities of the next generation mobile communication system may be characterized by including the functions described with reference to FIG. 1D with the exception of the concatenation function.

In the first method, the RLC entities store the PDCP PDUs received from the PDCP entity, waiting until transmission resources are allocated, generate, if transmission resources are allocated, RLC PDUs by concatenating the PDCP PDUs to be fit in size for the transmission resources and adding RLC headers, and send the RLC PDUs to the corresponding MAC entities.

In the second method, the RLC entities generate RLC PDUs with RLC headers for data preprocessing on the PDCP PDUs received from the PDCP entity as described with reference to FIG. 1G regardless of transmission resources allocation and send the RLC PDUs to the corresponding MAC entities, the MAC entities generating MAC sub-headers and MAC SDUs to complete the data preprocessing.

The MAC entities 1h-20 and 1h-25 follow the first method for the case where the first condition is fulfilled and the second method for the case where the second condition is fulfilled.

The first condition is the case where the MAC entities are LTE MAC entities or eLTE MAC entities (the eLTE MAC entities are evolved LTE MAC entities updated with new or improved functions).

The second condition is the case where the MAC entities are NR MAC entities (NR MAC entities of the next generation mobile communication system may include the functions described with reference to FIG. 1D).

In the first method, the MAC entities store the RLC PDUs received from the RLC entities, generate MAC PDUs with MAC sub-headers and MAC SDUs to be fit in size for the transmission resources, and send the MAC PDUs to the corresponding PHY entities.

In the second method, the MAC entities configure MAC sub-headers and MAC SDUs by processing the RLC PDUs received from the RLC entities as described with reference to FIG. 1G regardless of transmission resources allocation to complete the data preprocessing. If transmission resources are allocated, the MAC entities generate the MAC PDUs with the MAC sub-headers and MAC SDUs to be fit in size for the transmission resources and, if the size of the transmission resources is less than required, segment the last MAC SDUs, update the MAC sub-headers, and send the MAC PDUs to the corresponding PHY entities.

Threshold 1 may be set to a value corresponding to a size of the largest transport block (TB) or a TB for a highest data rate (highest rate TB). Threshold 1 may also be set to a value obtained by multiplying the highest rate by a round trip time (RTT). Threshold 2 may also be set to a predetermined value. Threshold 1 and threshold 2 may each be defined by a number of data packets or bytes indicative of a data size.

Threshold 1 indicates a data amount necessary to be preprocessed at the UE. That is, if IP packets are continuously passed down to the PDCP layer in the UE, preprocessing is performed by an amount set by threshold 1 rather than in a continuous manner. Threshold 1 may make it possible to avoid unnecessary preprocessing at the UE.

Because threshold 1 is set to a value corresponding to a maximum UL transmission resource amount (UL grant)/maximum data size (maximum TB) available for the UE, the UE may be able achieve a preprocessing gain without any loss. If the maximum UL transmission resource amount (UL grant)/maximum data size (maximum TB) available for the UE increases by employing a certain technology such as carrier aggregation and multi-connectivity, threshold 1 may be reset to a value in adaptation to the increase.

Threshold 1 may also be set per bearer or connected cell or base station. Threshold 1 may also be used in a single connectivity situation, i.e., a case where the UE connects to one base station for data communication, as well as multi-connectivity situation.

Figure 2A:
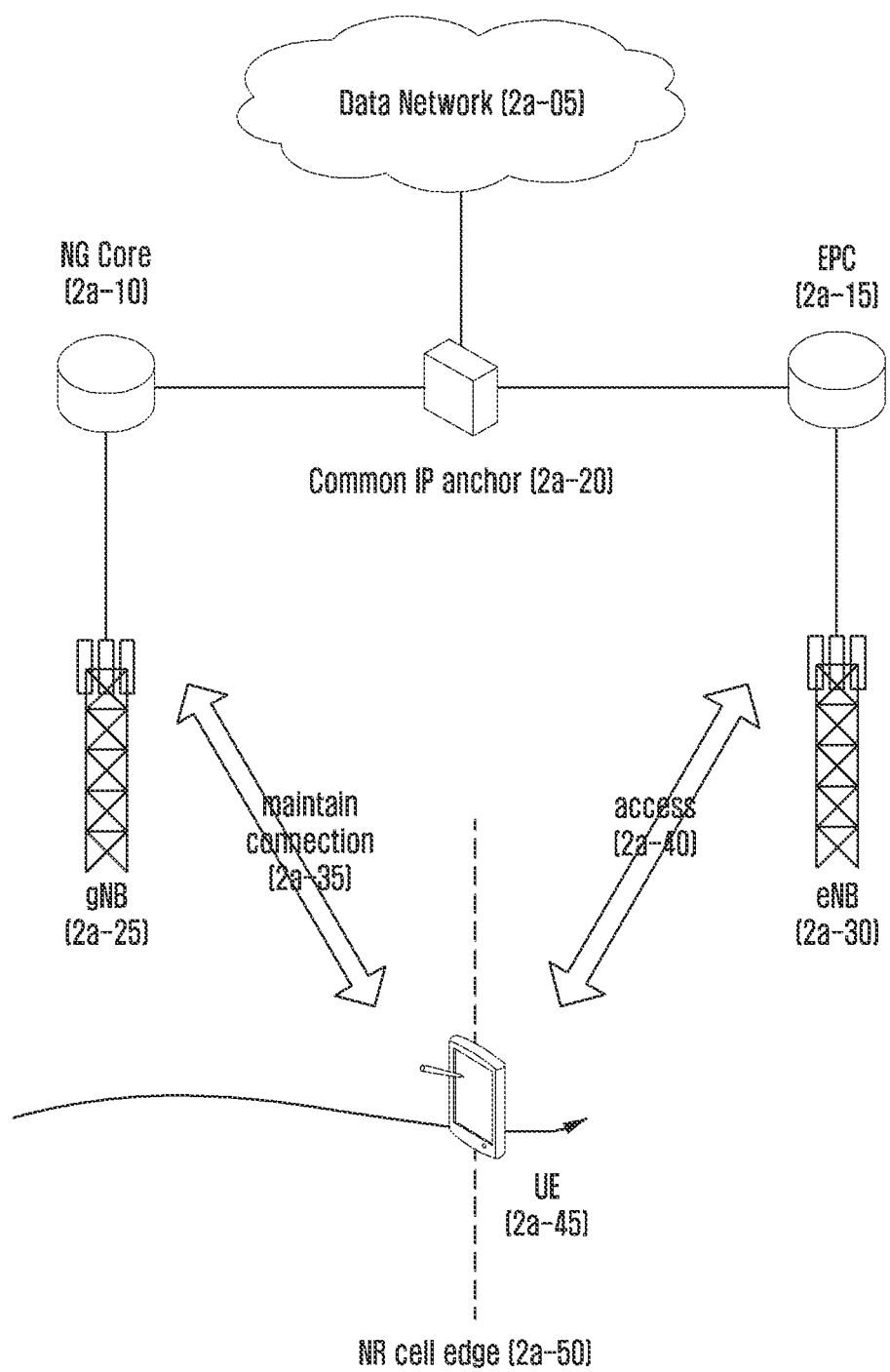
FIG. 2A is a diagram for conceptually explaining the inter-system handover by applying a dual-registered technique in a next generation mobile communication system.
Figure 2D:
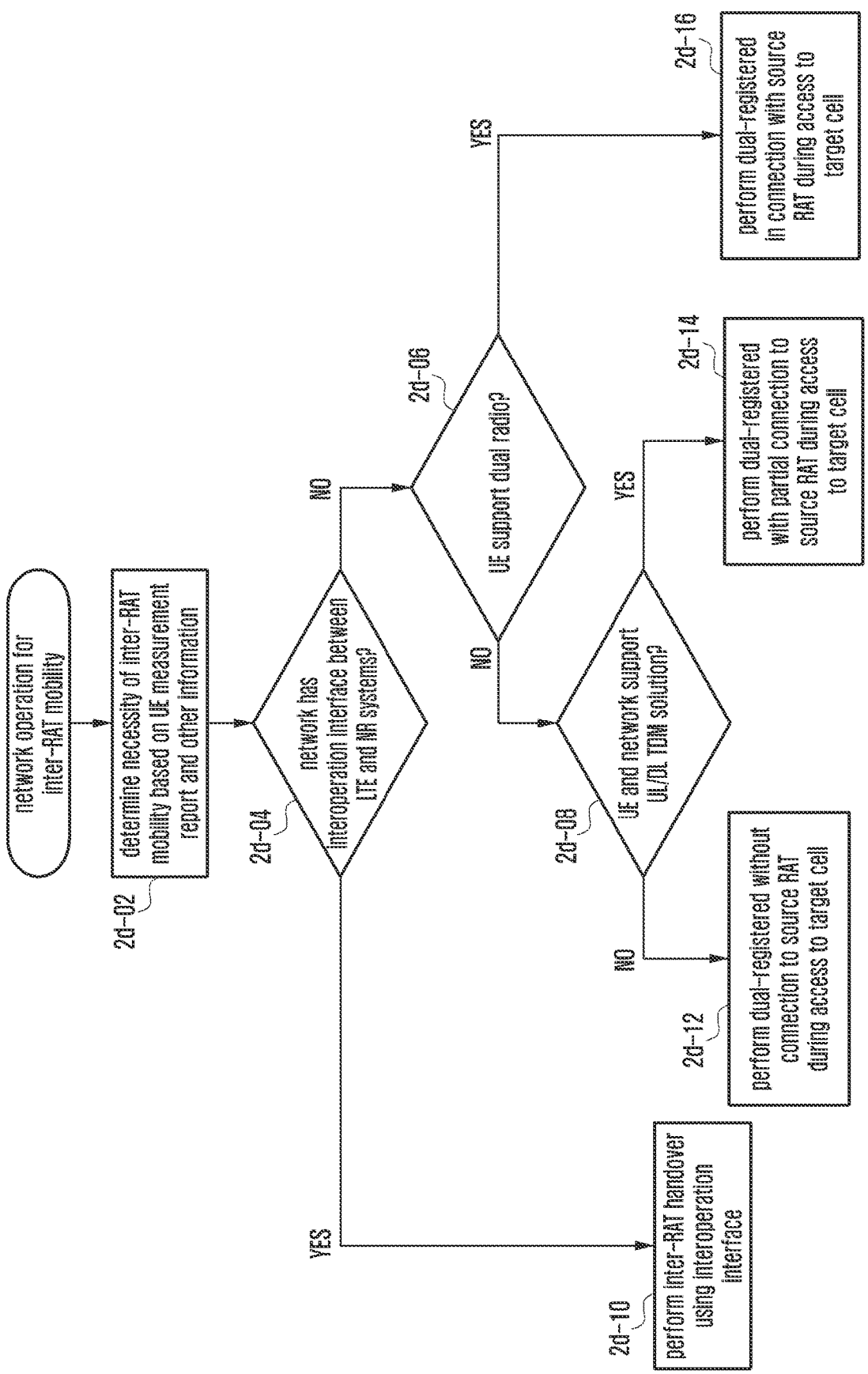
FIG. 2D is a flowchart illustrating a procedure for a network to determine initialization of a dual-registered operation.
Figure 2E:
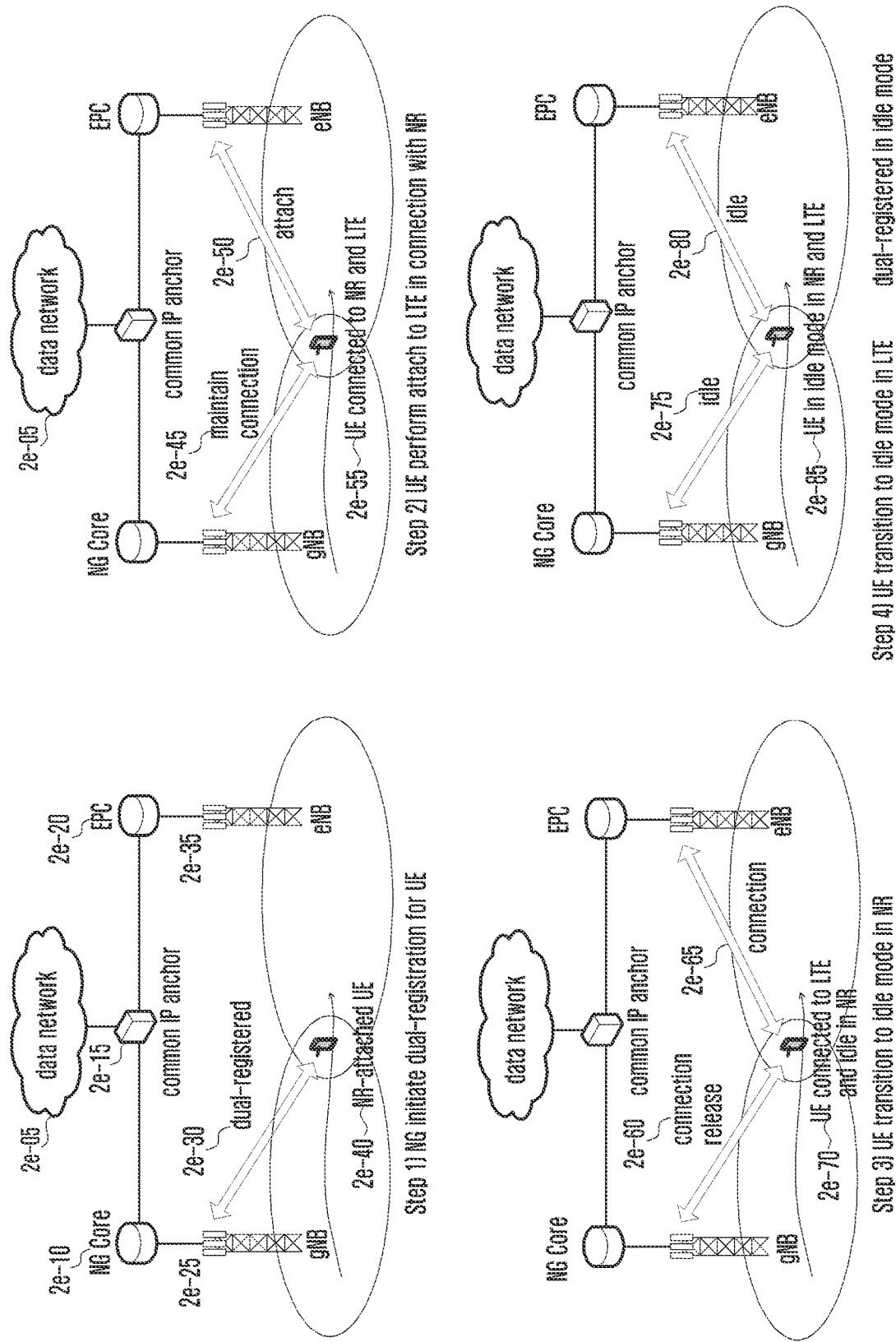
FIG. 2E is a diagram for explaining scenarios where a dual-registered UE is in an idle mode in two respective systems.

Threshold 2 is configured by the network and may be set to a value in consideration of a data traffic amount of the network/a number of activated UEs (UEs in data communication or in the RRC connected mode) and, if a data traffic amount of the network/a number of activated UEs (UEs in data communication or in the RRC connected mode) is changed, it may be reconfigured in adaptation to the change through the procedure of transmitting the RRC Connection Reconfiguration message at step 1e-35 of FIG. 2E.

Threshold 2 aims to prevent the PDCP entity of the UE having a small number of IP packets, i.e., a low data rate, from performing preprocessing unnecessarily to transmit packets to respective cell groups according to a predetermined split ratio. That is, the data preprocessing is performed, only when the PDCP entity has the data greater than threshold 2, i.e., the amount of data present in the PDCP entity is sufficient to use the dual connectivity technique, to transmit data through respective cell groups for increasing the data rate.

Accordingly, if the data amount present in the PDCP entity is less than threshold 2, the PDCP entity may perform data preprocessing and BSR for one of the MCG and SCG. By using threshold 2 in a low data rate situation, it is possible to avoid transmission resource waste caused by padding (if the data amount is less than the least size of a TB (transmission resource) being transmitted at a low data rate, this leads to padding, which may be decreased by performing data transmission through one of the two cell groups).

Threshold 1 and threshold 2 are configured by the network and broadcast in the system information so as to set as default to UEs; if threshold 1 and threshold 2 are configured through the RRC Connection Setup, RRC Connection Resume, or RRC connection Reconfiguration procedure at steps 1e-10, 1e-20, or 1e-35 of FIG. 1E, the UE may apply the threshold values received via this procedure preferentially rather than the default value broadcast in the system information.

In embodiment 1-2 of the disclosure, the preprocessed data packets may be canceled in a predetermined case. That is, it may be possible to discard the preprocessed data packets and process original data packets (PDCP SDUs) stored in the PDCP entity according to embodiment 1-2. The predetermined case may be the case where the PDCP entity or the RLC entities are reset or reestablished, RLC entities are newly established, or the operation of the PDCP entity is changed according to threshold 2.

In embodiment 1-2 of the disclosure, if it is necessary for the UE to perform a buffer status report, i.e., if the UE has to make a buffer status report for a certain cell group, the UE may configure the buffer status report by summing the total size of the preprocessed data packets in the cell group and a multiplication of the split ratio for the cell group and a size of the packets that are not preprocessed yet.

In the case where the UE performs a buffer status report for a certain cell group, the buffer status report may be configured to include only the total size of the preprocessed data packets in the corresponding cell groups. In the case where the UE performs a buffer status report for a certain cell group, it may also be possible for the UE to configure the buffer status report to include a multiplication of the total size of data stored in the PDCP entity and a split ratio for the corresponding cell group. In the case where the UE performs a buffer status report for a certain cell group, it may also be possible for the UE to configure the buffer status report to include a size of data for the corresponding cell group according to the split ratio in the total size of the data stored in the PDCP entity.

Embodiment 1-1 may be extended so as to be applied identically to a multi-connectivity situation as well as a dual connectivity situation. For example, the split ratio may be set in an extended format such as 2:1:1 and 2:1:1:1 as well as the original format such as 2:1 for performing the above-described preprocessing; the above-described BSR may also be applied in the same manner.

In embodiment 1-1 or 1-2 of the disclosure, the predetermined split ratio or threshold 1 may be configured to UEs via the system information broadcast by the network as default, the RRCConnectionSetup message, or the RRCConnectionReconfiguration message being transmitted from the base station to the UE at step 1e-10, 1e-20, or 1e-35 in FIG. 1E, or a newly defined MAC CE or a newly defined PDCP control PDU.

In the case where the base station configures a split bearer, i.e., an MCG and an SCG, to the UE, it may set the PDCP configuration information (PDCP-config) included the RRC Connection Setup, RRC Connection Resume, or RRC connection Reconfiguration message at steps 1e-10, 1e-20, or 1e-35 of FIG. E to a ul-DataSplitDRB-ViaSCG value or a ul-DataSplitThreshold value.

PDCP-Config

The PDCP-Config information element is used for configuring variable PDCP parameters for dataradio bearers.

PDCP-Config information element

```
-- ASN1START
PDCP-Config ::=                     SEQUENCE {
    discardTimer                    ENUMERATED {
                                        ms50, ms100, ms150, ms300, ms500,
                                        ms750, ms1500, infinity
    }                                                   OPTIONAL,       -- Cond Setup
    rlc-AM                          SEQUENCE {
        statusReportRequired            BOOLEAN
    }                                                   OPTIONAL,       -- Cond Rlc-AM
    rlc-UM                          SEQUENCE {
        pdcp-SN-Size                    ENUMERATED {len7bits, len12bits}
    }                                                   OPTIONAL,       -- Cond Rlc-UM
    headerCompression               CHOICE {
        notUsed                         NULL,
        rohc                            SEQUENCE {
            maxCID                          INTEGER (1..16383)              DEFAULT 15.
            profiles                        SEQUENCE {
                profile0x0001                   BOOLEAN,
                profile0x0002                   BOOLEAN,
                profile0x0003                   BOOLEAN,
                profile0x0004                   BOOLEAN,
                profile0x0006                   BOOLEAN,
                profile0x0101                   BOOLEAN,
                profile0x0102                   BOOLEAN,
                profile0x0103                   BOOLEAN,
                profile0x0104                   BOOLEAN
            },
            ...
        }
    },
    ...,
    [[ rn-IntegrityProtection-10    ENUMERATED {enabled}    OPTIONAL        -- Cond RN
    ]],
    [[ pdcp-SN-Size-v1130           ENUMERATED {len15bits}  OPTIONAL        -- Cond Rlc-AM2
    ]],
    [[ ul-DataSplitDRB-ViaSCG-r12       BOOLEAN   OPTIONAL,     -- Need ON
        t-Reordering-r12                ENUMERATED {
        ms0, ms20, ms40, ms60, ms80, ms100, ms120, ms140,
        ms160, ms180, ms200, ms220, ms240, ms260, ms280, ms300,
        ms500, ms750, spare14, spare13, spare12, spare11, spare10,
        spare9, spare8, spare7, spare6, spare5, spare4, spare3,
        spare2, spare1}                             OPTIONAL        -- Cond Setup5
    ]],
    [[ ul-DataSplitThreshold-r13        CHOICE {
        release                             NULL,
        setup                               ENUMERATED {
        b0, b100, b200, b400, b800, b1600, b3200, b6400, b12800,
        b25600, b51200, b102400, b204800, b409600, b819200, infinity
        spare1}
    }
                                            OPTIONAL,       -- Need ON
    pdcp-SN-Size-v1310              ENUMERATED {len18bits}  OPTIONAL,       -- Cond Rlc-AM3
    statusFeedback-r13              CHOICE {
        release                         NULL,
        setup                           SEQUENCE {
            statusPDU-TypeForPolling-r13    ENUMERATED {type1, type2}                   OPTIONAL,       --
Need ON
            statusPDU-Periodicity-Type1-r13     ENUMERATED {
            ms5, ms10, ms20, ms30, ms40, ms50, ms60, ms70, ms80, ms90,
            ms100, ms150, ms200, ms300, ms500, ms1000, ms2000, ms5000,
            ms10000, ms20000, ms50000}      OPTIONAL,       -- Need ON
            statusPDU-Periodicity-Type2-r13     ENUMERATED {
            ms5, ms10, ms20, ms30, ms40, ms50, ms60, ms70, ms80, ms90,
            ms100, ms150, ms200, ms300, ms500, ms1000, ms2000, ms5000,
            ms10000, ms20000, ms50000}      OPTIONAL,       -- Need ON
```

```
        statusPDU-Periodicity-Offset-r13        ENUMERATED {
                                       ms1, ms2, ms5, ms10, ms25, ms50, ms100, ms250, ms500,
                                       ms2500, ms5000, ms25000}     OPTIONAL      -- Need ON
      }
    }                                                               OPTIONAL      -- Need ON
  ]]
}
-- ASN1STOP
```

Table 1a, Table 1b, and Table 1c describe fields included in the PDCP-Config information element.

TABLE 1a discardTimer
Indicates the discard timer value specified in TS 36.323 [8]. Value in milliseconds.
Value ms50 means 50 ms, and ms 100 means 100 ms.
headerCompression
E-UTRAN does not reconfigure header compression for an MCG DRB except upon the first reconfiguration and upon handover after RRC connection reestablishment.
E-UTRAN does not reconfigure header compression for an SCG DRB except upon SCG change involving PDCP reestablishment. For split and LTE-WLAN
Aggregation (LWA) DRBs, E-UTRAN configures only notUsed.
maxCID
Indicates the value of the MAX_CID parameter as specified in
TS 36.323 [8]. The total value of MAX_CIDs across all bearers for the UE should be less than or equal to the value of the maxNumberROHC-ContextSessions parameter as indicated by the UE.
pdcp-SN-Size
Indicates the PDCP Sequence Number length in bits. For RLC UM (Unacknowledged Mode): value len7bits means that the 7-bit PDCP SN format is used and len12bits means that the 12-bit PDCP SN format is used. For RLC AM
(Acknowledged Mode): value len15bits means that the 15-bit PDCP SN format is used, value len18bits means that the 18-bit PDCP SN format is used, otherwise if the field is not included upon setup of the PCDP entity, 12-bit PDCP SN format is used, as specified in
TS 36.323 [8].

TABLE 1b profiles
The profiles used by both compressor and decompressor in both UE and E-UTRAN.
The field indicates which of the ROHC profiles specified in TS 36.323 [8] are supported, i.e., value true indicates that the profile is supported.
Profile 0x0000 shall always be supported when the use of ROHC is configured. If support of two ROHC profile identifiers with the same 8 LSB's is signaled, only the profile corresponding to the highest value shall be applied. E-UTRAN does not configure ROHC while t-Reordering is configured (i.e., for split DRBs or upon reconfiguration from split to MCG DRB).
statusFeedback
Indicates whether the UE shall send PDCP Status Report periodically or by E-UTRAN polling as specified in TS 36.323 [8].
statusPDU-TypeForPolling
Indicates the PDCP Control PDU option when it is triggered by E-UTRAN polling.
Value type1 indicates using the legacy PDCP Control PDU for PDCP status reporting and value type2 indicates using the LWA specific PDCP Control PDU for LWA status reporting as specified in TS 36.323 [8].
statusPDU-Periodicity-Type1
Indicates the value of the PDCP Status reporting periodicity for type1 Status PDU, as specified in TS 36.323 [8]. Value in milliseconds. Value ms5 means 5 ms, and ms10 means 10 ms.

TABLE 1c statusPDU-Periodicity-Type2
Indicates the value of the PDCP Status reporting periodicity for type2 Status PDU, as specified in TS 36.323 [8]. Value in milliseconds.
Value ms5 means 5 ms, and ms10 means 10 ms.
statusPDU-Periodicity-Offset
Indicates the value of the offset for type2 Status PDU periodicity, as specified in TS 36.323 [8]. Value in milliseconds. Value ms1 means 1 ms, and ms2 means 2 ms.
t-Reordering
Indicates the value of the reordering timer, as specified in TS 36.323 [8]. Value in milliseconds. Value ms0 means 0 ms, and ms20 means 20 ms.
rn-IntegrityProtection
Indicates that integrity protection or verification shall be applied for all subsequent packets received and sent by the radio network (RN) on the DRB.
statusReportRequired
Indicates whether or not the UE shall send a PDCP Status Report upon re-establishment of the PDCP entity and upon PDCP data recovery as specified in TS 36.323 [8].
ul-DataSplitDRB-ViaSCG
Indicates whether the UE shall send PDCP PDUs via SCG as specified in TS 36.323 [8]. E-UTRAN only configures the field (i.e. indicates value TRUE) for split DRBs.
ul-DataSplitThreshold
Indicates the threshold value for uplink data split operation specified in TS 36.323 [8]. Value b100 means 100 Bytes, and b200 means 200 Bytes. E-UTRAN only configures this field for split DRBs.

In the case where ul-DataSplitDRB-ViaSCG is set to TRUE, if the size of the data available for transmission (or UL or DL data rate) is less than ul-DataSplitThreshold, the UE attempts data transmission (e.g., sends buffer status report (BSR)) and performs data transmission (data preprocessing may be performed) only via SCG.

If the size of the data available for transmission (or UL or DL data rate) is greater than or equal to ul-DataSplitThreshold, the UE attempts data transmission (e.g., sends BSR) and performs data transmission (data preprocessing may be performed) via MCG or SCG (or both the groups).

In the case where ul-DataSplitDRB-ViaSCG is set to FALSE or ul-DataSplitDRB-ViaSCG is not configured, if the size of the data available for transmission (or UL or DL data rate) is less than the ul-DataSplitThreshold, the UE attempts data transmission (e.g., sends BSR) and performs data transmission (data preprocessing may be performed) only via MCG.

If the size of the data available for transmission (or UL or DL data rate) is greater than or equal to ul-DataSplitThreshold, the UE attempts data transmission (e.g., sends BSR) and performs data transmission (data processing may be performed) via MCG or SCG (or both the groups).

In the disclosure, ul-DataSplitThreshold may be set to a predetermined specific value such that the UE attempts data transmission only via the cell group indicated by ul-DataSplitThreshold and performs data transmission. That is, if ul-DataSplitThreshold is set to infinity (or 0, if 0 is designated as the predetermined specific value), the UE always attempts data transmission (e.g., sends BSR) and performs data transmission (data preprocessing may be performed)

only via the cell group indicated by ul-DataSplitDRB-ViaSCG regardless of the size of data available for transmission (or UL or DL data rate).

That is, if ul-DataSplitDRB-ViaSCG=TRUE and ul-DataSplitThreshold=infinity, the UE always attempts data transmission (e.g., sends BSR) and performs data transmission (data preprocessing may be performed) only via SCG. If ul-DataSplitDRB-ViaSCG=FALSE (not configured) and ul-DataSplitThreshold=infinity, the UE always attempts data transmission (e.g., sends BSR) and performs data transmission (data preprocessing may be performed) only via MCG.

A command for instructing the UE to attempt and perform data transmission to one cell group may be dynamically delivered using a newly defined MAC CE or PDCP PDU.

Figure 1I:
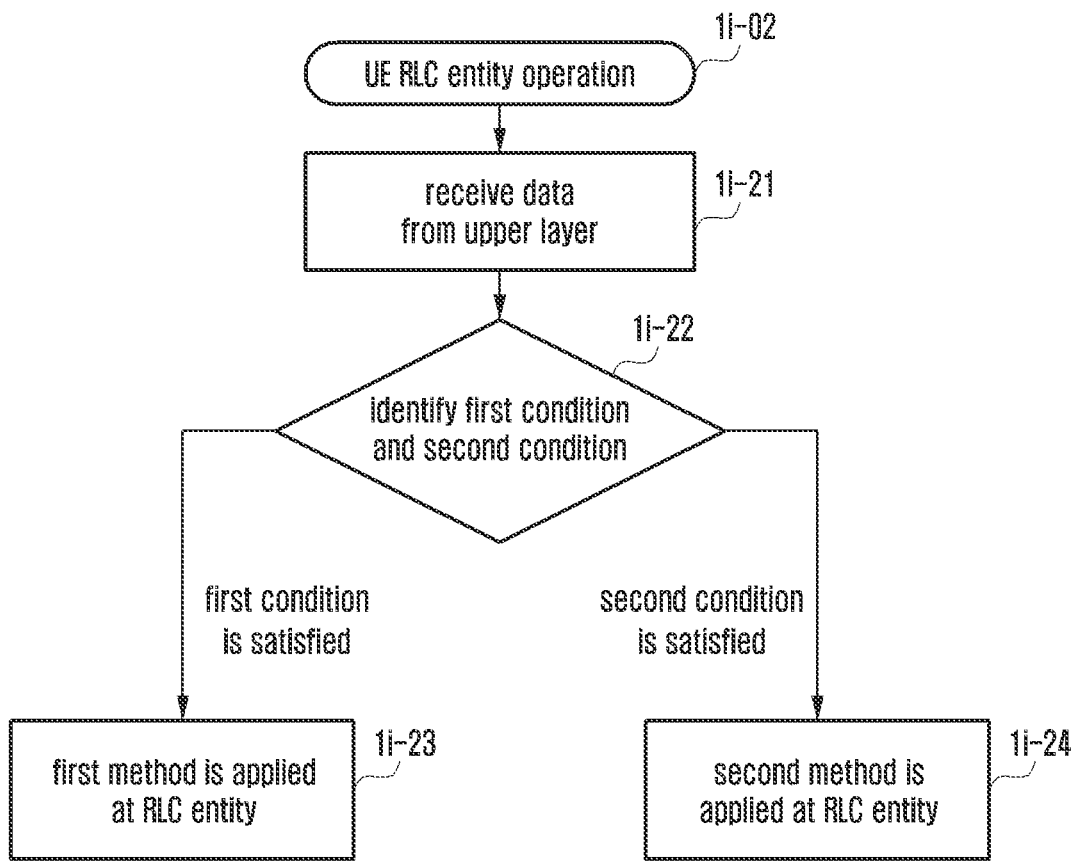
FIGS. 1IA to FIG. 1IC are flowcharts illustrating operations of PDCP, RLC, and MAC entities in a UE.
Figure 1I:
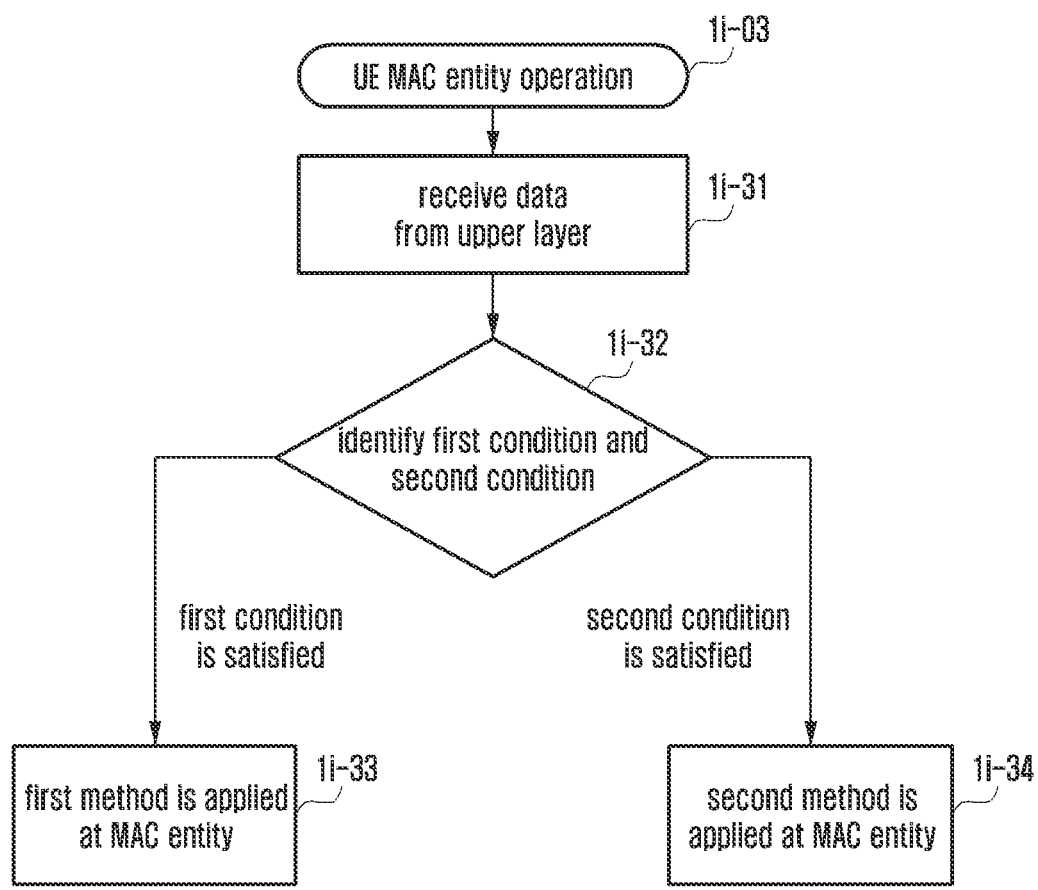

FIGS. 1IA to FIG. 1IC are flowcharts illustrating operations of PDCP, RLC, and MAC entities in a UE.

In FIG. 1IA, the PDCP entity of the UE starts operating at step 1*i*-01 and, if receiving data packets from a higher layer at step 1*i*-11, it checks, at step 1*i*-12, for a first condition, a second condition, a third condition, and a fourth condition. If the first condition is fulfilled, the PDCP entity applies a first method at step 1*i*-13; if the second and third conditions are fulfilled, the PDCP entity applies a second method at step 1*i*-14; if the second and fourth conditions are fulfilled, the PDCP entity applies a third method at step 1*i*-15.

In FIG. 1IB, the RLC entity of the UE starts operating at step 1*i*-02 and, if receiving data packets from the higher layer at step 1*i*-21, checks for the first and second conditions at step 1*i*-22. If the first condition is fulfilled, the RLC entity applies the first method at step 1*i*-23; if the second condition is fulfilled, the RLC entity applies the second method at step 1*i*-24.

In FIG. 1IC, the MAC entity of the UE starts operating at step 1*i*-03 and, if receiving data packets from a higher layer at step 1*i*-31, checks for the first and second conditions at step 1*i*-32. If the first condition is fulfilled, the MAC entity applies the first method at step 1*i*-33; if the second condition is fulfilled, the MAC entity applies the second method at step 1*i*-34.

FIG. 1J shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-1 of the disclosure.

FIG. 1J is a diagram illustrating an order and a method for a PDCP entity to send data packets to a first RLC entity and a second RLC entity according to a predetermined ratio. In the disclosure, it is assumed that the predetermined ratio between the first and second RLC entities is 3:1.

Even when the predetermined ratio is given as x:y, embodiment 1-3-1 may be applied in the same manner. In the disclosure, it is assumed that the ratio is 3:1 for convenience of explanation.

In embodiment 1-3-1 of the disclosure, the PDCP entity assigns 3 packets to the first RLC entity at step 1*j*-05 and 1 packet to the second RLC entity at step 1*j*-10 according to the ratio of 3:1. Next, the PDCP entity assigns 3 packets to the first RLC entity at step 1*j*-15 and 1 packet to the second RLC entity at step 1*j*-20 again to keep the ratio of 3:1. In embodiment 1-3-1, this procedure is repeated with the packets from the higher layer.

Figure 1K:
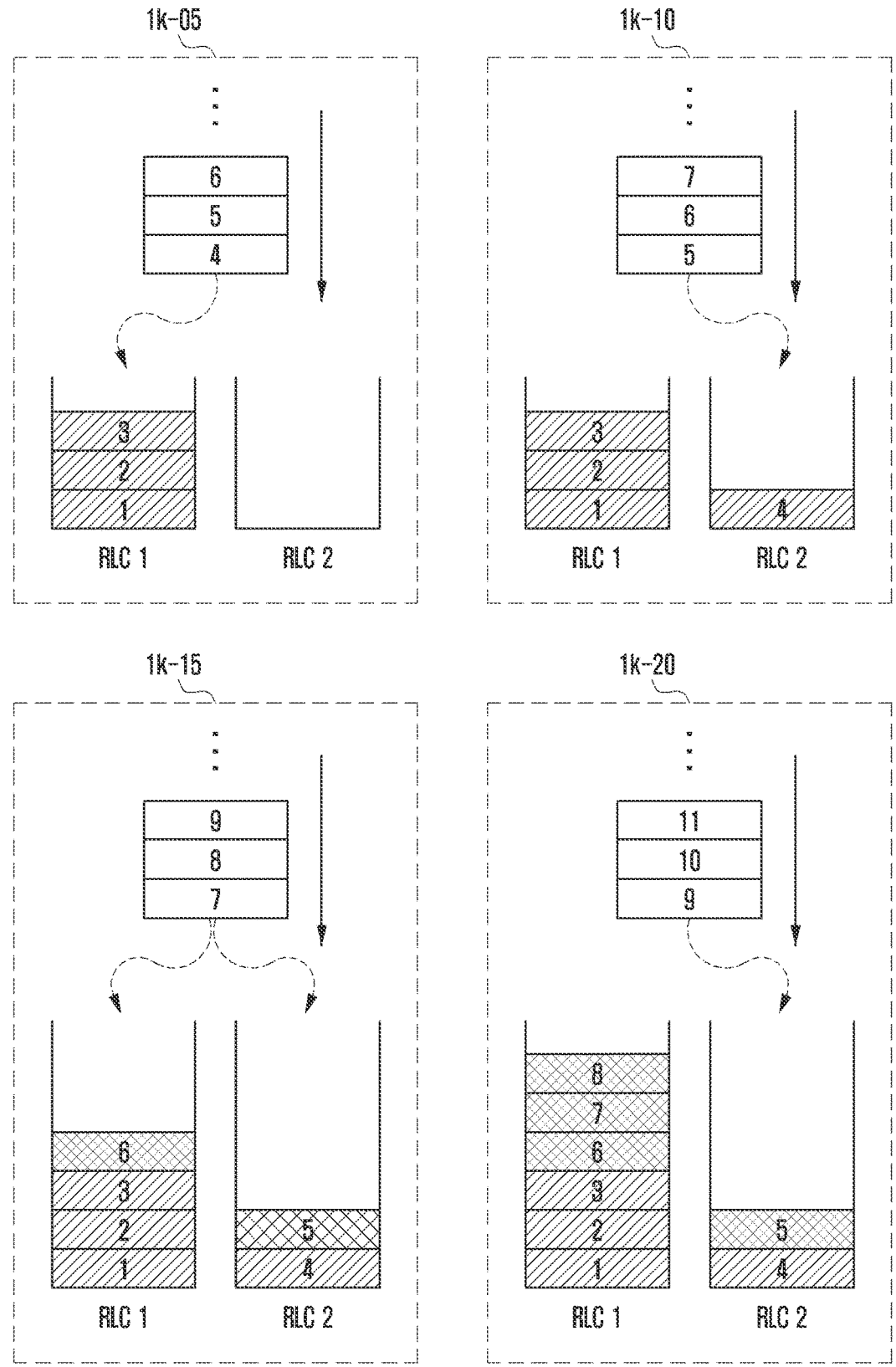
FIG. 1K is diagrams illustrating operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-2 of the disclosure.

FIG. 1K shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-2 of the disclosure.

FIG. 1K is a diagram illustrating an order and a method for a PDCP entity to send data packets to a first RLC entity and a second RLC entity according to a predetermined ratio. In the disclosure, it is assumed that the predetermined ratio between the first and second RLC entities is 3:1.

Even when the predetermined ratio is given as x:y, embodiment 1-3-2 may be applied in the same manner. In the disclosure, it is assumed that the ratio is 3:1 for convenience of explanation. In embodiment 1-3-2 of the disclosure, the PDCP entity assigns 3 packets to the first RLC entity at step 1*k*-05 and 1 packet to the second RLC entity at step 1*k*-10 according to the ratio of 3:1. Next, the PDCP entity assigns 1 packet to the second RLC entity at step 1*k*-15 and 3 packets to the first RLC entity at step 1*k*-20 to keep the ratio of 3:1. In embodiment 1-3-2, this procedure is repeated with the packets from the higher layer.

Figure 1L:
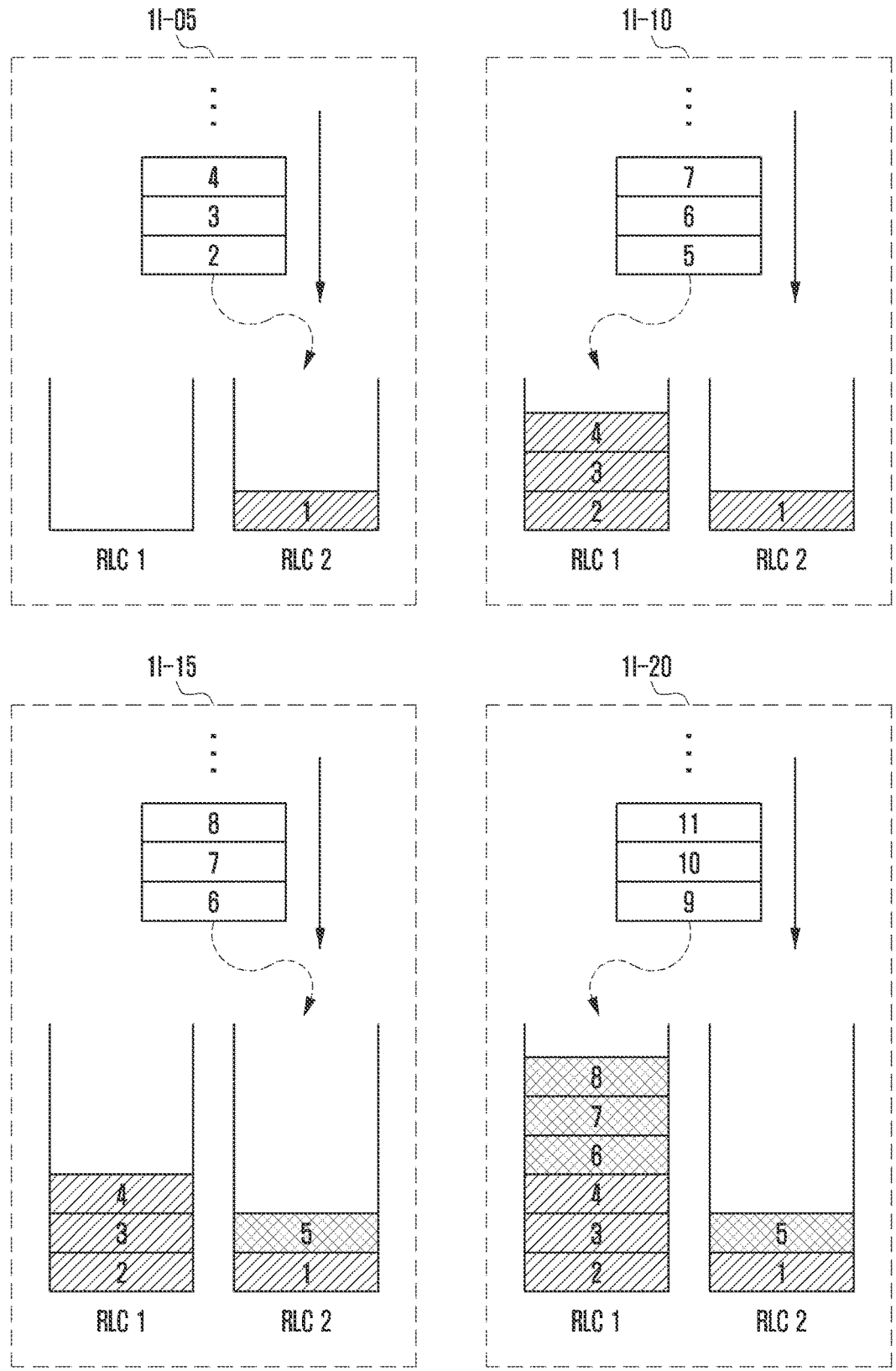
FIG. 1L is a diagram illustrating operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-3 of the disclosure.

FIG. 1L shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-3 of the disclosure.

FIG. 1L is a diagram illustrating an order and a method for a PDCP entity to send data packets to a first RLC entity and a second RLC entity according to a predetermined ratio. In the disclosure, it is assumed that the predetermined ratio between the first and second RLC entities is 3:1.

Even when the predetermined ratio is given as x:y, embodiment 1-3-3 may be applied in the same manner. In the disclosure, it is assumed that the ratio is 3:1 for convenience of explanation. In embodiment 1-3-3, the PDCP entity assigns 1 packet to the second RLC entity at step 1*l*-05 and 3 packets to the first RLC entity at step 1*l*-10 according to the ratio of 3:1. Next, the PDCP entity assigns 1 packet to the second RLC entity at step 1*l*-15 and 3 packets to the first RLC entities at step 1*l*-20 to keep the ratio of 3:1. In embodiment 1-3-3, this procedure is repeated with the packets from the higher layer.

Figure 1M:
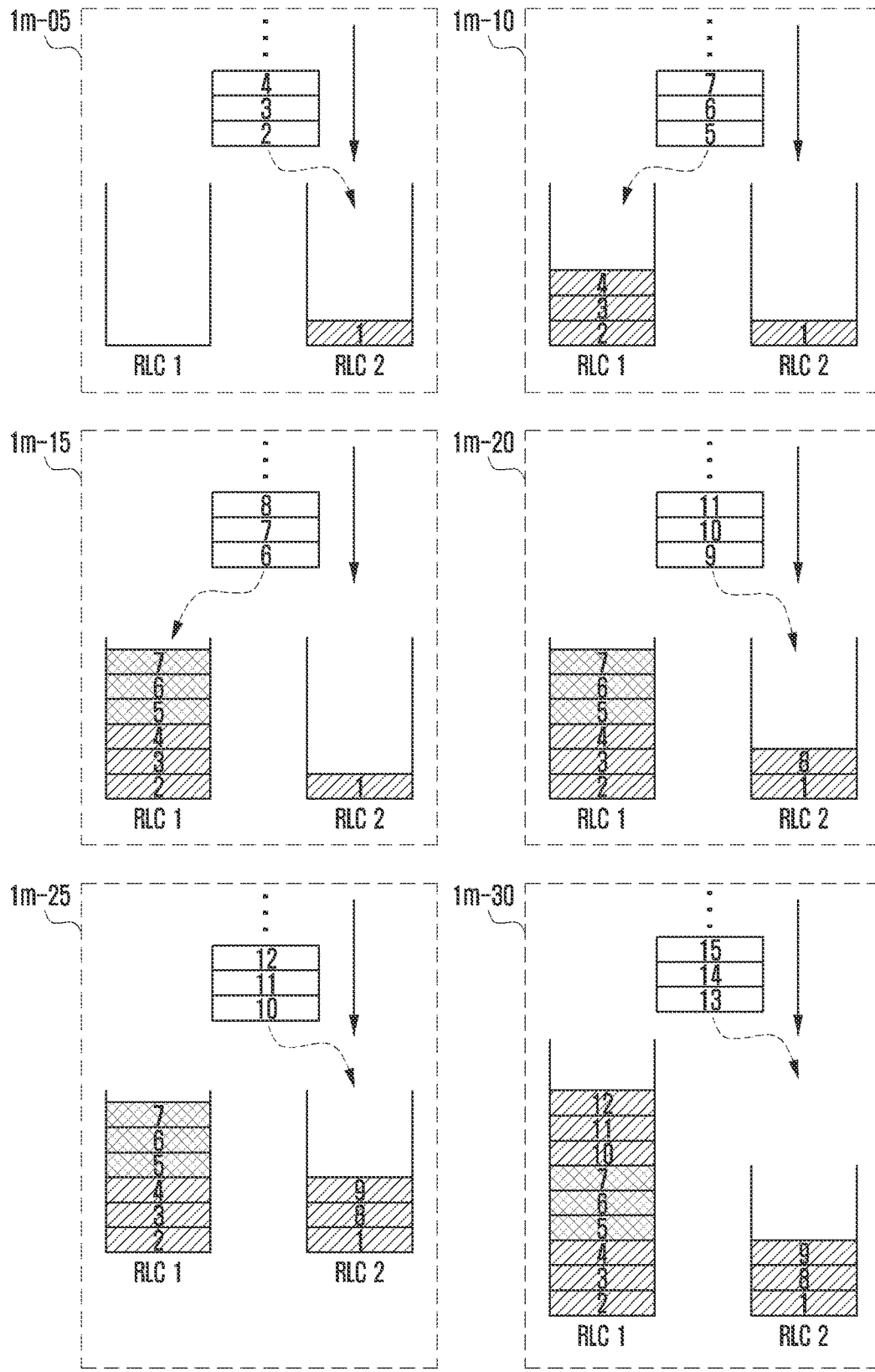
FIG. 1M is a diagram illustrating operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-4 of the disclosure.

FIG. 1M shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-4 of the disclosure.

FIG. 1M is a diagram illustrating an order and a method for a PDCP entity to send data packets to a first RLC entity and a second RLC entity according to a predetermined ratio. In the disclosure, it is assumed that the predetermined ratio between the first and second RLC entities is 3:1.

Even when the predetermined ratio is given as x:y, embodiment 1-3-4 may be applied in the same manner. In the disclosure, it is assumed that the ratio is 3:1 for convenience of explanation. In embodiment 1-34, the PDCP entity first assigns 1 packet to the second RLC entity at step 1*m*-05 and 3 packets to the first RLC entity at step 1*m*-10 according to the ratio of 3:1. Next, the PDCP entity first assigns 3 packets to the first RLC entity at step 1*m*-15, 1 packet to the second entity at step 1*m*-20, 1 packet to the second RLC entity at step 1*m*-25, and 3 packets to the first RLC entity at step 1m-30 to keep the ratio of 3:1. In embodiment 1-3-4, this procedure is repeated with the packets from the higher layer.

Figure 1N:
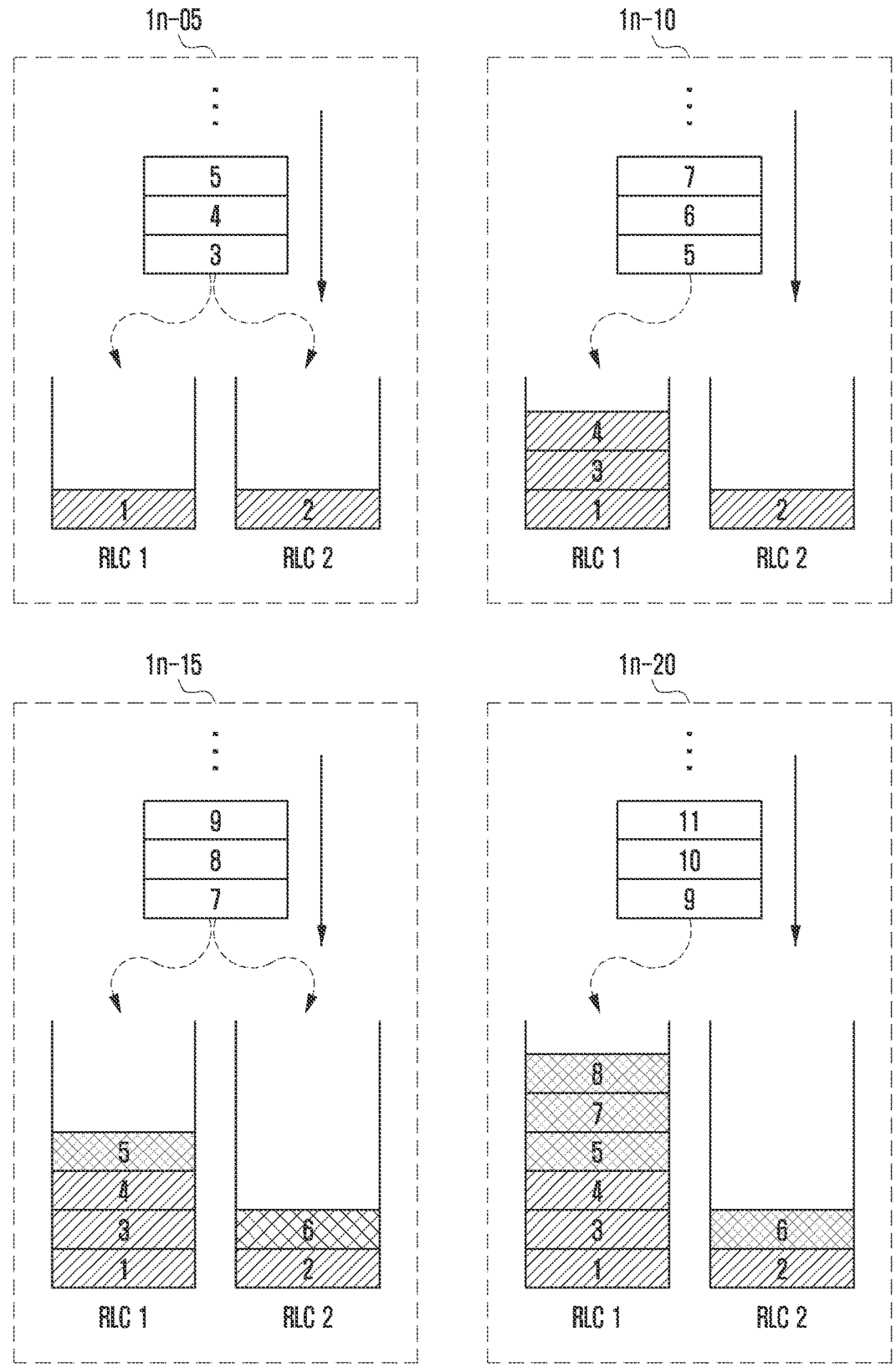
FIG. 1N is a diagram illustrating operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-5 of the disclosure.
Figure 10:
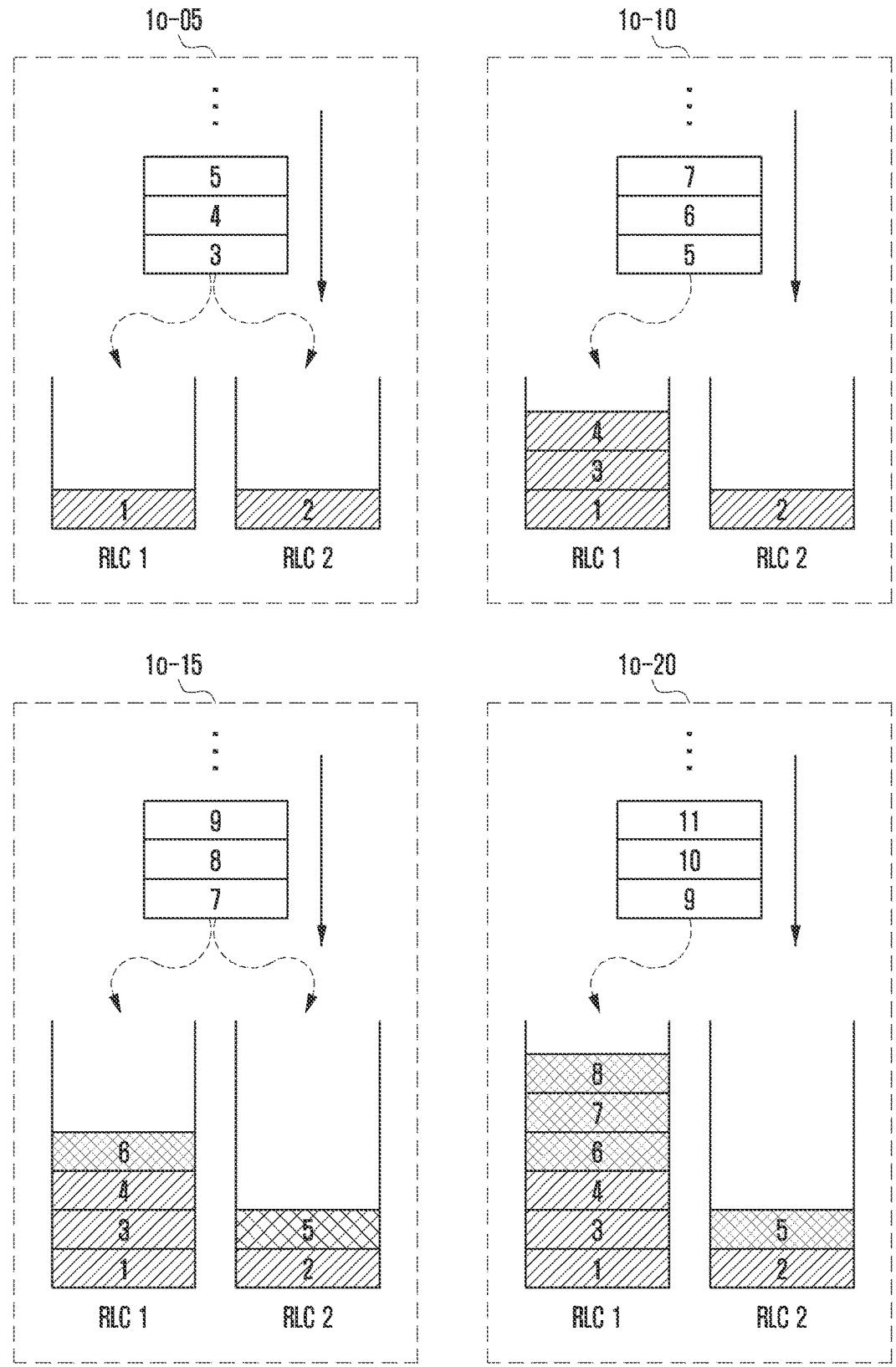

FIG. 1N shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-5 of the disclosure.

FIG. 1N is a diagram illustrating an order and a method for a PDCP entity to send data packets to a first RLC entity and a second RLC entity according to a predetermined ratio. In the disclosure, it is assumed that the predetermined ratio between the first and second RLC entities is 3:1.

Even when the predetermined ratio is given as x:y, embodiment 1-3-5 may be applied in the same manner. In the disclosure, it is assumed that the ratio is 3:1 for convenience of explanation. In embodiment 1-3-5, the PDCP entity first assigns 1 packet to the first RLC entity and then 1 packet to the second RLC entity at step 1n-05 and assigns 2 packets to the first RLC entity at step 1n-10 according to the ratio of 3:1. Next, the PDCP entity first assigns 1 packet to the first RLC entity and then 1 packet to the second RLC entity at step 1n-15 and assigns 2 packets to the first RLC entity at step 1n-20 to keep the ratio of 3:1. In embodiment 1-3-5, this procedure is repeated with the packets from the higher layer.

FIG. 1O shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-6 of the disclosure.

FIG. 1O is a diagram illustrating an order and a method for a PDCP entity to send data packets to a first RLC entity and a second RLC entity according to a predetermined ratio. In the disclosure, it is assumed that the predetermined ratio between the first and second RLC entities is 3:1.

Even when the predetermined ratio is given as x:y, embodiment 1-3-6 may be applied in the same manner. In the disclosure, it is assumed that the ratio is 3:1 for convenience of explanation. In embodiment 1-3-6, the PDCP entity first assigns 1 packet to the first RLC entity and then 1 packet to the second RLC entity at step 1o-05 and assigns 2 packets to the first RLC entity at step 1o-10. Net, the PDCP entity first assigns 1 packet to the second RLC entity and then 1 packet to the first RLC entity at step 1o-15 and assigns 2 packets to the first RLC entity at step 1o-20 to keep the ratio of 3:1. In embodiment 1-3-6, this procedure is repeated with the packets from the higher layer.

Figure 1P:
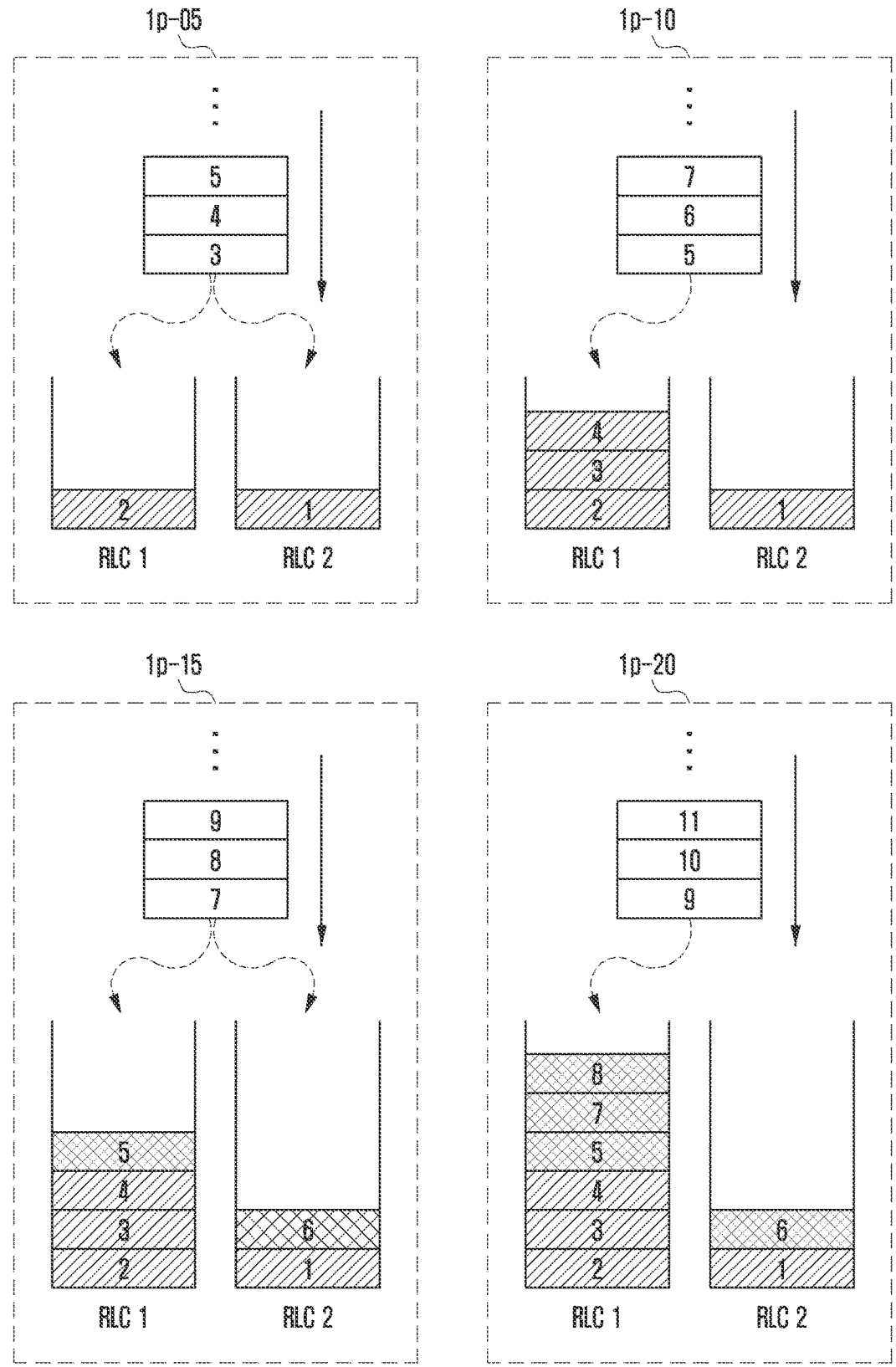
FIG. 1P is a diagram illustrating operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-7 of the disclosure.

FIG. 1P shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-7 of the disclosure.

FIG. 1P is a diagram illustrating an order and a method for a PDCP entity to send data packets to a first RLC entity and a second RLC entity according to a predetermined ratio. In the disclosure, it is assumed that the predetermined ratio between the first and second RLC entities is 3:1.

Even when the predetermined ratio is given as x:y, embodiment 1-3-7 may be applied in the same manner. In the disclosure, it is assumed that the ratio is 3:1 for convenience of explanation. In embodiment 1-3-7, the PDCP entity first assigns 1 packet to the second RLC entity and then 1 packet to the first entity at step 1p-05 and assigns 2 packets to the first RLC entity at step 1p-10 according to the ratio of 3:1. Next, the PDCP entity first assigns 1 packet to the first RLC entity and then 1 packet to the second RLC entity at step 1p-15 and assigns two packets to the first RLC entity at step 1p-20 to keep the ratio of 3:1. In embodiment 1-3-7, this procedure is repeated with the packets from the higher layer.

FIG. 1Q shows operations of a PDCP entity for sending data packets to a first RLC entity and a second RLC entity according to a predetermined split ratio, in embodiments 1-1 and 1-2 that embody methods for preprocessing data in a dual connectivity split bearer environment in a next generation mobile communication system, according to embodiment 1-3-8 of the disclosure.

FIG. 1Q is a diagram illustrating an order and a method for a PDCP entity to send data packets to a first RLC entity and a second RLC entity according to a predetermined ratio. In the disclosure, it is assumed that the predetermined ratio between the first and second RLC entities is 3:1.

Even when the predetermined ratio is given as x:y, embodiment 1-3-8 may be applied in the same manner. In the disclosure, it is assumed that the ratio is 3:1 for convenience of explanation. In embodiment 1-3-8, the PDCP entity first assigns 1 packet to the second RLC entity and then 1 packet to the first entity at step 1q-05 and assigns 2 packets to the first RLC entity at step 1q-10. Next, the PDCP entity first assigns 1 packet to the second RLC entity and then 1 packet to the first RLC entity at step 1q-15 and assigns 2 packets to the first RLC entity at step 1q-20 to keep the ratio of 3:1. In embodiment 1-3-8, this procedure is repeated with the packets from the higher layer.

Figure 1R:
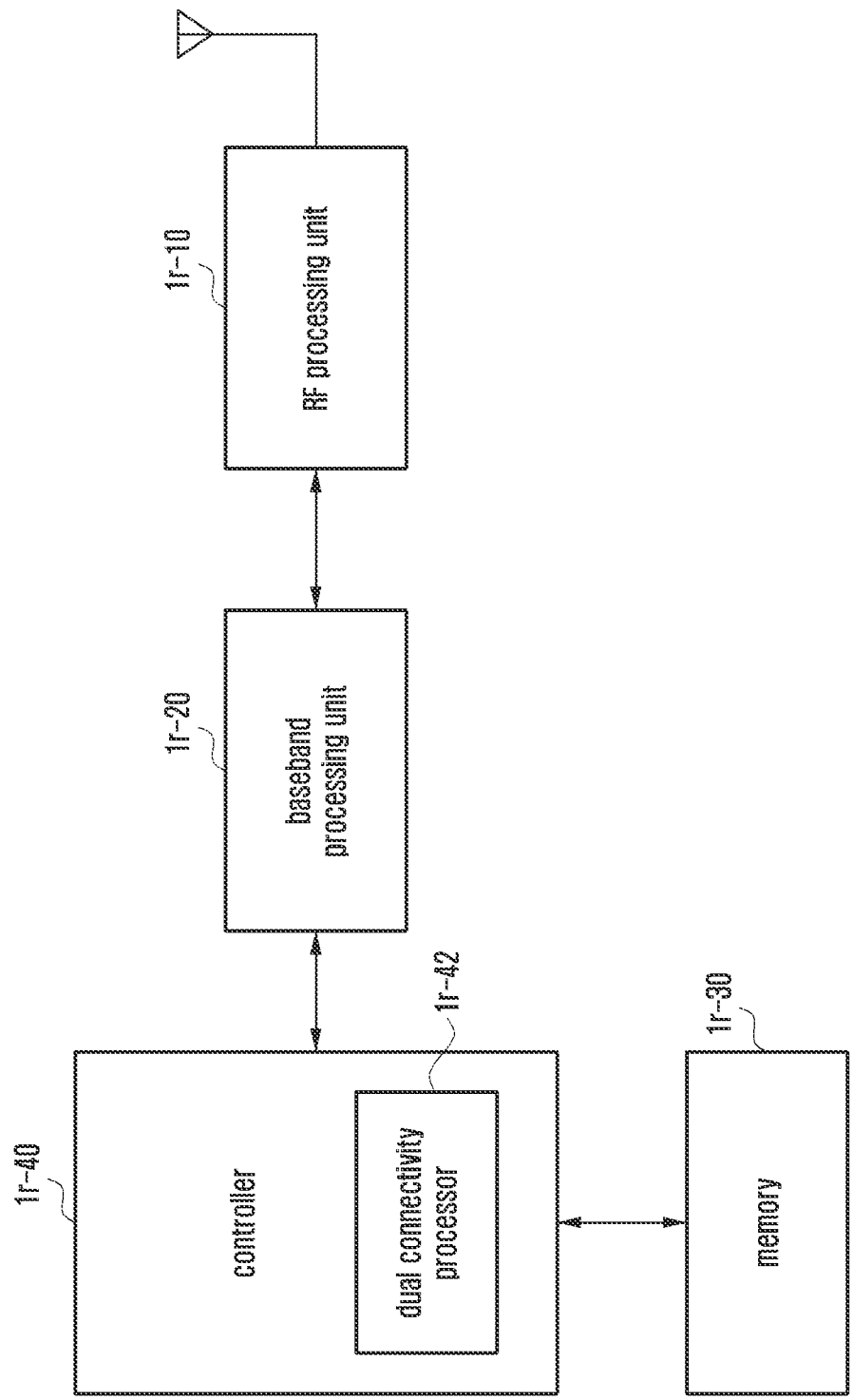
FIG. 1R is a block diagram illustrating a configuration of a UE according to an embodiment of the disclosure.

FIG. 1R is a block diagram illustrating a configuration of a UE according to an embodiment of the disclosure.

In reference to FIG. 1R, the UE includes a radio frequency (RF) processing unit 1r-10, a baseband processing unit 1r-20, a memory 1r-30, and a controller 1r-40.

The RF processing unit 1r-10 takes charge of signal band conversion and amplification for transmitting signals over a radio channel. That is, the RF processing unit 1r-10 up-converts a baseband signal output from the baseband processing unit 1r-20 to an RF band signal for transmission through an antenna and down-converts an RF band signal received through the antenna to a baseband signal. For example, the RF processing unit 1r-10 may include a transmission filter, a reception filter, an amplifier, a mixer, an oscillator, a digital-to-analog converter (DAC), and an analog-to-digital convertor (ADC). Although one antenna is depicted in the drawing, the terminal may include a plurality of antennas.

The RF processing unit 1r-10 may include a plurality of RF chains. The RF processing unit 1r-10 may perform beamforming. For beamforming, the RF processing unit 1r-10 may adjust the phases and sizes of the signal transmitted/received through the antennas or antenna elements. The RF processing unit 1r-10 may perform a MIMO operation to receive a signal on multiple layers.

The RF processing unit 1r-10 may configure a plurality of antennas or antenna elements appropriately to perform reception beam sweeping and adjust a reception direction and width for matching with the transmission beam under the control of the controller.

The baseband processing unit 1r-20 takes charge of conversion between baseband signals and bit strings according to a physical layer protocol of the system. For example, the baseband processing unit 1r-20 performs encoding and modulation on the transmit bit strings to generate complex symbols in data transmission mode.

The baseband processing unit 1r-20 also performs demodulation and decoding on a baseband signal from the RF processing unit 1r-10 to recover the received bit strings in data reception mode. For the case of an orthogonal frequency division multiplexing (OFDM) system, the baseband processing unit 1r-20 performs encoding and modulation on the transmit bit string to generate complex symbols, maps the complex symbols to subcarriers, performs inverse fast Fourier transform (IFFT) on the subcarriers, and inserts a cyclic prefix (CP) to generate OFDM symbols in the data transmission mode.

The baseband processing unit 1r-20 splits the baseband signal from the RF processing unit 1r-10 into OFDM symbols, recovers the signals mapped to the subcarriers through fast Fourier transform (FFT), and performs demodulation and decoding to recover the bit strings in the data reception mode.

The baseband processing unit 1r-20 and the RF processing unit 1r-10 take charge of transmitting and receiving signals as described above. Accordingly, the baseband processing unit 1r-20 and the RF processing unit 1r-10 may be referred to as a transmission unit, a reception unit, a transceiver, or a communication unit. At least one of the baseband processing unit 1r-20 and the RF processing unit 1r-10 may include a plurality of communication modules for supporting different radio access technologies.

At least one of the baseband processing unit 1r-20 and the RF processing unit 1r-10 may include a plurality of communication modules for processing different frequency band signals. Examples of the radio access technologies include WLAN (e.g., IEEE 802.11) and cellular network (e.g., LTE). Examples of the different frequency bands may include super high frequency (SHF) band (e.g., 2.5 GHz and 5 GHz) and millimeter wave (mmWave) bands (e.g., 60 GHz).

The memory 1r-30 stores basic programs for operation of the terminal, application programs, and data such as configuration information. The memory 1r-30 provides the stored data in response to a request from the controller 1r-40.

The controller 1r-40 controls overall operations of the terminal. For example, the controller 1r-40 controls the baseband processing unit 1r-20 and the RF processing unit 1r-10 to transmit/receive signals. The controller 1r-40 also writes and reads data to and from the memory 1r-30. In order to accomplish this, the controller 1r-40 may include at least one processor. For example, the controller 1r-40 may include a communication processor (CP) for controlling communication and an application processor (AP) for providing higher layer processing, e.g., application layer protocol processing.

Figure 1S:
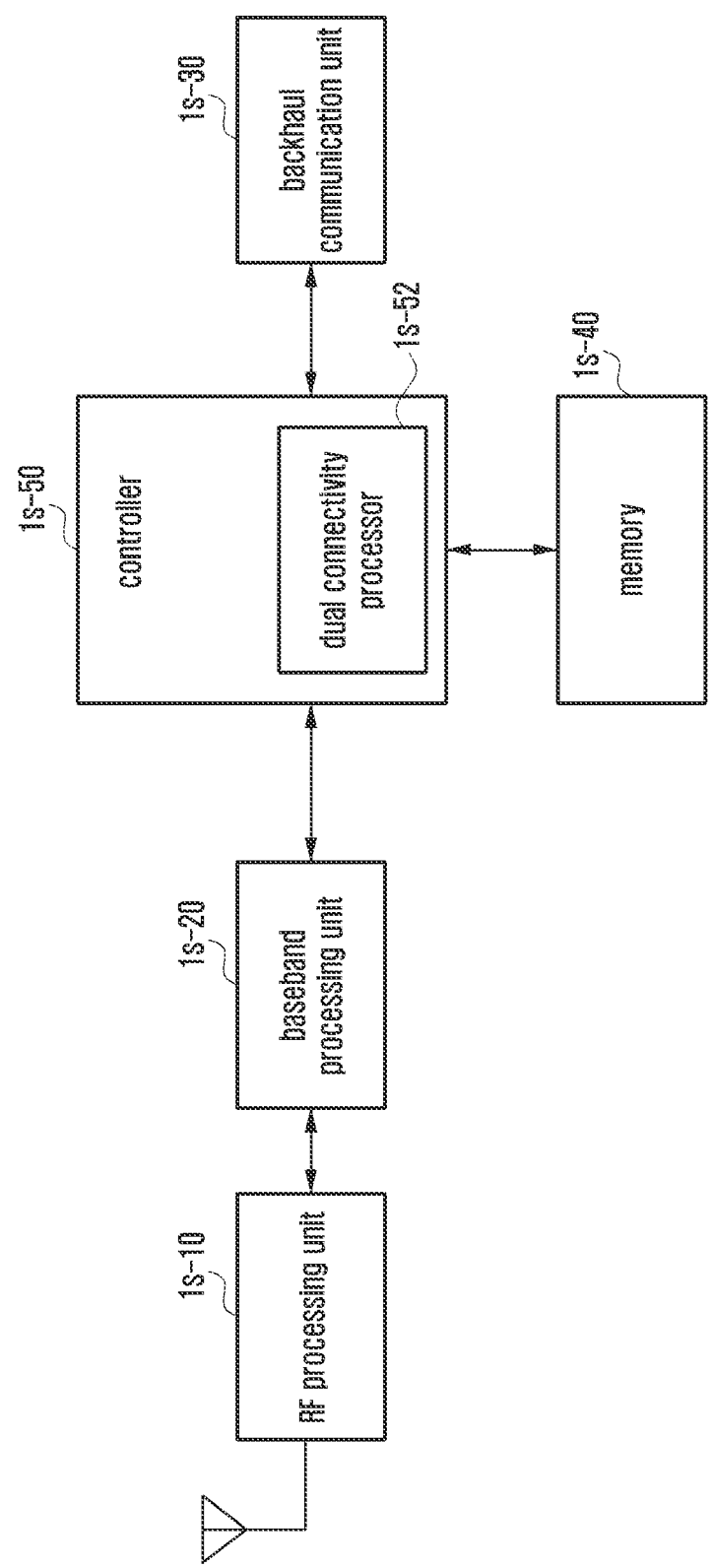
FIG. 1S is a block diagram illustrating a TRP in a wireless communication system according to an embodiment of the disclosure.

FIG. 1S is a block diagram illustrating a TRP in a wireless communication system according to an embodiment of the disclosure.

As shown in the drawing, the base station includes an RF processing unit 1s-10, a baseband processing unit 1s-20, a backhaul communication unit 1s-30, a memory 1s-40, and a controller 1s-50.

The RF processing unit 1s-10 takes charge of signal band conversion and amplification for transmitting signals over a radio channel. That is, the RF processing unit 1s-10 up-converts a baseband signal output from the baseband processing unit 1s-20 to an RF band signal for transmission through antennas and down-converts an RF band signal received through the antennas to a baseband signal.

For example, the RF processing unit 1s-10 may include a transmission filter, a reception filter, an amplifier, a mixer, an oscillator, a DAC, and an ADC. Although one antenna is depicted in FIG. 1S, the base station may include a plurality of antennas. The RF processing unit 1s-10 may include a plurality of RF chains. The RF processing unit 1s-10 may perform beamforming. For beamforming, the RF processing unit 1s-10 may adjust the phases and sizes of the signal transmitted/received through the antennas or antenna elements. The RF processing unit 1s-10 may perform a downlink MIMO operation to transmit a signal on multiple layers.

The baseband processing unit 1s-20 takes charge of converting between baseband signals and bit strings according to a physical layer protocol of the system. For example, the baseband processing unit 1s-20 performs encoding and modulation on the transmit bit strings to generate complex symbols in data transmission mode. The baseband processing unit 1s-20 also performs demodulation and decoding on the baseband signal from the RF processing unit 1s-10 to recover the received bit strings in data reception mode.

For the case of an OFDM system, the baseband processing unit 1s-20 performs encoding and modulation on the transmit bit string to generate complex symbols, maps the complex symbols to subcarriers, performs IFFT on the subcarriers, and inserts a CP to generate OFDM symbols in the data transmission mode. The baseband processing unit 1s-20 splits the baseband signal from the RF processing unit 1s-10 into OFDM symbols, recovers the signals mapped to the subcarriers through FFT, and performs demodulation and decoding to recover the bit strings in the data reception mode.

The baseband processing unit 1s-20 and the RF processing unit 1s-10 take charge of transmitting and receiving signals as described above. Accordingly, the baseband processing unit 1s-20 and the RF processing unit 1s-10 may be referred to as a transmission unit, a reception unit, a transceiver, or a communication unit.

The backhaul communication unit 1s-30 provides an interface for communication with other network nodes.

The memory 1s-40 stores basic programs for operation of the base station, application programs, and data such as configuration information. In particular, the memory 1s-40 may store the information on the bearers allocated to the connected terminal and a measurement result reported by the terminal. The memory 1s-40 may also store the information as criteria for determining whether to enable or disable multi-connectivity for the terminal. The memory 1s-40 provides the stored data in response to a request from the controller 1s-50.

The controller 1s-50 may control overall operations of the base station. For example, the controller 1s-50 controls the baseband processing unit 1s-20, the RF processing unit 1s-10, and the backhaul communication unit 1s-30 for transmitting/receiving signals. The controller 1s-50 also writes and reads data to and from the memory 1s-40. In order to accomplish this, the controller 1s-50 may include at least one processor.

Second Embodiment

In the following description, the term "dual-registered" denotes that a UE is registered with two or more mobile communication systems to receive a service. In the legacy LTE system, a UE in a registered state, i.e., EMM-registered state, may be in a standby mode or a connected mode at the RRC level. In the disclosure, a similar principle is assumed for the next generation mobile communication system. The dual-registered technique may be exploited for inter-system handover or carrier aggregation between heterogeneous systems.

FIG. 2A is a diagram for conceptually explaining the inter-system handover by applying a dual-registered technique in a next generation mobile communication system.

In the legacy inter-system handover, a source system requests to a target system for a handover using a backhaul network. If the target system accepts the request, it prepares resources for a UE to be handed over and transmits configuration information necessary for the handover to the source system. The source system provides the UE moving to the target system with the configuration information necessary for the handover.

In the case of applying the dual-registered technique to inter-system handover, when a UE moves from one system to another system, it performs an attach procedure to the target system rather than the legacy handover procedure. In the disclosure, a base station of a next generation mobile communication system is referred to as gNB, and a base station of the LTE system is referred to as eNB. The term "attach" denotes a procedure for a UE to register itself with a system. In this case, the UE may maintain its connection to a previous source system.

The dual-registered technique is advantageous in terms of negating the need of an interoperation between the source and target systems that is performed in legacy handover technologies. This means minimizing the necessity of defining inter-system interfaces and upgrading legacy systems and makes it possible to reduce inter-system signaling overhead.

In order to support the dual-registered technique, the networks of the source and target systems are connected to a network (NW) entity called common IP anchor, which routes data from a data network to a UE.

Whether to maintain the connection to the old source system depends on the capability of the UE. If the UE has multiple radios, it is not necessary to break connection to the source system under the constraint of the number of radios. Typically, in the legacy LTE system, a few hundred ms are required. Thus, if the UE communicates necessary data while maintaining the connection to the old source system, no service interruption occurs in the middle of the attach operation. However, if the UE has one radio, the connection to the source system may not be maintained. This means that the UE may not be served by the source system because the radio should be used for attaching to the target system. Even in this case, it may be possible to maintain the connection to the source system via time division multiplexing (TDM). However, this may cause a certain degree of service quality degradation such as time delay and data rate reduction.

FIG. 2B is a signal flow diagram illustrating signal flows in a case where a UE moves from a service area of a next generation mobile communication system to a service area of a legacy stem system according to an embodiment of the disclosure.

A gNB 2b-04 and a UE 2b-02 located in the service area of the gNB 2b-04 exchange their capability information indicating whether they support dual registration at step 2b-13. The gNB notifies UEs located within its service area whether the next generation mobile communication system supports dual-registration by broadcasting system information. The UE notifies the gNB whether it supports dual registration via dedicated signaling.

At step 2b-14, the gNB configures LTE frequency measurement to the UE. The configuration information may include an LTE frequency measurement periodicity and a time period for measuring on the LTE frequency at the periodicity. Upon receipt of the configuration information, the UE may perform measurement on the LTE frequency during the measurement period at step 1b-16. The UE may also perform measurement on the LTE frequency at an appropriate timing that is autonomously determined. An example of the appropriate timing is a time period during which no data are exchanged with the gNB.

In order to perform measurement on the LTE frequency, the UE turns on an LTE modem. If the UE has a dual radio, it may maintain the turn-on state of the LTE modem or turn on and off the LTE modem for starting and ending the measurement at every LTE frequency measurement occasion. Alternatively, the UE supporting dual registration may perform measurement on the LTE frequency without any configuration from the gNB. However, in this case, the UE may be able to perform measurement on the LTE frequency only at appropriate timings that are autonomously determined by itself.

The UE reports a measurement result to the gNB at step 2b-18. The gNB determines at step 2b-20 whether to configure dual registration or inter-RAT (Radio Access Technology) handover based on the measurement result and other information.

The gNB configures dual registration to the UE at step 2b-22. In this case, a dedicated control plane message (dual-registered initialization) is used. Upon receipt of this message, the UE performs dual registration.

This message may include information on a frequency or cell of the LTE system to which the UE has to attempted to attach. It may also be possible for this message to provide a list of frequencies or cells in order for the UE to select one of the frequencies or cells contained in the list and attach thereto. The frequency or cell may be identified with a frequency bandwidth, center frequency information, or a cell ID (Physical cell ID or ECGI). In order to reduce the time required for the UE to attach, the message may include partial system information of an LTE system cell 2b-06. The partial system information is essential information for use in accessing a target system. The essential system information is information belonging to MIB, SIB1, SIB2, SIB3, SIB4, and SIB5 being broadcast by the LTE cell.

In more detail, the information may include a list of public land mobile networks (PLMNs) supported by the LTE system cell, a tracking area code, a closed subscriber group (CSG) cell ID, a list of frequency bands supported by a target system cell and spectrum emission information, access barring-related information (e.g., ACB, EAB, SSAC, and ACDC), configuration information associated with random access to the LTE system cell, and cell reselection prioritization information.

The essential system information of the LTE system cell may be reported along with a cell measurement report according to a request from the gNB, or the gNB may always collect system information of neighboring LTE system cells from specific UEs within a service area using a self-configuring and self-optimizing network (SON) technology.

Upon receipt of the dual-registered initialization message, the UE starts a predetermined timer at step 2b-24. If the UE that has received the dual-registered initialization message has the dual radio, it may perform attach to the LTE system while maintaining the connection to the gNB. The term "dual radio" denotes having two RF chains; thus, it is possible to have data communications via separate RF chains corresponding to the next generation mobile communication system modem and the LTE modem.

If the UE has a single radio, it may use only one communication modem for data communication at a time. In order to maintain the connection to the gNB even in this case, it may be possible to operate in a time divisional manner. The UE with a signal radio may release the connection to the gNB to perform attach to the LTE system.

If a specific procedure (attach to the target LTE system) is not completed before expiry of the timer, it is assumed that the dual-registration procedure has failed. Whether an RRC message including an attach accept (ATTACH ACCEPT) message is received from a MME 2b-10 determines whether the attach to the target LTE system succeeds.

At step 2b-26, the UE may directly acquire system information broadcast by the target LTE cell. At step 2b-28, the UE attempts a random access to the target LTE cell.

If it fails to either acquire the essential system information of the target LTE cell or succeed with the random access after a predetermined number of tries, the UE may report the failure to the gNB at step 2b-30. Upon receipt of the failure report, the gNB may trigger an inter-RAT handover or retry the dual registration with another LTE frequency or cell.

The failure report may include access-failed frequency information or cell ID information and a failure cause. Examples of the failure cause may include system information acquisition failure, random access failure, and expiry of the specific timer.

The UE transmits an attach request (ATTACH REQUEST) message to the MME at step 2b-34 using a non-access stratum (NAS) container of an RRC Connection Setup Complete message, while performing, at step 2b-32, an RRC Connection Establishment procedure with the target LTE cell 2b-06.

The ATTACH REQUEST message includes an indicator indicating that the UE is performing the dual registration to the LTE system. It may also be possible to further indicate whether the dual registration is requested for inter-RAT mobility or inter-RAT aggregation.

If the dual registration is requested for the inter-RAT mobility, this means that the UE wants to move from a service area of a source system to a service area of another system. If the dual registration is requested for the inter-RAT aggregation, this means that the UE wants to improve a service throughput performance by establishing an extra connection to another system.

Upon receipt of the ATTACH REQUEST message including the indicator, the MME performs an S5 session establishment at step 2b-36 to request to the Common IP anchor 2b-12 for routing data to the LTE system rather than the next generation system.

In the case of the dual registration for the inter-RAT mobility, the Common IP anchor changes routings so as to forward all data to the target system. In the case of the dual registration for the inter-RAT aggregation, the Common IP anchor changes routings such that a part of the data is forwarded to the target system while the remaining data are still being transmitted to the source system.

Upon receipt of the request, the Common IP anchor switches the data flow in whole or in part from the LTE system to the next generation system at step 2b-44 and notifies an NG Core 2b-08 of the data routing configuration change at step 2b-46.

The NG Core notifies the gNB of the change at step 2b-48 in order for the gNB to release the connection to the UE. It may also be possible to stop data transfer to implicitly notify the NB Core of the data routing change. If no data are transmitted from a gateway to the gNB anymore, the gNB may release the connection to the UE after a predetermined time period elapses.

If the ATTACH REQUEST message is successfully received, the MME transmits an attach accept (ATTACH ACCEPT) message to the UE at step 2b-38. Upon receipt of this message, the UE assumes that the dual registration operation is successfully completed.

In this case, the UE stops the timer. Optionally, the UE may notify the gNB, at step 2b-40, that the dual registration is successfully completed using a predetermined message upon receipt of the ATTACH ACCEPT message. Upon receipt of this message, the gNB releases connection to the UE at step 2b-42. After the dual registration procedure is completed, releasing the connection to the next generation system may be performed in an implemental aspect of the UE. All that is required for the UE to maintain the connection to the next generation system is to generate uplink data.

As in the legacy LTE system, if a radio link failure (RLF) occurs in the next generation system after the dual registration operation is successfully completed, the UE declares RLF and either transmits an RLF report indicating whether it is dual-registered or makes no RLF report to the next generation system.

FIG. 2C is a signal flow diagram illustrating signal flows in a case where a UE moves from a service area of a next generation mobile communication system to a service area of a legacy LTE system according to an embodiment of the disclosure.

An eNB 2c-04 and a UE 2c-02 located in the service area of the eNB 2c-04 exchange their capability information indicating whether they support dual registration at step 2c-13.

The eNB notifies UEs located within its service area whether the LTE system supports dual-registration by broadcasting system information. The UE notifies the eNB whether it supports dual registration via UE capability information (UECapabilityInformation) as dedicated signaling.

At step 2c-14, the eNB configures next generation mobile communication (New Radio (NR)) frequency measurement to the UE. The configuration information may include an NR frequency measurement periodicity and a time period for measuring on the NR frequency at the periodicity.

Upon receipt of the configuration information, the UE may perform measurement on the NR frequency during the measurement period at step 1c-16. The UE may also perform measurement on the NR frequency at an appropriate timing that is autonomously determined. An example of the appropriate timing is a time period during which no data are exchanged with the eNB.

In order to perform measurement on the NR frequency, the UE turns on an NR modem. If the UE has a dual radio, it may maintain the turn-on state of the NR modem or turn on and off the NR modem for starting and ending the measurement at every NR frequency measurement occasion. Alternatively, the UE supporting dual registration may perform measurement on the NR frequency without any configuration from the eNB. However, in this case, the UE may be able to perform measurement on the NR frequency only at appropriate timings that are autonomously determined by itself.

The UE reports a measurement result to the eNB at step 2c-18. The eNB determines at step 2c-20 whether to configure dual registration or inter-RAT handover based on the measurement result and other information.

The eNB configures dual registration to the UE at step 2c-22. For this purpose, the eNB uses an RRC Connection Reconfiguration (RRCConnectionReconfiguration) message or an RRC Connection Release (RRCConnectionRelease) message.

If the RRCConnectionRelease message is received, this means that the UE releases the connection to the source cell, and the source cell transmits this message to the UE only when it determines that releasing the connection to the terminal is preferable.

For example, if the UE has a single radio that cannot establish connections with two systems simultaneously and does not support any time division multiplexing scheme for making it possible to establish connections with two systems, the eNB transmits the RRCConnectionRelease message.

If at least one of the above messages is received, the UE performs dual registration. The above messages may indicate an NR system frequency or cell to which the UE has to attempt to attach to. The above messages also provide a list of frequencies or cells in order for the UE to select one of the frequencies or cells contained in the list and attach thereto. The frequency or cell may be identified with a frequency bandwidth, center frequency information, and a cell ID (Physical cell ID or ECGI).

In order to reduce the time required for the UE to attach, the message may include partial system information of an NR system cell 2c-06. The partial system information is essential information for use in accessing a target system. The essential system information may include a list of PLMNs supported by the NR system cell, a Tracking Area Code, a closed subscriber group (CSG) cell ID, a list of frequency bands supported by a target system cell and spectrum emission information, access barring-related information (e.g., ACB, EAB, SSAC, and ACDC), configuration information associated with random access to the LTE system cell, and cell reselection prioritization information.

The essential system information of the NR system cell may be reported along with a cell measurement report according to a request from the eNB, or the eNB may always collect system information of neighboring NR system cells from specific UEs with a service area using a SON technology.

Upon receipt of the dual-registered initialization message, the UE starts a predetermined timer at step 2c-24. If a predetermined procedure (procedure for attach to the target NR system) is not completed before the timer expires, it is assumed that the dual-registration procedure has failed. Whether an RRC message including an ATTACH ACCEPT message is received from a NG Core 2c-10 determines whether the attach to the target NR system succeeds.

At step 2c-26, the UE may directly acquire system information broadcast by the target NR cell. At step 2c-28, the UE attempts a random access to the target NR cell. If it fails to either acquire the essential system information of the target NR cell or succeed with the random access after a predetermined number of tries, the UE may report the failure to the eNB at step 2C-30.

Upon receipt of the failure report, the eNB may trigger an inter-RAT handover or retry the dual registration with another NR frequency or cell. The failure report may include access-failed frequency information or cell ID information and a failure cause. Examples of the failure cause may include system information acquisition failure, random access failure, and expiry of the specific timer.

The UE transmits an ATTACH REQUEST message to the NG core at step 2c-34 using a non-access stratum (NAS) container of a specific control plane message, while performing, at step 2c-32, an RRC Connection Establishment procedure with the target NR system cell.

The ATTACH REQUEST message includes an indicator indicating that the UE is performing the dual registration to the NR system. Upon receipt of the ATTACH REQUEST message including the indicator, the NG Core performs a S5 session establishment at step 2c-36 to request to the Common IP anchor 2c-12 for routing data to the NR system rather than the LTE system.

Upon receipt of the request, the Common IP anchor switches the data flow in whole or in part from the NR system to the LTE system at step 2c-44 and notifies the MME 2b-08 of the data routing configuration change at step 2c-46.

The MME notifies the eNB of the change at step 2c-48 in order for the eNB to release the connection to the UE. It may also be possible to stop data transfer to implicitly notify the NB Core of the data routing change. If no data are transmitted from a gateway to the eNB anymore, the eNB may release the connection to the UE after a predetermined time period elapses.

If the ATTACH REQUEST message is successfully received, the MME transmits an ATTACH ACCEPT message to the UE at step 2c-38. Upon receipt of this message, the UE assumes that the dual registration operation is successfully completed.

In this case, the UE stops the timer. Optionally, the UE may notify the eNB, at step 2c-40, that the dual registration is successfully completed using a predetermined message upon receipt of the ATTACH ACCEPT message. Upon receipt of this message, the gNB releases connection to the UE at step 2c-42.

After the dual registration procedure is completed, releasing the connection to the NR system may be performed in an implemental aspect of the UE. All that is required for the UE to maintain the connection to the LTE system is to generate uplink data. If an RLF occurs in the LTE system after the dual registration operation is successfully completed, the UE declares RLF and either transmits an RLF report indicating whether it is dual-registered or makes no RLF report to the next generation system.

FIG. 2D is a flowchart illustrating a procedure for a network to determine initialization of a dual-registered operation.

A source system determines at step 2d-02 that a UE needs to establish a connection with another system based on measurement information reported by the UE and other information. The source system determines at step 2d-04 whether an interface for interoperating with the other system is implemented. It is assumed that it is inevitable to have an interface for supporting inter-RAT handover, and the interface includes at least one of an interface between an NG Core and an MME, an interface between a gNB and the MME, or an interface between the NG Core and an eNB.

If the interface exists, this means that the inter-RAT handover is supported and, in this case, it may be possible to configure the handover to the UE at step 2d-10. If the interface does not exist, a dual-registration operation should be configured. Even when the source system has the interface, the dual-registration operation may be configured for the purpose of reducing signaling overhead.

The source system determines at step 2d-06 whether the UE supports the dual radio. The UE transmits corresponding information to the source system in advance. If the UE has the dual radio, it attempts to attach to a target system at step 2d-16 while maintaining the connection to the current system. The reason for maintaining the connection is to avoid any service interruption by continuing to communicate data even while performing the attach procedure.

If the UE has the dual radio, the source system determines at step 2d-08 whether the source system and the UE support a time division solution. The time division solution is a technique for communication of data with one system at a time. It may be assumed that the UE supporting the dual registration must support the time division solution.

If the source system and the UE support the time division solution, the UE maintains the connection to the source system to communicate data in a time divisional manner. Data transmission/reception timings of the source and target systems may be overlapped. In this case, one of the two systems performs data communication according to a predetermined rule. If the source system and the UE do not support the time division solution, the UE releases the connection to the source system and performs an attach operation at step 2d-12.

FIG. 2E is a diagram for explaining scenarios where a dual-registered UE is in an idle mode in two respective systems.

In various situation, the dual-registered UE may be in the idle mode in both the two registered systems. For example, a UE may be connected to a next generation mobile communication system (New Ratio (NR) or New RAT) for receiving a data service. If the terminal moves to a neighboring LTE system, the NR system may trigger dual registration of the UE. In this case, the UE performs an ATTACH procedure to the LTE system.

Through the ATTACH procedure, the UE registers itself with the LTE system. In order to avoid service interruption, the UE may maintain the connection to the NR system and continue data transmission. If a predetermined time elapses after establishing the connection to the LTE system, the UE releases the connection to the NR system. In this case, the UE may transition to the idle mode in the NR system or deregister itself through a DETACH procedure.

Assuming that the UE transitions to the idle mode, the UE may transition to the idle mode or deregister itself through the DETACH procedure even in the LTE system after completing the data communication with the LTE system. If the UE transitions to the idle mode in the LTE system too, the UE is in the idle mode in both the two systems.

Transitioning to the idle mode in both the two systems has advantages and disadvantages. One of the advantages is that the UE can quickly transition to a connected mode in both the two systems. The network may select one of the two systems for delivery of paging based on a service type, a UE type (normal UE, machine type communication (MTC) UE, etc.), user subscription, etc. according to an optimization technique.

One of the disadvantages is that the UE has to monitor both the two systems for delivery of paging. The UE may also have to perform cell measurement separately according to system-specific discontinuous reception (DRX) configurations (paging cycle, etc.). This means an increase of power consumption of the UE.

In this regard, the disclosure proposes a method for saving power consumption of a dual-registered UE in the idle mode in both the two systems.

Figure 2F:
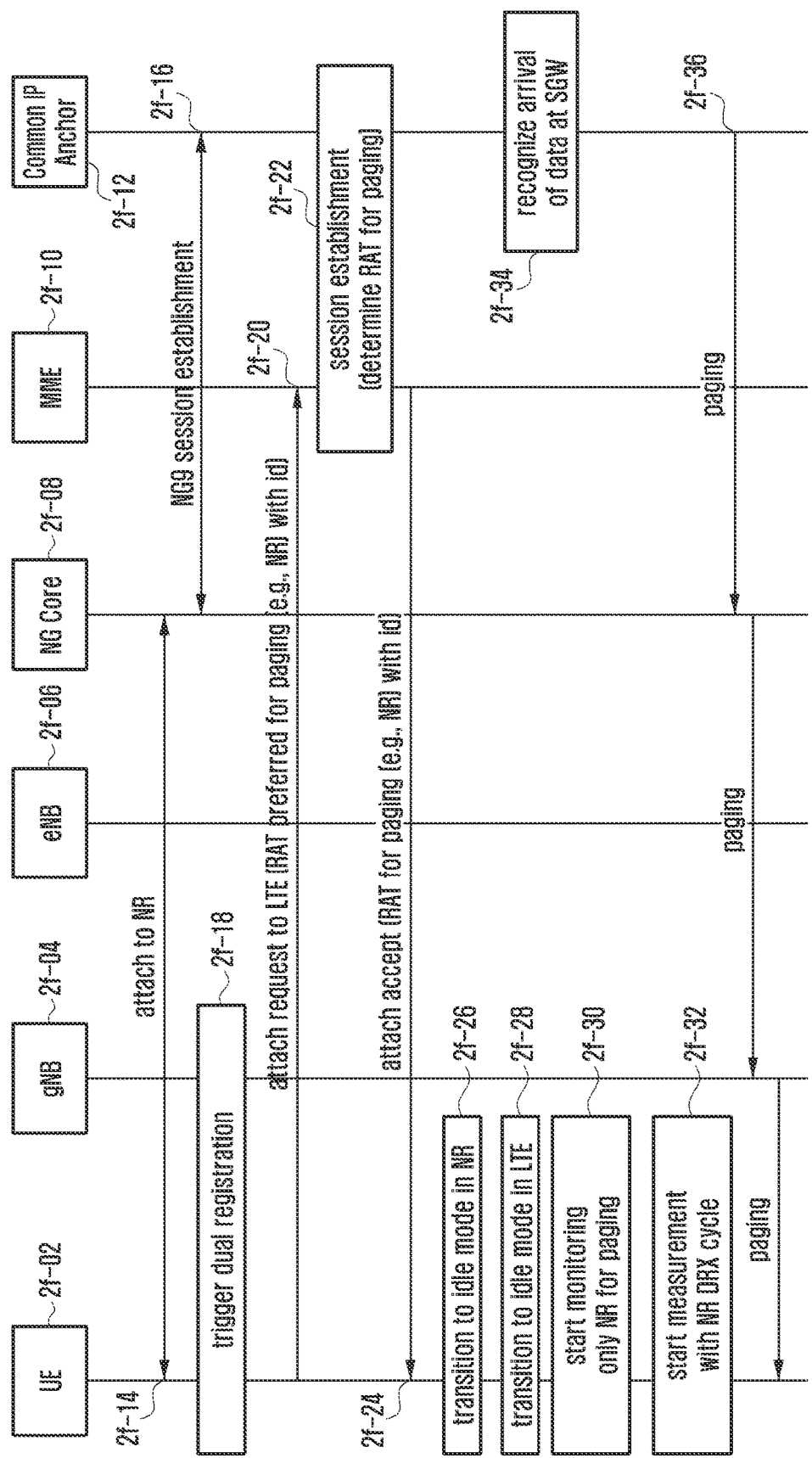
FIG. 2F is a signal flow diagram for explaining a first solution according to an embodiment of the disclosure.

FIG. 2F is a signal flow diagram for explaining a first solution according to an embodiment of the disclosure.

The first solution is characterized in that a UE or a network selects a system for delivery of paging such that paging is transmitted by the selected system.

At step 2f-14, the UE 2f-02 performs ATTACH to an NR system. Through this, the UE is registered with an NG Core 2f-08. At step 2f-16, the NG Core establishes a session with a Common IP Anchor 2f-12 for supporting the UE. The Common IP Anchor is connected to the NG Core and an MME and transmits the paging to the NG Core or the MME or routes data. The Common IP Anchor may be called different names in different standardized technologies.

At step 2f-18, the NR system configures dual registration with the LTE system to the UE. At step 2f-20, the UE transmits an ATTACH REQUEST message to the MME 2f-10. The ATTACH REQUEST message (NAS message) may include an ID (RAT id) indicating a system from which the UE wants to receive the paging.

At step 2f-22, the MME reports to the Common IP Anchor that the UE has entered the dual registration mode based on a message including the RAT ID received from the UE. A session is established between the MME and the Common IP Anchor for supporting the UE.

The Common IP Anchor determines a system for paging delivery to the UE. In order to make this determination, the Common IP Anchor uses a UE-preferred system, UE type, and user subscription information. The user subscription information is provided by a home subscriber server (HSS) and typically includes a user's configuration information (service agreement, etc.). The determined system is notified to the NG Core and MME. The NG Core or MME may determine the system and, in this case, it is necessary to notify the Common IP Anchor of the system selected for delivery of paging.

If the system for delivery of paging is determined, the Common IP Anchor notifies the MME and the NG Core of the determined system, and the MME or NG Core transmits, at step 2f-24, to the UE an NAS message including ID information indicating the system determined for delivery of paging.

At step 2f-26, the UE releases the connection to the NR system and transitions to the idle mode. At step 2f-28, the UE releases the connection to the LTE system and transitions to the idle mode. The transition to the idle mode in the two systems may be performed in reverse order or simultaneously. Typically, as the completion of the necessary data communication is delayed, the transition to the idle mode is delayed.

At step 2f-30, the UE in the idle mode in both the two systems monitors only the system notified by the MME for paging. For example, if the MME has notified the UE of the NR system, the UE monitors only the NR system for paging.

At step 2f-32, the UE performs cell measurement according to the DRX cycle of the NR system. Typically, the UE in the idle mode measures neighboring cells in every DRX cycle for supporting mobility. In the disclosure, it is characterized that the cells on which the UE performs measurement should include the frequency of the LTE cell on which the UE camped in the LTE system (system not monitored for paging).

At step 2f-34, the Common IP Anchor recognizes that data to be delivered to the UE has arrived from a serving gateway (S-GW) (or packet data network gateway (P-GW)).

At step 2f-36, the Common IP Anchor triggers paging and transmits paging to the NG Core. The NG Core transmits the paging to the UE via the gNB 2f-04. The S-GW (or P-GW) may directly report the arrival of the data to the NG Core and the MME. Because the NG Core and the MME also know which entity is to deliver the paging to the UE, the corresponding system may deliver the paging to the UE. In this case, the Commo IP Anchor is not involved.

Although the drawing shows that the MME receives the information on the system for delivery of paging from the UE or transmits the information on the determined system to the UE, the MME may be replaced by the NG Core.

Figure 2G:
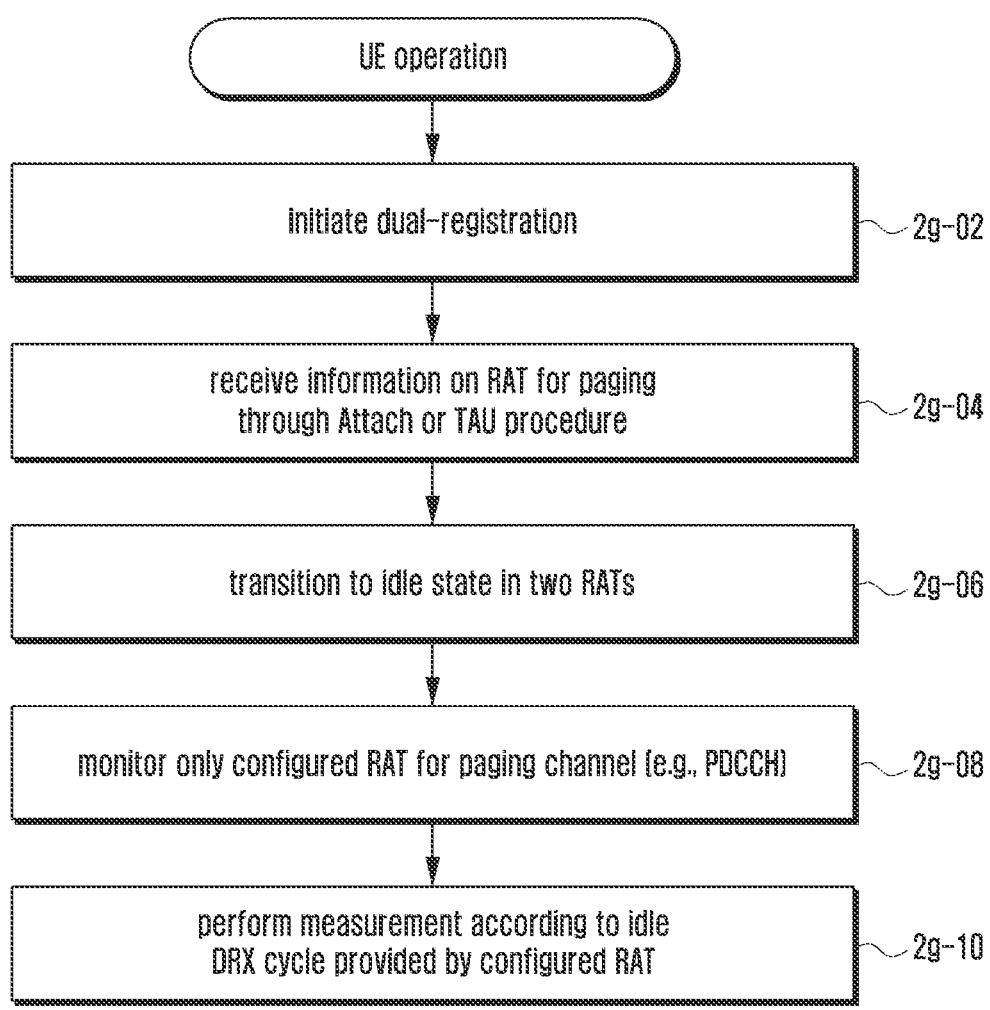
FIG. 2G is a flowchart illustrating operations of a UE in the first solution according to an embodiment of the disclosure.

FIG. 2G is a flowchart illustrating operations of a UE in the first solution according to an embodiment of the disclosure.

At step 2g-02, the UE initializes dual registration. The dual registration may be configured by a network or the UE when a predetermined condition is fulfilled. At step 2g-04, the UE receives information on the system for delivery of paging through an ATTACH or tracking area update (TAU) procedure. This information is received from at least one of two systems.

At step 2g-06, the UE transitions to the idle mode in both the systems. At step 2g-08, the UE monitors the system indicated by the information for paging. At step 2g-10, the UE performs cell measurement based on DRX configuration information of the system indicated by the information. The cell measurement should be performed even on the cell frequency of the other system in which the UE is in the idle mode. This aims to support idle mode mobility effectively in the other system.

Figure 2H:
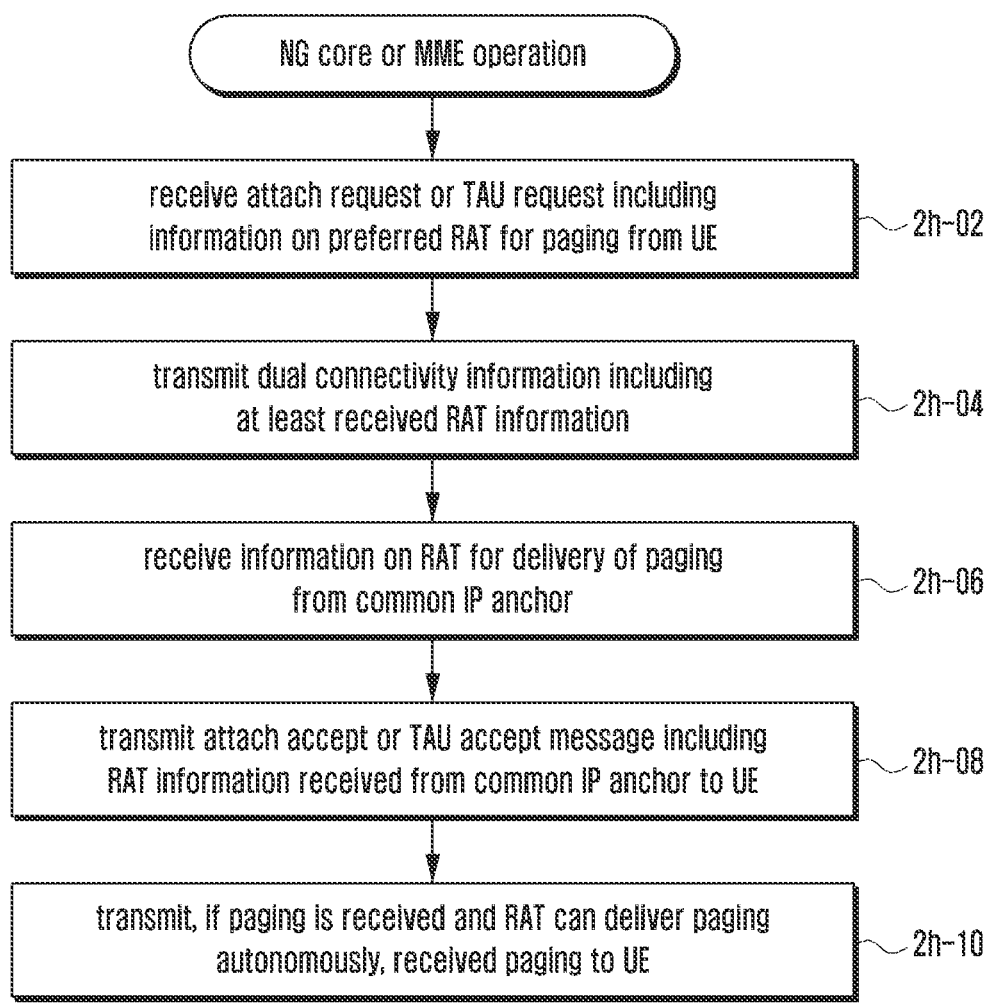
FIG. 2H is a flowchart for explaining operations of an NG Core or an MME in the first solution of the disclosure.

FIG. 2H is a flowchart for explaining operations of an NG Core or an MME in the first solution of the disclosure.

At step 2h-02, the NG Core or MME receives an ATTACH REQUEST or TAU REQUEST including information on the system for delivery of paging from a UE. An ATTACH procedure is a procedure for registering the UE with the NG Core or MME, and a TAU procedure is a procedure for notifying, when the terminal moves out of a tracking area (TA) consisting of one or more cells, the NG Core or MME of the move out of the TA. Upon receipt of the TAU REQUEST, the NG Core or MME notifies the UE of an appropriate TA and afterward transfers paging to the changed TA.

At step 2h-04, the NG Core or MME transmits dual registration-related information to the Common IP anchor, the dual registration-related information including information on the system for delivery of paging.

At step 2h-06, the NG Core or MME receives the information on the system for delivery of paging from the Common IP Anchor. The information includes an ID indicative of the system for delivery of paging. The system for delivery of paging may include at least one of an NR system or an LTE system. A system that is not indicated by the information is assumed to be a system not involving delivery of paging.

At step 2h-08, the NG Core or MME transmits an ATTCH ACCEPT or TAU ACCEPT message including information on the system for delivery of paging to the UE. At step 2h-10, if the NG Core or MME receives paging (or a report indicating that data to be delivered to the UE has arrived) from the S-GW, P-GW, or Common IP Anchor, it determines whether it is the system for delivery of paging and, if so, delivers the paging (or generates and transmits paging) to the UE via the gNB. If it is not the system for delivery of paging, the NG Core or MME discards the received paging.

Figure 2I:
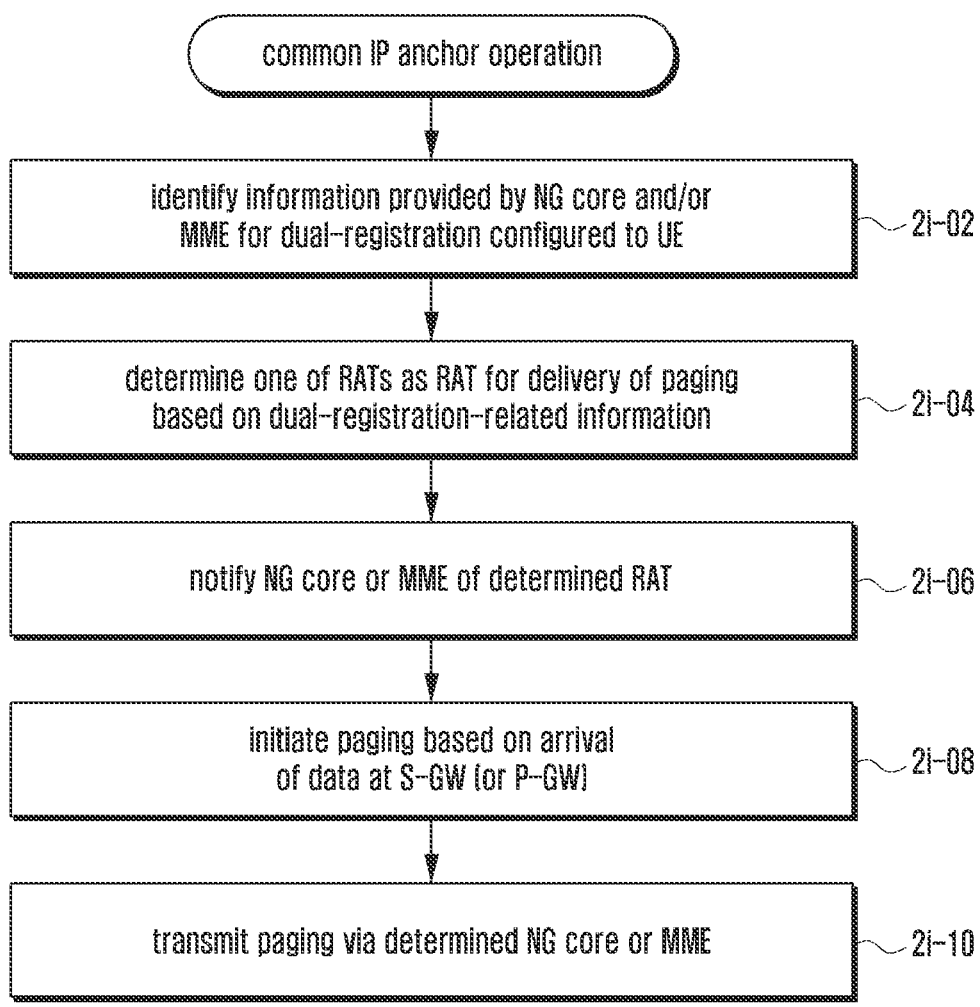
FIG. 2I is a flowchart for explaining operations of a Common IP Anchor in the first solution of the disclosure.

FIG. 2I is a flowchart for explaining operations of a Common IP Anchor in the first solution of the disclosure.

At step 2i-02, the Common IP Anchor recognizes that a UE has entered the dual registration mode based on information provided by the NG Core and MME.

At step 2i-04, the Common IP Anchor determines one of the NR system and the LTE system as a system for delivery of paging. In order to make this determination, the Common IP Anchor uses a UE-preferred system, UE type, and user subscription information. The user subscription information is provided by a home subscriber server (HSS) and typically includes a user's configuration information (service agreement, etc.).

At step 2i-06, the Common IP Anchor transmits information on the system determined for delivery of paging to the NG Core or MME. At step 2i-08, the Common IP Anchor detects arrival of data to be delivered to the UE at the S-GW or P-GW and generates pertinent paging. At step 2i-10, the Common IP Anchor transmits the paging to the NG Core or MME for delivery of the paging.

FIG. 2J is a signal flow diagram for explaining a second solution according to an embodiment of the disclosure.

The second solution is characterized in that the UE requests for a power saving mode (PSM) or an extended DRX (eDRX) to a system that is not involved in delivery of paging.

If the PSM or eDRX is configured, the UE monitors the PSM- or eDRX-configured system for paging with a very long cycle, thereby avoiding monitoring two systems unnecessarily frequently for paging.

At step 2j-14, the UE 2j-02 performs ATTACH to the NR system. Through this, the UE is registered with the NG Core 2j-08.

At step 2j-16, the NG Core establish a session with the Common IP Anchor 2j-12 for supporting the UE. The Common IP Anchor is connected to the NG Core and an MME and transmits the paging to the NG Core or the MME or routes data. The Common IP Anchor may be called different names in different standardized technologies.

At step 2j-18, the NR system configures dual registration with the LTE system to the UE. At step 2j-20, the UE transmits an ATTACH REQUEST message to the MME 2j-10. At step 2j-22, the MME reports to the Common IP Anchor that the UE has entered the dual registration mode. A session is established between the MME and the Common IP Anchor for supporting the UE.

At step 2j-24, the MME or NG Core transmits an NAS message to the UE. At step 2j-26, the UE releases the connection to the NR system and transitions to the idle mode. At step 2j-28, if the UE does not want to receive any paging from the LTE system, it requests to the LTE system for the PSM or eDRX. This request is made through an ATTACH or TAU procedure.

At step 2j-30, the UE receives PSM or eDRX configuration information from the MME. The UE performs a PSM or eDRX operation based on this configuration information. Although the description is directed to the case where the PSM or eDRX is applied to the LTE system in the disclosure, it may also be possible to apply the PSM or eDRX to the NR system instead of the LTE system in the same manner.

At step 2j-32, the UE releases the connection to the LTE system and transitions to the idle mode. The transition to the idle mode in the two systems may be performed in reverse order or simultaneously. Typically, as the completion of the necessary data communication is delayed, the transition to the idle mode is delayed.

At step 2j-34, the UE is in the idle mode in both the two systems and performs monitoring for paging in consideration of the PSM or eDRX configuration. Typically, if the PSM or eDRX is configured, paging monitoring is performed with a very long cycle, which reduces power consumption of the UE.

At step 2j-36, the UE performs cell measurement according to system-specific DRX cycles. The UE in the idle mode measures the neighboring cells in every DRX cycle for supporting mobility. For example, if the PSM or eDRX is configured, paging monitoring is performed with a very long cycle, and the UE can reduce power consumption. In the disclosure, it is characterized that the cells on which the UE performs measurement should include the frequency of the LTE cell on which the UE camped in the LTE system (system to which the PSM or eDRX has been applied).

At step 2j-38, the MME notifies the Common IP Anchor that the UE is configured with the PSM or eDRX in the LTE system. At step 2j-40, the Common IP Anchor recognizes that data to be delivered to the UE has arrived from the S-GW (or P-GW).

At step 2j-47, the Common IP Anchor triggers paging and transmits paging to the NG Core. The NG Core transmits the paging to the UE via the gNB 2j-04. The S-GW (or P-GW) may directly report the arrival of the data to the NG Core and the MME.

Depending on whether the PSM or eDRX has been applied, the NG Core and MME of the corresponding system may deliver the paging to the UE. In this case, the Common IP Anchor is not involved. The UE may receive paging from the system to which the PSM or eDRX has been applied. The UE may also receive the same paging from the other system. If the UE receives the paging from the two systems simultaneously, the UE may operate according to the paging from the system to which the PSM or eDRX has not been applied.

Although the drawing shows that the MME receives the information on the system for delivery of paging from the UE or transmits the information on the determined system to the UE, the MME may be replaced by the NG Core.

Figure 2K:
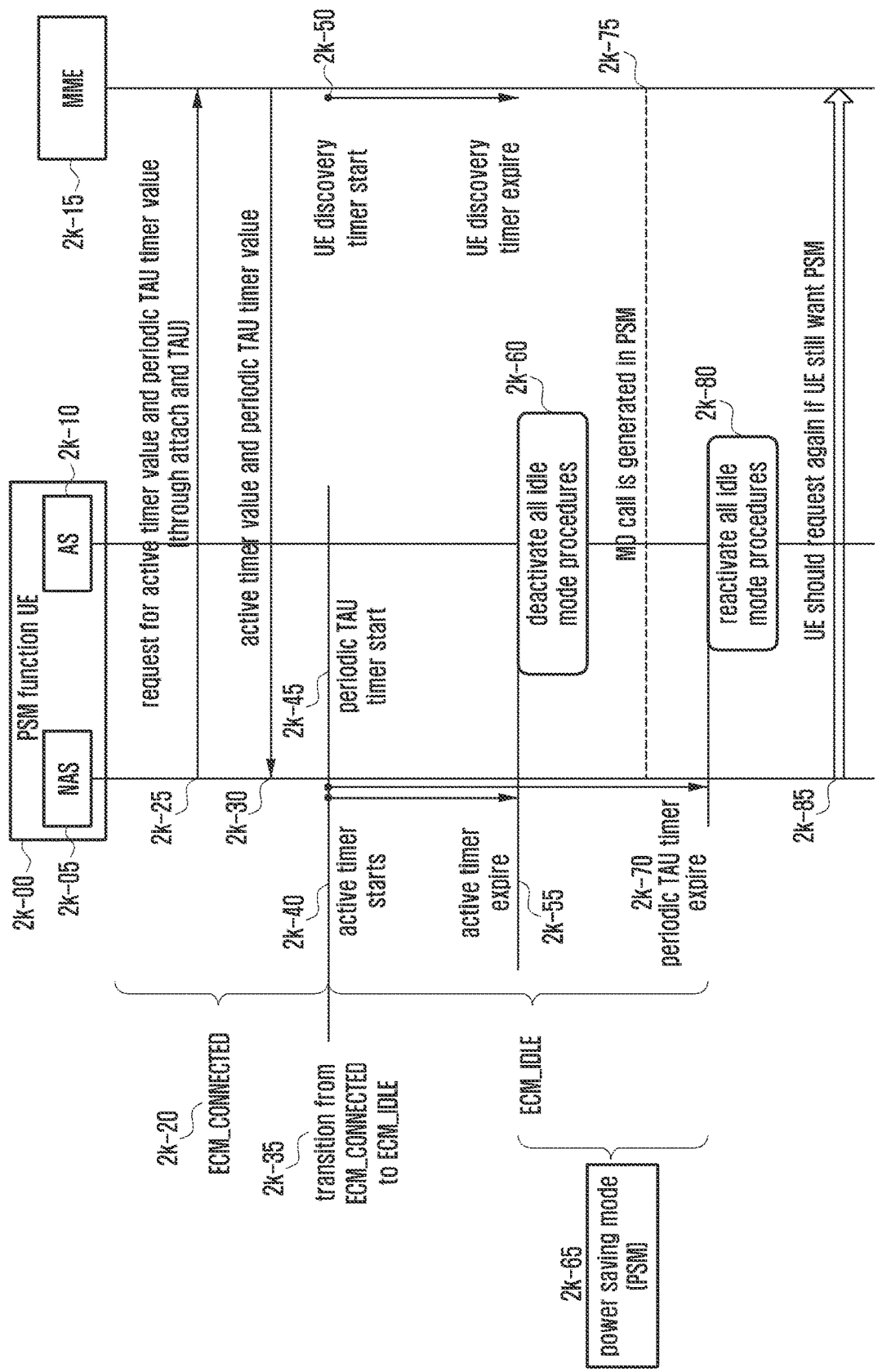
FIG. 2K is a signal flow diagram for explaining a power saving mode (PSM)

FIG. 2K is a signal flow diagram for explaining a power saving mode (PSM).

At step 2k-25, a UE 2k-00 supporting PSM requests to an MME 2k-15 of a network for PSM. This request is made when the UE performs ATTACH or TAU with the MME. ATTACH means a procedure for the UE to register itself with the MME.

The MME provides the UE with Registered PLMN and Equivalent PLMN information through the ATTACH procedure. The TAU procedure is performed for the UE to notify the network of its location. In the LTE standard technology, the network locates a UE by a TA for paging. A TA is a group of one or more cells. If a UE on the move enters a different TA, the UE notifies the network that it has entered a new TA. In order to perform the ATTACH and TAU procedures, it is necessary to communicate with an MME and this means that the UE has to transition from the idle mode to the connected mode at step 2k-20.

At step 2k-30, the MME accepts the PSM request from the UE and provides the UE two kinds of timer values. One is an active timer and the other is a periodic TAU timer. The two timers start at steps 2k-40 and 2k-45 upon transition from the connected mode to the idle mode at step 2k-35. Simultaneously, the MME starts a timer at step 2k-50.

The UE operates in the idle mode until the active timer expires. If the active timer expires, the UE enters, at step 2k-65, the PSM, in which, at step 2k-60, all idle mode operations and AS timers stop. If the periodic TAU timer expires at step 2k-70 or a mobile originating (MO) call is triggered at step 2k-75, the UE wakes up from PSM and enters the idle mode to perform idle mode operations at step 2k-80. If the UE wants to trigger PSM again, it has to request to the MME for PSM at step 2k-85.

The eDRX is newly employed in the LTE Rel-13 standard. The eDRX aims to monitor a physical downlink control channel (PDCCH) for paging with a cycle longer than the legacy DRX cycle. The eDRX specified in the LTE standard document TS36.304 is as follows.

7.3 Paging in Extended DRX

The UE may be configured by upper layers with an extended DRX (eDRX) cycle $T_{eDRX}$. The UE may operate in extended DRX only if the cell indicates support for eDRX in System Information.

If the UE is configured with a $T_{eDRX}$ cycle of 512 radio frames, it monitors POs as defined in 7.1 with parameter T=512. Otherwise, a UE configured with eDRX monitors POs as defined in 7.1 (i.e., based on the upper layer configured DRX value and a default DRX value determined in 7.1), during a periodic Paging Time Window (PTW) configured for the UE or until a paging message including the UE's NAS identity is received for the UE during the PTW, whichever is earlier. The PTW is UE-specific and is determined by a Paging Hyperframe (PH), a starting position within the PH (PTW_start), and an ending position (PTW_end). PH, PTW_start, and PTW_end are given by the following formulae.

The PH is the H-SFN satisfying the following equation:
H-SFN mod $T_{eDRX,H}$=(UE_ID_H mod $T_{eDRX,H}$),
UE_ID_H:
  10 MSB (most significant bits) of the Hashed ID, if P-RNTI is monitored on PDCCH or MPDCCH
  12 MSB (most significant bits) of the Hashed ID, if P-RNTI is monitored on NPDCCH
IMSI mod 1024

$T_{eDRX,H}$: eDRX cycle of the UE in Hyper-frames, ($T_{eDRx,H}$=1, 2, . . . , 256 Hyper-frames) (for NB-IoT, $T_{eDRX,H}$=2, . . . , 1024 Hyper-frames) and configured by upper layers.

PTW_start denotes the first radio frame of the PH that is part of the PTW and has SFN satisfying the following equation:
SFN=256*$i_{eDRx}$, where
$i_{eDRX}$=floor(UE_ID_H/$T_{eDRX,H}$) mod 4
PTW_end is the last radio frame of the PTW and has SFN satisfying the following equation:
SFN=(PTW_start+L*100−1) mod 1024, where
  L=Paging Time Window length (in seconds) configured by upper layers
Hashed ID is defined as follows:
  Hashed_ID is Frame Check Sequence (FCS) for the bits b31, b30 . . . , b0 of S-TMSI, computed according to 32-bit FCS defined in Section 8.1.1.6.2 of [34], and S-TMSI=<b39, b38, . . . , b0> as defined in [35].

In the eDRX technique, the UE transmits UE-preferred eDRX cycle information to the MME through the ATTACH or TAU procedure. The MME configures eDRX to the UE.

Figure 2L:
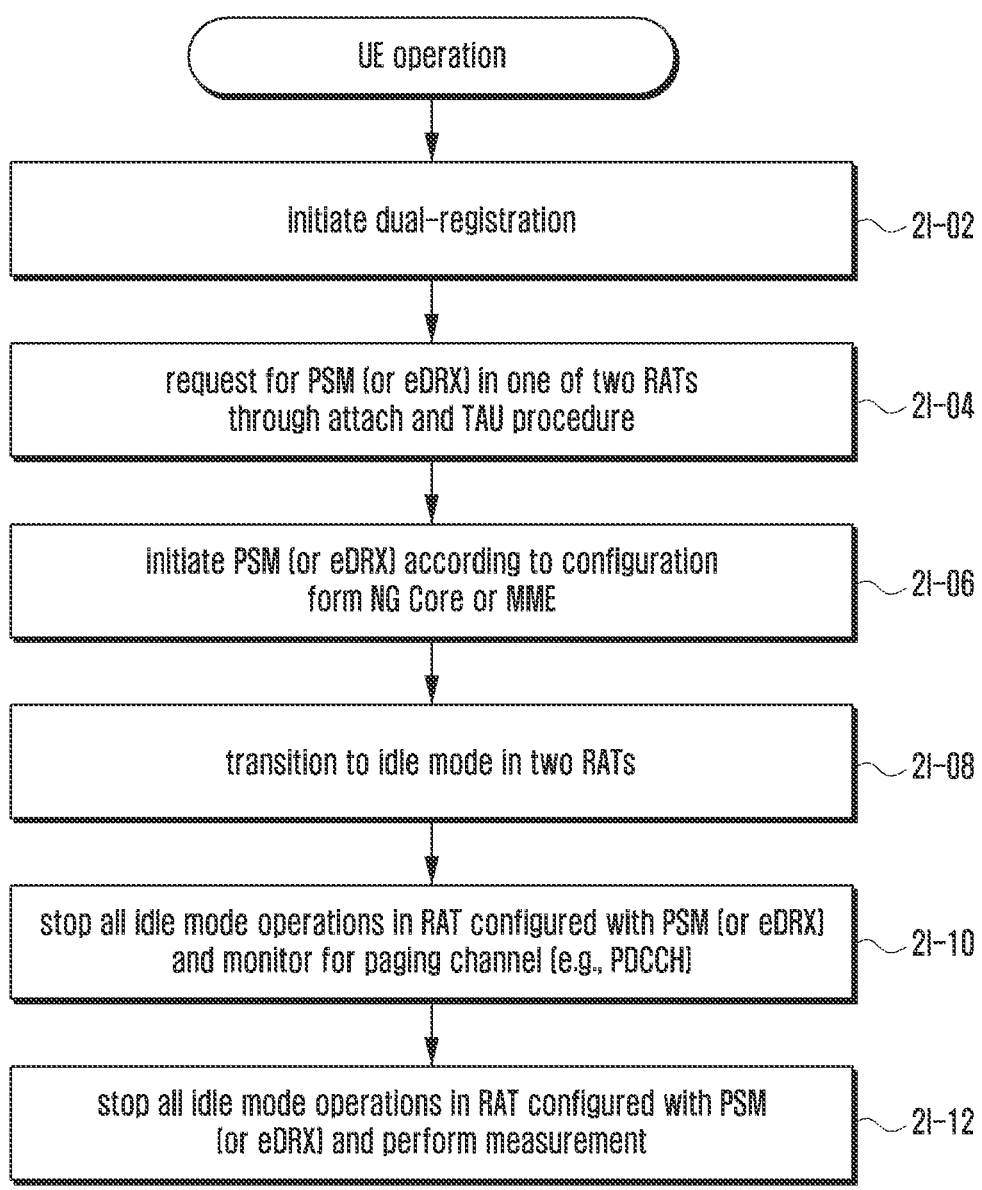
FIG. 2L is a flowchart for explaining operations of a UE in the second solution of an embodiment of the disclosure.

FIG. 2L is a flowchart for explaining operations of a UE in the second solution of an embodiment of the disclosure.

At step 2l-02, the UE initializes dual registration. The dual registration may be configured by a network or the UE when a predetermined condition is fulfilled.

At step 2l-04, the UE requests for PSM or eDRX configuration to at least one of two systems through an ATTACH or TAU procedure. At step 2l-06, the UE receives PSM or eDRX configuration from the NG Core or the MME and initializes the PSM or eDRX. At step 2i-08, the UE transitions to the idle mode in both the two systems.

At step 2l-10, the UE monitors the two system for paging. However, the system configured with the PSM or eDRX is monitored with a very long cycle. This is because the UE stops all idle mode operations during the PSM cycle or stops monitoring for paging during the inactive time of the very long eDRX cycle.

At step 2*l*-12, the UE performs cell measurement based on the DRX configuration information of the system indicated by the information. The cell measurement should be performed even on the cell frequency of the other system in which the UE is in the idle mode. This aims to support idle mode mobility effectively in the other system.

Figure 2M:
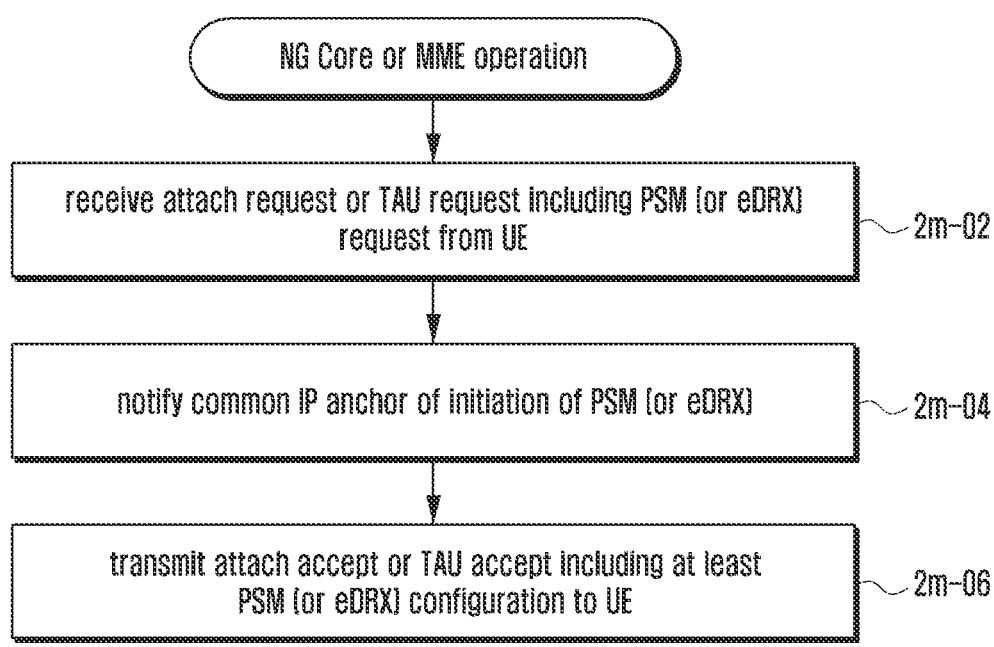
FIG. 2M is a flowchart for explaining operations of an NG Core or an MME in the second solution of the disclosure.

FIG. 2M is a flowchart for explaining operations of an NG Core or an MME in the second solution of the disclosure.

At step 2*m*-02, the NG Core or MME receives an ATTACH REQUEST or TAU REQUEST including PSM or eDRX request information from the UE. An ATTACH procedure is a procedure for registering the UE with the NG Core or MME, and a TAU procedure is a procedure for notifying, when the terminal moves out of a tracking area (TA) consisting of one or more cells, the NG Core or MME of the move out of the TA. Upon receipt of the TAU REQUEST, the NG Core or MME notifies the UE of an appropriate TA and afterward transfers paging to the changed TA.

At step 2*m*-04, the NG Core or MME transmits PSM or eDRX configuration-related information to the Common IP Anchor. At step 2*m*-06, the NG Core or MME transmits the PSM or eDRX configuration to the UE.

Figure 2N:
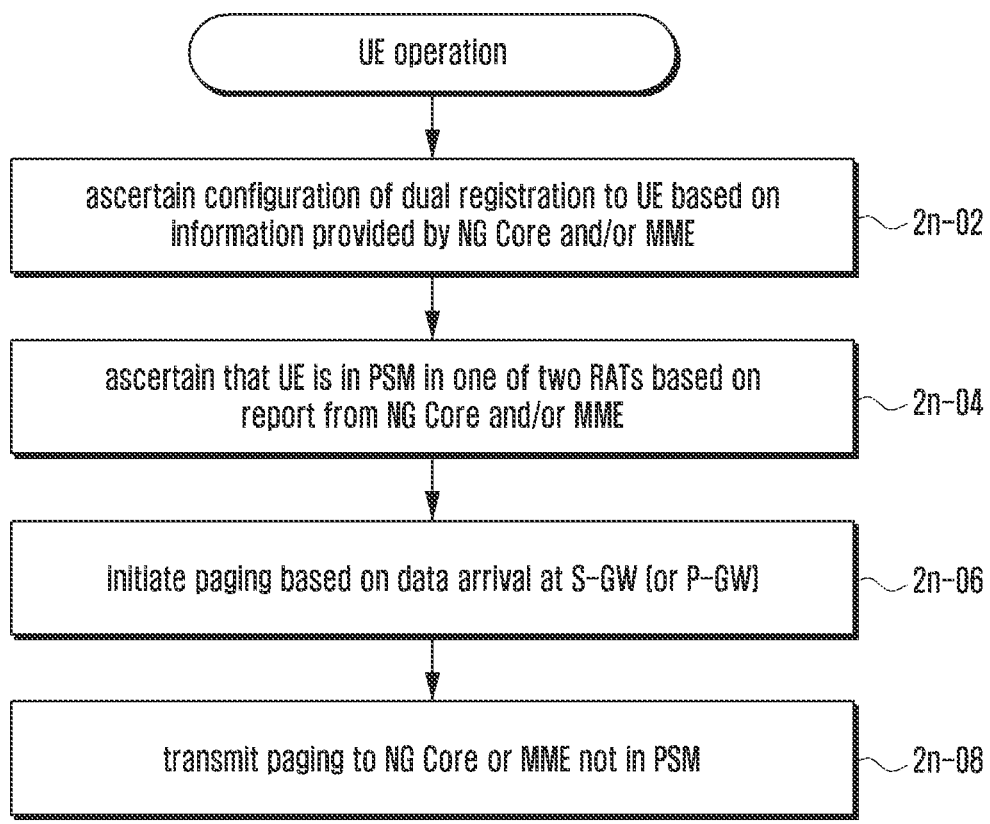
FIG. 2N is a flowchart illustrating operations of a Common IP Anchor in the second solution of the disclosure.
Figure 20:
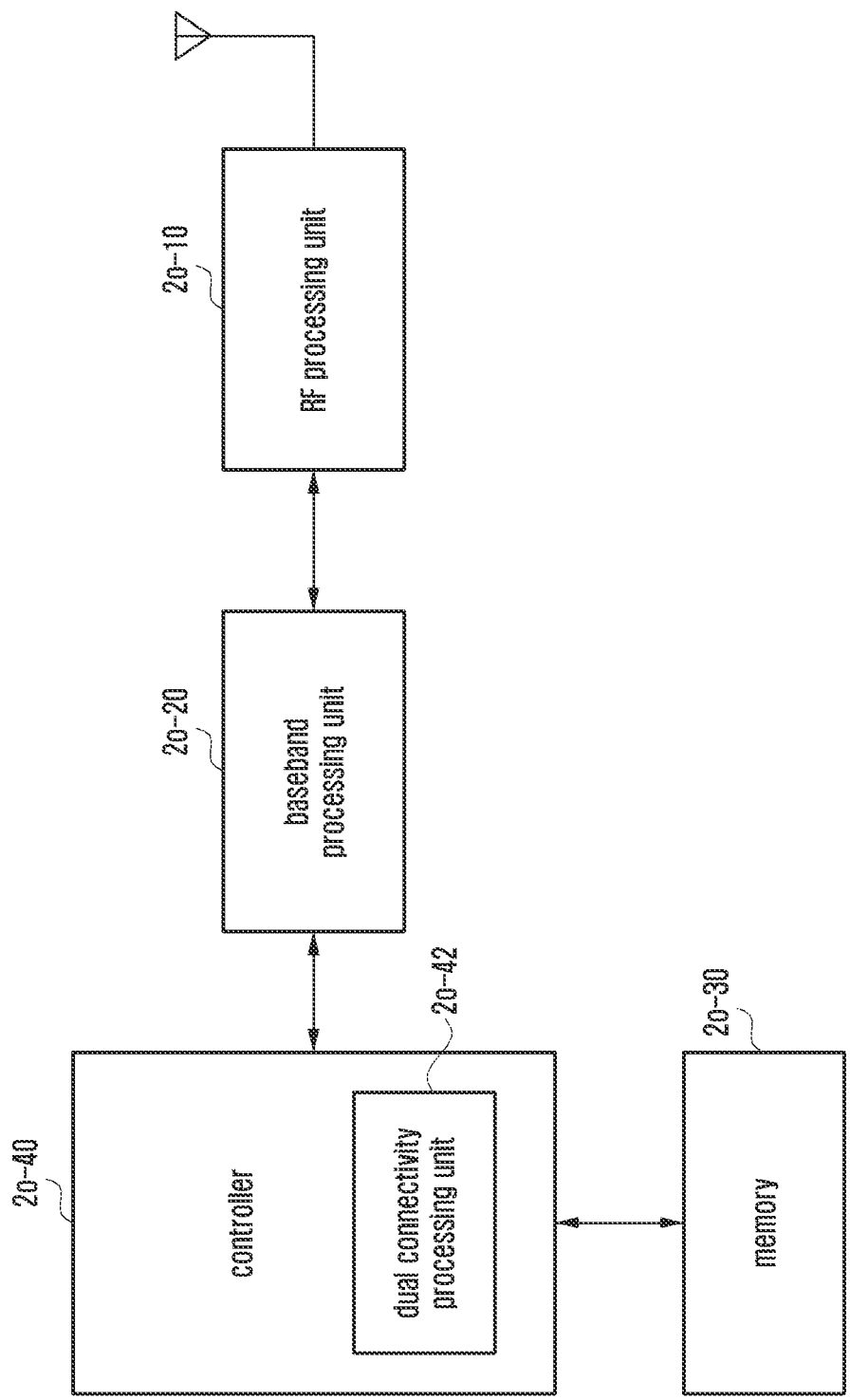

FIG. 2N is a flowchart illustrating operations of a Common IP Anchor in the second solution of the disclosure.

At step 2*n*-02, the Common IP Anchor recognizes that a UE has entered the dual registration mode based on the information provided by the NG Core and MME. At step 2*n*-04, the Common IP Anchor ascertains that the UE applies PSM or eDRX to one of the NR and LTE systems based on a report from the two systems.

At step 2*n*-06, the Common IP Anchor generates, upon arrival of data to be delivered to the UE from the S-GW or P-GW, pertinent paging. At step 2*n*-08, the Common IP Anchor transmits the paging to the NG Core or MME for delivery of the paging. The system with which the PSM or eDRX is configured is excluded because it cannot deliver the paging.

FIG. 2O is a block diagram illustrating a configuration of a UE according to an embodiment of the disclosure.

In reference to FIG. 2O, the UE includes a radio frequency (RF) processing unit 2*o*-10, a baseband processing unit 2*o*-20, a memory 2*o*-30, and a controller 2*o*-40.

The RF processing unit 2*o*-10 takes charge of signal band conversion and amplification for transmitting signals over a radio channel. That is, the RF processing unit 2*o*-10 up-converts a baseband signal output from the baseband processing unit 2*o*-20 to an RF band signal for transmission through antennas and down-converts an RF band signal received through an antenna to a baseband signal.

For example, the RF processing unit 2*o*-10 may include a transmission filter, a reception filter, an amplifier, a mixer, an oscillator, a digital-to-analog converter (DAC), and an analog-to-digital convertor (ADC). Although one antenna is depicted in the drawing, the terminal may include a plurality of antennas.

The RF processing unit 2*o*-10 may include a plurality of RF chains. The RF processing unit 2*o*-10 may perform beamforming. For beamforming, the RF processing unit 2*o*-10 may adjust the phases and sizes of the signal transmitted/received through the antennas or antenna elements. The RF processing unit 2*o*-10 may perform a MIMO operation to receive a signal on multiple layers.

The baseband processing unit 2*o*-20 takes charge of conversion between baseband signals and bit strings according to a physical layer protocol of the system. For example, the baseband processing unit 2*o*-20 performs encoding and modulation on the transmit bit strings to generate complex symbols in data transmission mode.

The baseband processing unit 2*o*-20 also performs demodulation and decoding on the baseband signal from the RF processing unit 2*o*-10 to recover the received bit strings in data reception mode. For the case of an orthogonal frequency division multiplexing (OFDM) system, the baseband processing unit 2*o*-20 performs encoding and modulation on a transmit bit string to generate complex symbols, maps the complex symbols to subcarriers, performs inverse fast Fourier transform (IFFT) on the subcarriers, and inserts a cyclic prefix (CP) to generate OFDM symbols in the data transmission mode.

The baseband processing unit 2*o*-20 splits the baseband signal from the RF processing unit 2*o*-10 into OFDM symbols, recovers the signals mapped to the subcarriers through fast Fourier transform (FFT), and performs demodulation and decoding to recover the bit strings in the data reception mode.

The baseband processing unit 2*o*-20 and the RF processing unit 2*o*-10 take charge of transmitting and receiving signals as described above. Accordingly, the baseband processing unit 2*o*-20 and the RF processing unit 2*o*-10 may be referred to as a transmission unit, a reception unit, a transceiver, or a communication unit. At least one of the baseband processing unit 2*o*-20 and the RF processing unit 2*o*-10 may include a plurality of communication modules for supporting different radio access technologies.

At least one of the baseband processing unit 2*o*-20 and the RF processing unit 2*o*-10 may include a plurality of communication modules for processing different frequency band signals. Examples of the radio access technologies include WLAN (e.g., IEEE 802.11) and cellular network (e.g., LTE). Examples of the different frequency bands may include super high frequency (SHF) band (e.g., 2.5 GHz and 5 GHz) and millimeter wave (mmWave) bands (e.g., 60 GHz).

The memory 2*o*-30 stores basic programs for operation of the terminal, application programs, and data such as configuration information. In particular, the memory 2*o*-30 may store information related to a second access node that performs radio communication using a second radio access technology. The memory 2*o*-30 provides the stored data in response to a request from the controller 2*o*-40.

The controller 2*o*-40 controls overall operations of the terminal. For example, the controller 2*o*-40 controls the baseband processing unit 2*o*-20 and the RF processing unit 2*o*-10 to transmit/receive signals. The controller 2*o*-40 also writes and reads data to and from the memory 2*o*-30. In order to accomplish this, the controller 2*o*-40 may include at least one processor. For example, the controller 2*o*-40 may include a communication processor (CP) for controlling communication and an application processor (AP) for providing higher layer processing, e.g., application layer protocol processing.

Figure 2P:
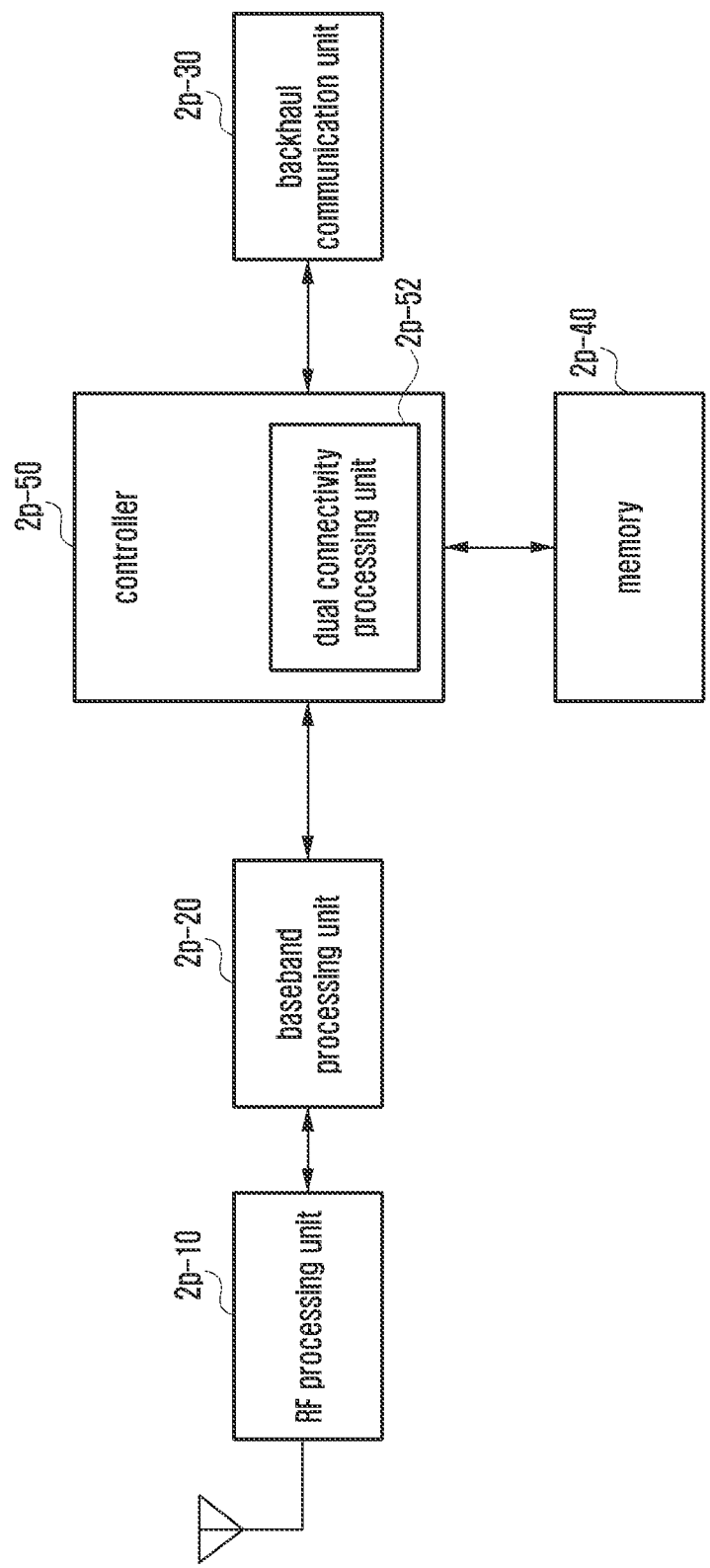
FIG. 2P is a block diagram illustrating a configuration of a base station according to an embodiment of the disclosure.

FIG. 2P is a block diagram illustrating a configuration of a base station according to an embodiment of the disclosure.

As shown in the drawing, the base station includes an RF processing unit 2*p*-10, a baseband processing unit 2*p*-20, a backhaul communication unit 2*p*-30, a memory 2*p*-40, and a controller 2*p*-50.

The RF processing unit 2*p*-10 takes charge of signal band conversion and amplification for transmitting signals over a radio channel. That is, the RF processing unit 2*p*-10 up-converts a baseband signal output from the baseband processing unit 2*p*-20 to an RF band signal for transmission through antennas and down-converts an RF band signal received through the antennas to a baseband signal.

For example, the RF processing unit 2p-10 may include a transmission filter, a reception filter, an amplifier, a mixer, an oscillator, a DAC, and an ADC. Although one antenna is depicted in FIG. 2P, the base station may include a plurality of antennas. The RF processing unit 2p-10 may include a plurality of RF chains. The RF processing unit 2p-10 may perform beamforming. For beamforming, the RF processing unit 2p-10 may adjust the phases and sizes of the signal transmitted/received through the antennas or antenna elements. The RF processing unit 2p-10 may perform a downlink MIMO operation to transmit a signal on multiple layers.

The baseband processing unit 2p-20 takes charge of converting between baseband signals and bit strings according to a physical layer protocol of a first radio access technology. For example, the baseband processing unit 2p-20 performs encoding and modulation on the transmit bit strings to generate complex symbols in data transmission mode.

The baseband processing unit 2p-20 also performs demodulation and decoding on the baseband signal from the RF processing unit 2p-10 to recover the received bit strings in data reception mode. For the case of an OFDM system, the baseband processing unit 2p-20 performs encoding and modulation on the a transmit bit string to generate complex symbols, maps the complex symbols to subcarriers, performs IFFT on the subcarriers, and inserts a CP to generate OFDM symbols in the data transmission mode.

The baseband processing unit 2p-20 splits the baseband signal from the RF processing unit 2p-10 into OFDM symbols, recovers the signals mapped to the subcarriers through FFT, and performs demodulation and decoding to recover the bit strings in the data reception mode. The baseband processing unit 2p-20 and the RF processing unit 2p-10 take charge of transmitting and receiving signals as described above. Accordingly, the baseband processing unit 2p-20 and the RF processing unit 2p-10 may be referred to as a transmission unit, a reception unit, a transceiver, or a communication unit.

The backhaul communication unit 2p-30 provides an interface for communication with other network nodes. That is, the backhaul communication unit 2p-30 converts a bit string transmitted from a master base station to another node, e.g., secondary base station and core network, to a physical signal and converts a physical signal received from another node to a bit string.

The memory 2p-40 stores basic programs for operation ofthe base station, application programs, and data such as configuration information. In particular, the memory 2p-40 may store the information on the bearers allocated to the connected terminal and a measurement result reported by the terminal. The memory 2p-40 may also store the information as criteria for determining whether to enable or disable multi-connectivity for the terminal. The memory 2p-40 provides the stored data in response to a request from the controller 2p-50.

The controller 2p-50 may control overall operations of the base station. For example, the controller 2p-50 controls the baseband processing unit 2p-20, the RF processing unit 2p-10, and the backhaul communication unit 2p-30 for transmitting/receiving signals. The controller 2p-50 also writes and reads data to and from the memory 2p-40. In order to accomplish this, the controller 2p-50 may include at least one processor.

The Third Embodiment

The terms used in the following description for indicating access nodes, network entities, messages, interfaces between network entities, and diverse identity informations are provided for convenience of explanation. Accordingly, the terms used in the following description are not limited to specific meanings, and they may be replaced by other terms equivalent in technical meanings.

In the following description, the terms and definitions given in the $3'd$ Generation Partnership Project Long Term Evolution (3GPP LTE) standard are used. However, the disclosure is not limited by the terms and definitions, and it can be applied to other standard communication systems.

Figure 3A:
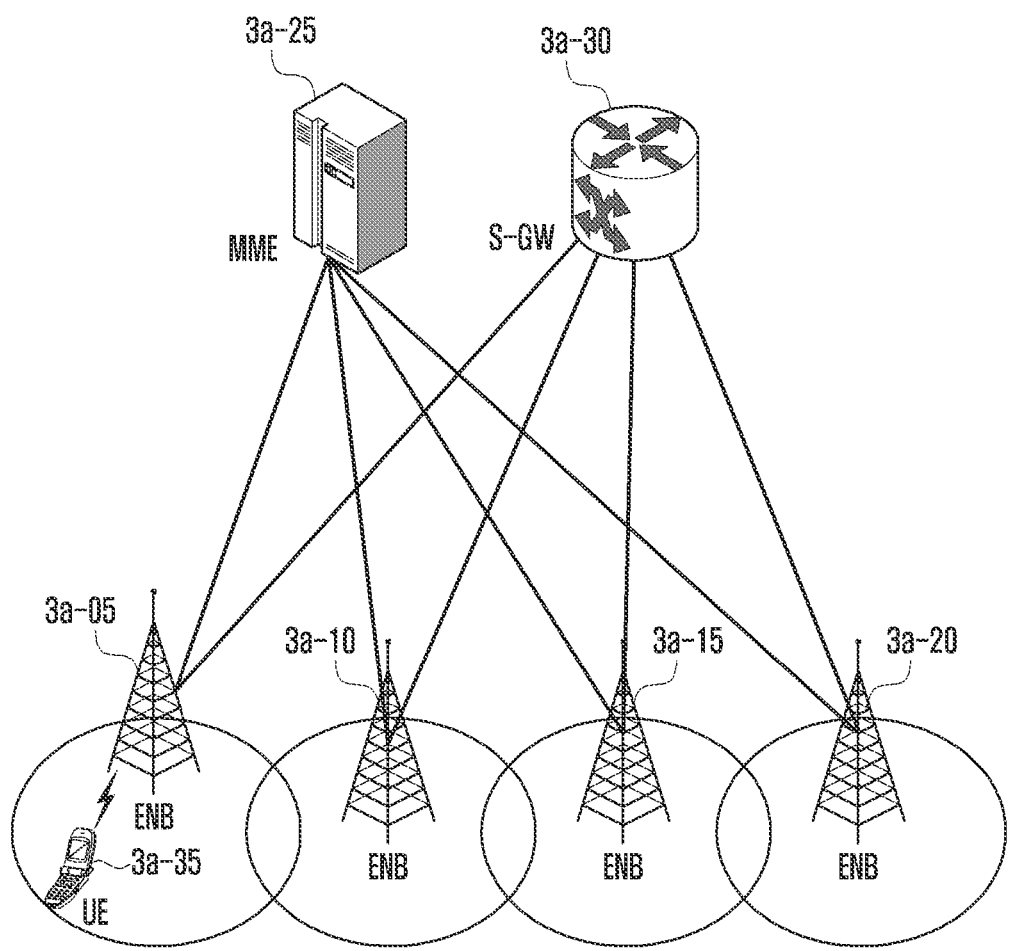
FIG. 3A is a diagram illustrating an architecture of a legacy LTE system.

FIG. 3A is a diagram illustrating an architecture of a legacy LTE system.

In reference to FIG. 3A, the radio communication system includes evolved Node Bs (eNBs) 3a-05, 3a-10, 3a-15, and 3a-20; a Mobility Management Entity (MME) 3a-25; and a Serving Gateway (S-GW) 3a-30. The User Equipment (UE or terminal) 3a-35 connects to an external network via the eNBs 3a-05, 3a-10, 3a-15, and 3a-20 and the S-GW 3a-30.

The eNBs 3a-05, 3a-10, 3a-15, and 3a-20 access nodes of a cellular network to provide network access service to UEs camped thereon. That is, the eNBs 3a-05, 3a-10, 3a-15, and 3a-20 schedule the UEs based on buffer status, power headroom status, and channel status collected from the UEs to connect the UEs to the Core Network (CN). The MME 3a-25 is an entity taking charge of UE mobility management and other control functions and maintains connections with a plurality of eNBs, and the S-GW 3a-30 is an entity for handling bearers. The MME 3a-25 and the S-GW 3a-30 may perform authentication on the UEs connected to the network, manage bearers, and process the packets from the eNBs 3a-05, 3a-10, 3a-15, and 3a-20 or to be transmitted to the eNBs 3a-05, 3a-10, 3a-15, and 3a-20.

Figure 3B:
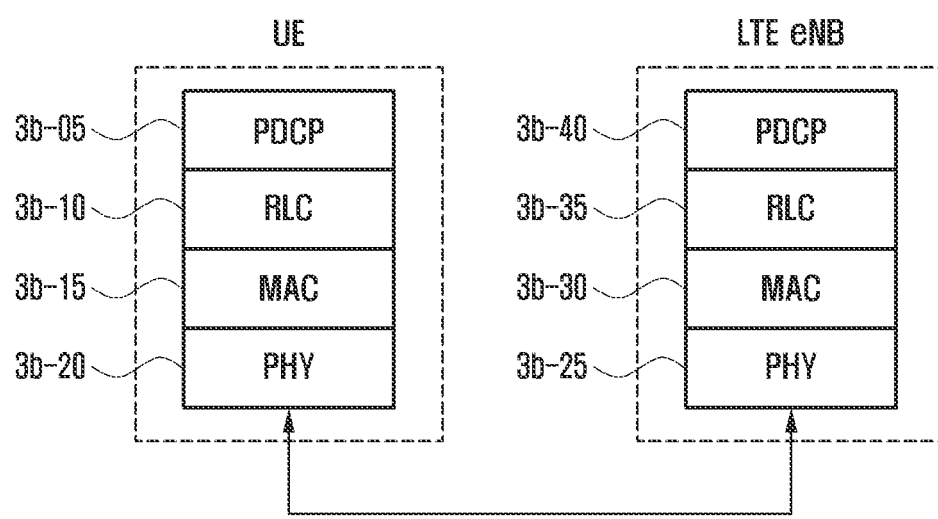
FIG. 3B is a diagram illustrating a protocol stack in an LTE system.

FIG. 3B is a diagram illustrating a protocol stack in an LTE system.

In reference to FIG. 3B, the protocol stack of the interface between the UE and the eNB in the LTE system includes a packet data convergence control (PDCP) layer denoted by reference numbers 3b-05 and 3b-40, radio link control (RLC) layer denoted by reference numbers 3b-10 and 3b-35, and a medium access control (MAC) layer denoted by reference numbers 3b-15 and 3b-30. The PDCP layer denoted by reference numbers 1b-05 and 1b-40 takes charge of compressing/decompressing an IP header. The main functions of the PDCP layer can be summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer designated by reference numbers 3b-10 and 3b-35 takes charge of reformatting PDCP PDUs in order to fit them into the size for ARQ operation. The main functions of the RLC layer can be summarized as follows.

Transfer of upper layer PDUs
Error Correction through ARQ (only for AM data transfer)
Concatenation, segmentation, and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer denoted by reference numbers 3b-15 and 3b-30 allows for connection of multiple RLC entities established for one UE and takes charge of multiplexing RLC PDUs from the RLC layer into a MAC PDU and demultiplexing a MAC PDU into RLC PDUs. The main functions of the MAC layer can be summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding The physical layer denoted by reference numbers 3b-20 and 3b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Although not shown in the drawing, there is a radio resource control (RRC) layer above the PDCP layer that is responsible for exchanging access and measurement-related configuration control messages between the UE and the base station.

Figure 3C:
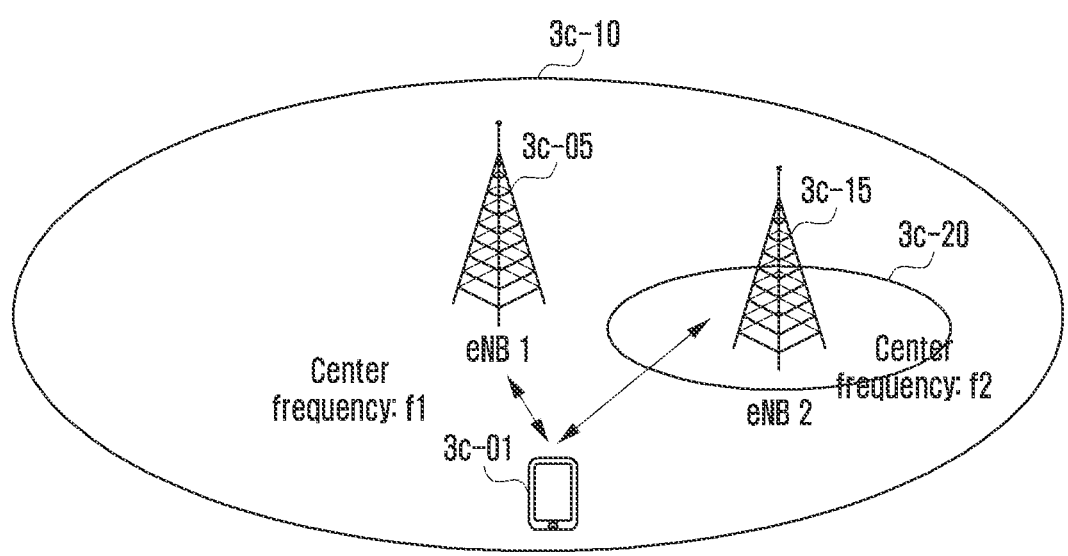
FIG. 3C is a schematic diagram illustrating a dual-connectivity operation in a legacy LTE system.

FIG. 3C is a schematic diagram illustrating a dual-connectivity operation in a legacy LTE system.

In reference to FIG. 3C, in the case where eNB 1 3c-05 uses a carrier with a center frequency f1 for communication and an eNB 2 3c-15 uses a carrier with a center frequency f2 for communication, a UE 3c-01 may aggregate the carrier with the downlink center frequency f1 and the carrier with the downlink center frequency f2 to communicate with two or more eNBs. The LTE system supports such an operation, which is called Dual Connectivity (hereinafter, referred to as DC).

In the following description, if a UE receives data through a certain downlink carrier or transmits data through a certain uplink carrier, this means to receive or transmit data through a control channel and a data channel provided in a cell corresponding to a center frequency and a frequency band characterizing the carrier.

In the following description, a set of the serving cells controlled by one eNB is referred to as a Cell Group or Carrier Group (CG). A cell group is classified into one of Master Cell Group (MCG) and Secondary Cell Group (SCG). The MCG denotes a set of the serving cell controlled by an eNB controlling the PCell (hereinafter, referred to as Master eNB (MeNB)), and the SCG denotes a set of the serving cells controlled by the eNB that does not control the PCell, i.e., the eNB that controls only SCells (hereinafter, referred to as Slave eNB (SeNB)). The eNB notifies the UE whether a serving cell belongs to the MCG or SCG in the procedure of configuring the corresponding serving cell.

The PCell and SCell are terms expressing the types of the serving cell configured to the UE. The PCell and SCell are different in that the PCell always remains in the activated state while the SCell transitions between the activated state and the deactivated state repeatedly according to the command of the eNB. The UE mobility is controlled mainly in association with the PCell, and the SCell may be understood as an extra serving cell for data communication. In the following description, the meanings of the terms "PCell" and "SCell" are the same as those defined in the LTE standards TS36.331 and TS 36.321.

In FIG. 3C, if eNB 1 3c-05 is an MeNB and eNB 2 3c-15 is an SeNB, a serving cell 3c-10 with the center frequency f1 is a serving cell belonging to an MCG, and a serving cell 3c-20 with the center frequency f2 is a serving cell belonging to an SCG.

Meanwhile, it may be practically impossible to transmit hybrid automatic repeat request (HARQ) feedbacks and channel status information (CSI) for SCG SCells through a physical uplink control channel (PUCCH) of a PCell. This is because a transmission delay between the MeNB and SeNB may be longer than the HARQ RTT (typically, 8 ms) within which an HARQ feedback should be delivered. For this reason, one of the SCells belonging to the SCG is configured as a primary SCell (PSCell) with PDCCH transmission resources for transmitting HARQ feedback and CSIs for the SCG SCells.

Figure 3D:
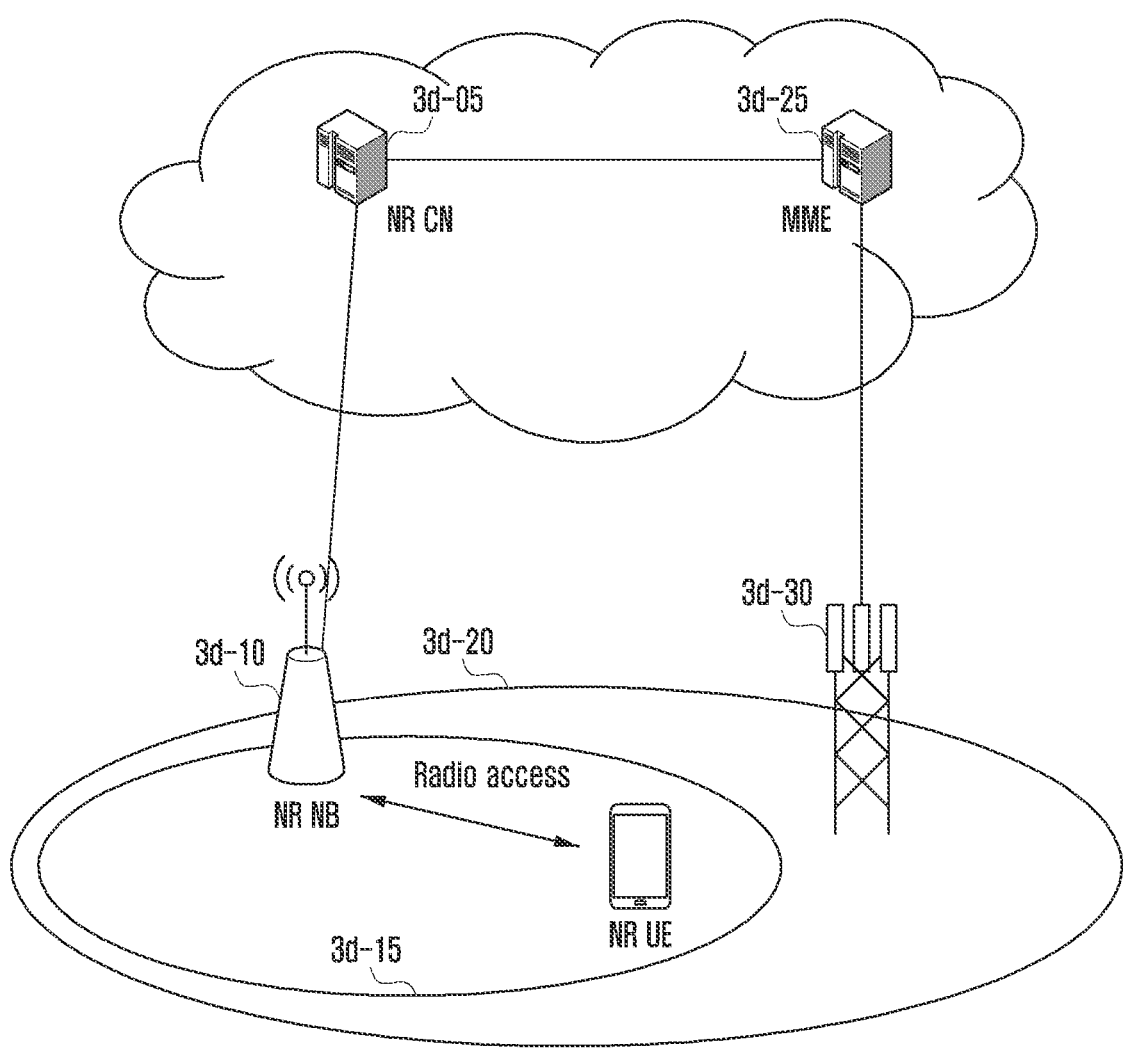
FIG. 3D is a diagram illustrating a next generation mobile communication system architecture to which the disclosure is applied.

FIG. 3D is a diagram illustrating a next generation mobile communication system architecture to which the disclosure is applied.

As shown in FIG. 3D, the next generation mobile communication system includes a radio access network with a next generation base station (New Radio Node B (NR gNB) or NR base station) 3d-10 and a new radio core network (NR CN) 3d-05. A new radio user equipment (NR UE or NR terminal) 3d-15 connects to an external network via the NR gNB 3d-10 and the NR CN 3d-05.

In FIG. 3D, the NR gNB 3d-10 corresponds to an evolved Node B (eNB) of the legacy LTE. The NR gNB 3d-10 to which the NR UE 3d-15 connects through a radio channel is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR gNB 3d-10 takes charge of this function.

Typically, the NR gNB 3d-10 controls multiple cells and includes a central unit (CU) responsible for control and signaling and a distributed unit (DU) responsible for signal communication. In order to achieve a data rate higher than the peak data rate of legacy LTE systems, the next generation mobile communication system may adopt a beamforming technique along with orthogonal frequency division multiplexing (OFDM) as a radio access technology. The NR gNB may also adopt an adaptive modulation and coding (AMC) to determine the modulation scheme and channel coding rate in adaptation to the channel condition of the NR UE.

The NR CN 3d-05 takes charge of mobility support, bearer setup, and QoS configuration. The NR CN 3d-05 may take charge of an NR UE mobility management function, and a plurality of NR gNBs may connect to the NR CN 3d-05. The next generation mobile communication system may also interoperate with a legacy LTE system and, in this case, the NR CN 3d-05 connects to an MME 3d-25 through a network interface. The MME 3d-25 communicates with at least one eNB 3d-30 as a legacy base station.

Figure 3E:
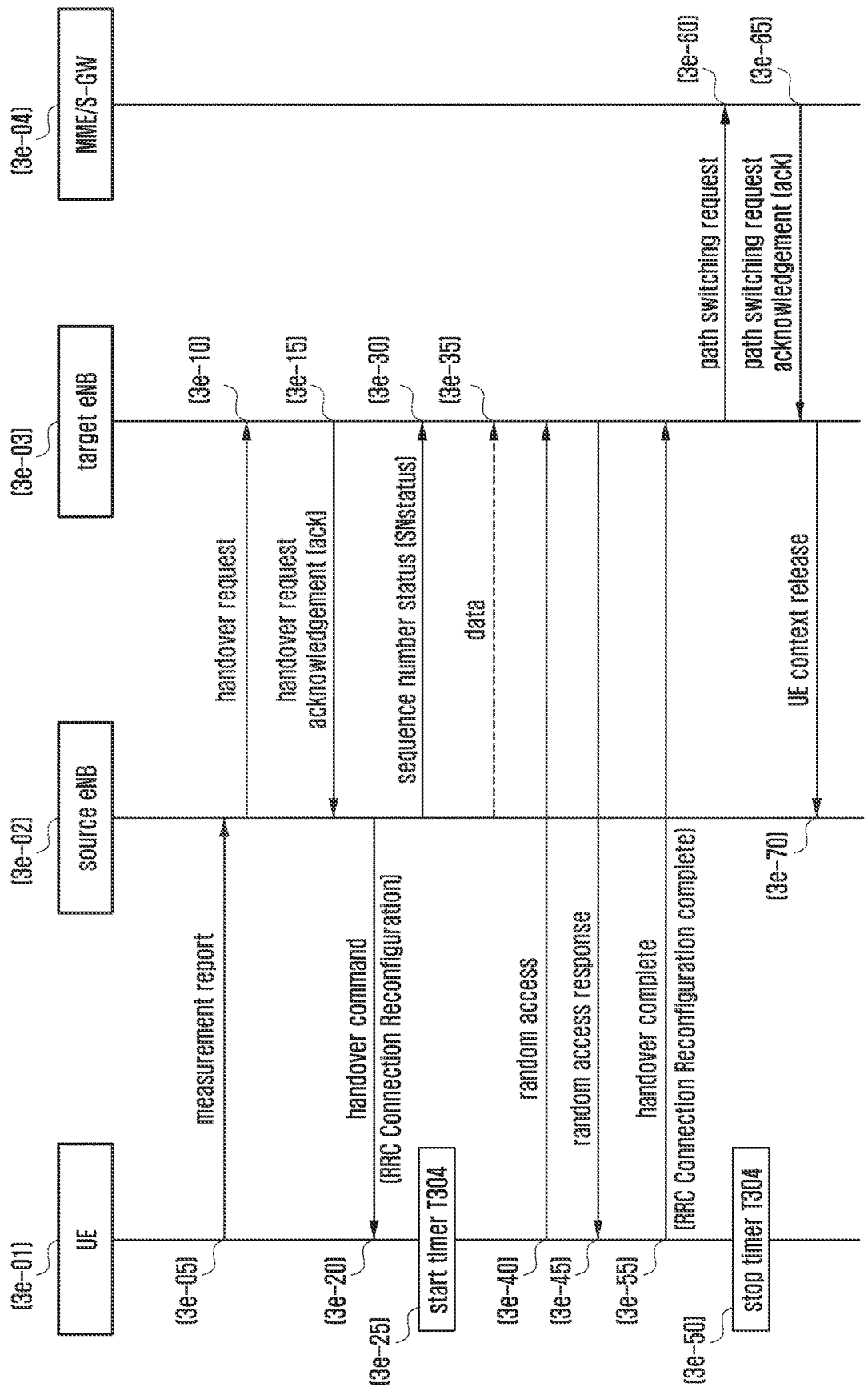
FIG. 3E is a signal flow diagram illustrating a handover procedure in an LTE system for reference to explain the disclosure.

FIG. 3E is a signal flow diagram illustrating a handover procedure in an LTE system for reference to explain the disclosure.

At step 3e-05, a UE 3e-01 in a connected mode transmits cell measurement information (Measurement Report) to a serving eNB 3e-02 periodically or when a predetermined event occurs. The serving eNB determines whether to hand the UE over to a neighboring cell based on the measurement information. The handover is a technique for switching from a serving cell serving a UE to another eNB.

If the serving cell makes a handover decision, it transmits a handover (HO) request message, at step 3e-10, to a new eNB, i.e., target eNB 3e-03, to request for handover to continue providing a service. If the target cell accepts the handover request, it transmits a HO request acknowledgement (Ack) message to the serving cell at step 3e-15.

Upon receipt of this message, the serving cell transmits a HO command to the UE at step 3e-20. Before receiving the HO command, the UE continues receiving downlink channels (PDCCH/PDSCH/PHICH) from the serving cell and transmitting uplink channels (PUSCH/PUCCH). The HO command message is conveyed in an RRC Connection Reconfiguration message being transmitted from the serving cell to the UE at step 3e-20.

Upon receipt of this message, the UE stops data communication with the serving cell and starts a timer T304. The timer T304 aims for the UE to revert the previous configuration and transitions to an RRC idle state if it fails to hand the UE over to the target cell during a predetermined time period. The serving cell transmits sequence number (SN) status information for uplink/downlink data to the target eNB and, if any downlink data exists, the data to the target eNB at steps 3e-30 and 3e-35.

At step 3e-40, the UE attempts random access to the target cell indicated by the serving cell. The random access is performed to notify the target cell of the handover of the UE and acquire uplink synchronization. For the random access, the UE transmits a preamble identified by a preamble ID provided by the serving cell or selected randomly to the target cell.

After a predetermined number of subframes since the transmission of the preamble, the UE starts monitoring the target cell for a random access response (RAR). A time period for this monitoring is referred to as RAR window.

If the RAR is received at step 3e-45 during the RAR window, the UE transmits, at step 3e-55, to the target cell an RRC Connection Reconfiguration Complete (RRCConnectionReconfigurationComplete) message including a HO complete message. Afterward, the UE receives downlink channels (PDCCH/PDSCH/PHICH) from the target cell and transmits uplink channels (PUSCH/PUCCH) to the target cell. If the RAR is successfully received as described above, the UE ends the timer T304.

The target cell requests for path switching at steps 3e-60 and 3e-65 to modify the paths of the bearers configured to the serving cell and requests, at step 3e-70, to the serving cell to release the UE context of the UE. The UE attempts to receive data from the target cell at the start time of the RAR window and starts transmission along with transmitting an RRCConnectionReconfigurationComplete message upon receipt of the RAR.

In the above-described legacy LTE handover, an interruption occurs during the random access procedure to the target cell, which demands a requirement of interference-free mobility management (zero mobility interruption time) to avoid interrupting in NR. In the disclosure, the legacy LTE handover is referred to as Type 1 handover for distinction from the proposed method (hereinafter, referred to as Type 2 handover).

In the disclosure, a target PCell to which a handover is to be performed is a serving cell configured to the UE, and a handover between serving cells is defined as Type 2 handover. The Type 2 handover may be defined as inter-serving cell PCell switching.

1. A PUCCH connection should be configured to one or more serving cells as well as the PCell. This is because there is a need of an uplink control channel for transmitting HARQ feedback, scheduling requests, and CSI.
2. A split bearer should be reconfigured for all resource blocks (SRB1, SRB2, and DRBs (Data Radio Bearers) except for SRB 0 (Service Radio Bearer 0) before performing the Type 2 Handover.

Typically, the Type 2 handover consists of 4 phases.
1. Phase 0: The UE is connected to the PCell.
2. Phase 1 (preparatory phase): Additional PUCCH serving cell(s) is(are) configured.
3. Phase 2 (execution phase): The Type 2 handover is executed to switching the PCell to a target serving cell. Here, the serving cell should be not the PCell but a serving cell configured with a PUCCH.
4. Phase 3 (wrap-up phase): The old PCell is released.

Examples of the Type 2 handover include a dual connectivity-(DC-) and RLC split bearer-based handover, a DC- and MAC split bearer-based handover, and enhanced CA-based (eCA-based) handover. In the disclosure, descriptions are directed to the DC- and RLC split bearer-based handover procedure. In particular, embodiment 3-1 is directed to inter-gNB mobility, i.e., a handover procedure between two different gNBs, and embodiment 3-2 is directed to an intra-gNB mobility, i.e., a handover procedure between cells of the same gNB.

Figure 3F:
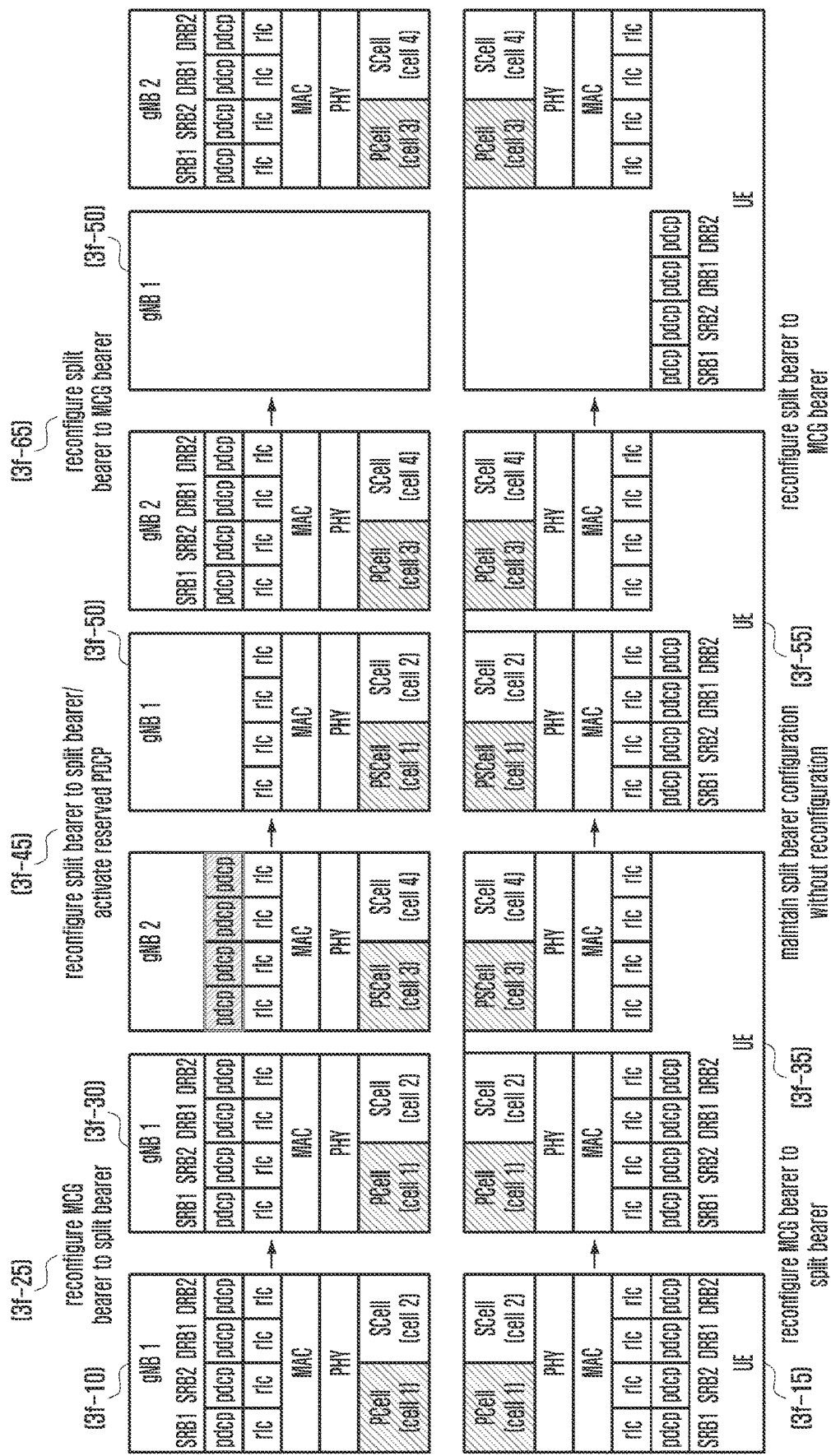
FIGS. 3FA and 3FB are schematic diagrams for explaining a DC- and RLC split bearer-based inter-gNB handover operation and a protocol structure according to embodiment 3-1 of the disclosure.

FIGS. 3FA and 3FB are schematic diagrams for explaining a DC- and RLC split bearer-based inter-gNB handover operation and a protocol structure according to embodiment 3-1 of the disclosure.

In Phase 0, a UE is connected to gNB 1 for basic data communication in the NR system as denoted by reference number 3f-05. In the disclosure, it is assumed that the gNB 1 hosts a PCell and an SCell for convenience of explanation.

In this phase, the gNB 1 configures an MCG bearer for data communication only through a serving cell of an MeNB, and each PDCP entity is connected to one RLC, which is connected to a MAC entity via a logical channel as denoted by reference number 3f-10. The UE configures PDCP, RLC, and MAC according to the bearer configuration with the gNB 1 and receives a control signal and data through the PCell (Cell1). The UE also transmits HARQ feedback, scheduling requests, and CSI through the PCell (Cell1) and performs data communication through the SCell (Cell2). The SCell transitions between an activated state and a deactivated state repeatedly under the control of the gNB 1 as denoted by reference number 3f-15.

If the gNB 1 makes a dual connectivity determination for a handover upon fulfilment of a predetermined condition, dual connectivity is configured in Phase 1 as denoted by reference number 3f-20. Next, the gNB 1 requests to the gNB 2 for SeNB addition and PDCP and split bearer configuration and configures PDCP, RLC, and MAC according to the bearer configuration. That is, the gNB 1 establishes dual connectivity with the gNB 2 hosting a PSCell (Cell3) as an additional PUCCH serving cell and an SCell (Cell4) and reconfigures the old MCG bearer into a split bearer as denoted by reference numbers 3f-25 and 3f-30. This means that each PDCP entity of the gNB 1 is split to establish links to two RLC entities for the gNB 1 and gNB 2.

As the dual connectivity is established, the UE establishes additional RLC entities and resets a new MAC entity for the gNB 2 while maintaining the RLC and MAC configurations of the gNB 1 as denoted by reference number 3f-35.

If the gNB 1 detects an event triggering a handover from a measurement report value of the UE, e.g., if a signal strength from the gNB 1 becomes equal to or greater than a signal strength from the gNB 2, this leads to Phase 2 in which the roles are switched between the PCell and the PSCell as denoted by reference number 3f-40. In this phase, the split bearer is reconfigured into another split bearer, S1-U is switched from the gNB 1 to the gNB 2, and the PDCP is relocated as denoted by reference numbers 3f-45 and 3f-50. As a consequence, the PDCP of the gNB 1 is released, and the roles of the PCell and PSCell are switched. In the UE, there is little change in Phase 1 with the exception that a previous configuration of a power headroom report (PHR) is cancelled and locations of PHs are adjusted in the PHR according to the role switching of the PCell and the PSCell.

If the gNB 2 detects an event triggering dual connectivity release of the gNB 1 from a measurement report value of the UE, e.g., if the signal strength from the gNB 1 becomes equal to or less than a predetermined threshold value, this leads to Phase 3 in which the dual connectivity is released as denoted by reference number 3f-60.

In this phase, the split bearer is reconfigured into an MCB bearer as denoted by reference number 3f-65, and the bearer configuration of the gNB 1 is released according to an SCG release request as denoted by reference number 3f-70. Likewise, the UE releases the RLC and MAC and performs data communication with the newly configured gNB 2 as denoted by reference number 3f-75.

Figure 3G:
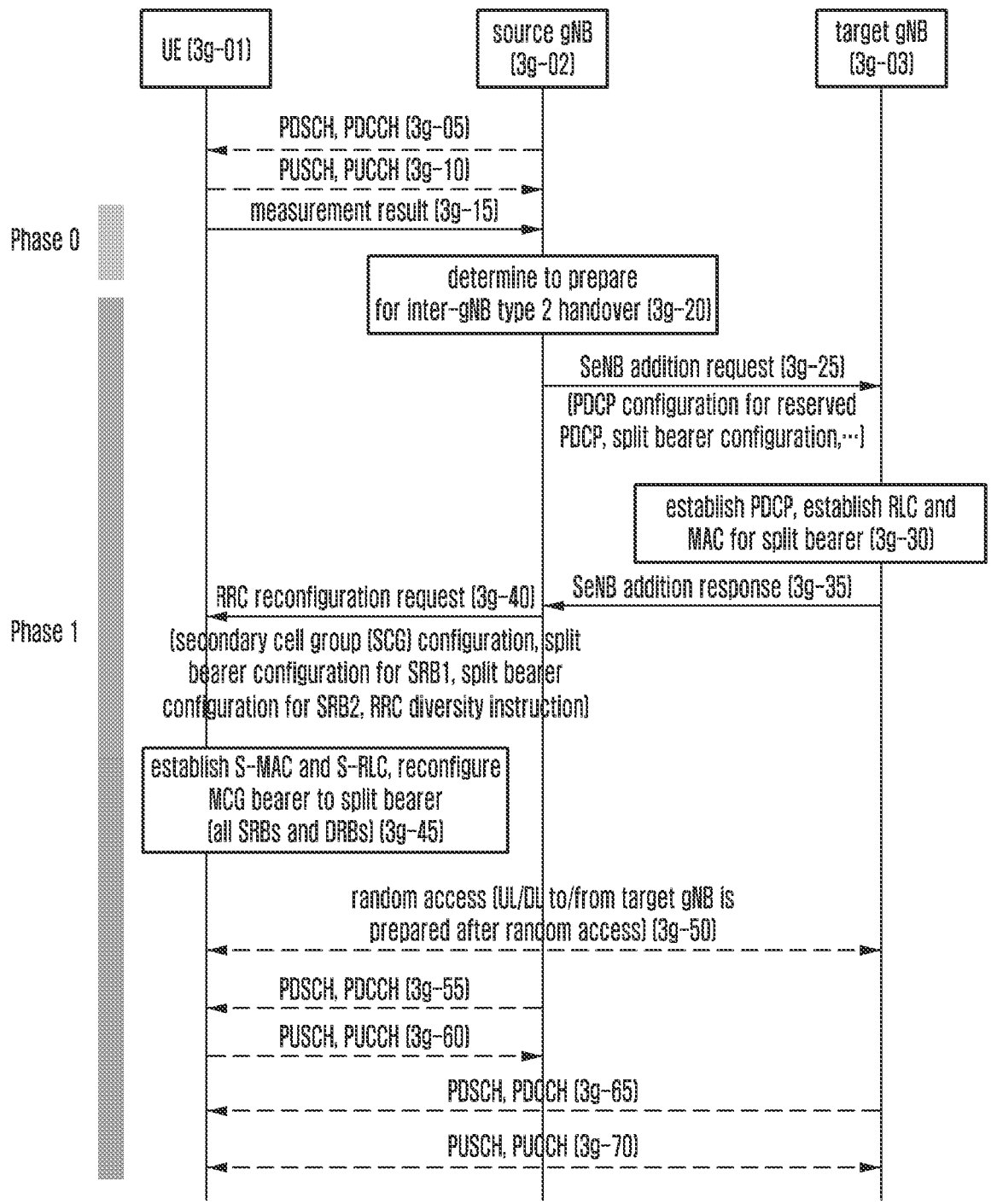
FIGS. 3GA and 3GB are signal flow diagrams illustrating a DC- and RLC split bearer-based handover procedure according to embodiment 3-1 of the disclosure.
Figure 3G:
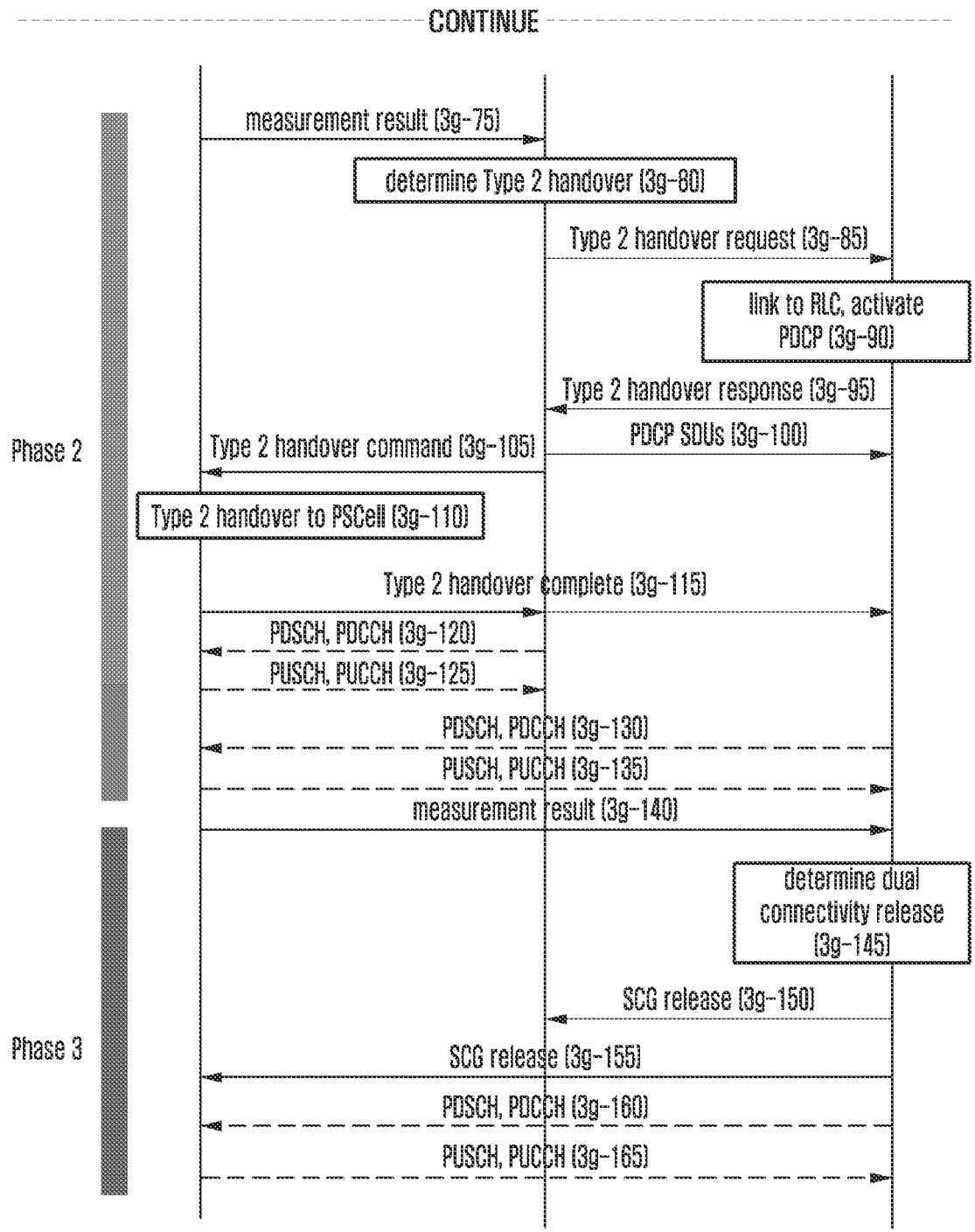

FIGS. 3GA and 3GB are signal flow diagrams illustrating a DC- and RLC split bearer-based handover procedure according to embodiment 3-1 of the disclosure.

A description is made of the per-phase signal flows in the DC- and RLC split bearer-based inter-gNB handover procedure in detail with reference to FIGS. 3GA and 3GB.

It is assumed that a UE 3g-01 in the state of being connected to a source gNB 3g-02 receives a downlink control signal (PDCCH) and data (PDSCH) at step 3g-05 and transmits an uplink signal (PUCCH) and data (PUSCH) in Phase 0. In this phase, it may be possible to receive the downlink control signal and transmit the uplink control signal through the PCell of the source gNB and perform further data transmission/reception through an SCell under the control of the gNB.

The UE measures neighboring cells periodically or as configured by the gNB and, if a predetermined condition is fulfilled, it transmits to the source gNB, at step 3g-15, a measurement value (MeasResult) indicating the necessity of dual connectivity for a handover, which leads to Phase 1. The measurement value may indicate an event where the signal strength from the source gNB decreases and the signal strength from the target gNB increases at the UE; upon receipt of the measurement value, the source gNB may recognize UE mobility and prepare for a handover.

That is, the source gNB prepares for the inter-gNB Type 2 handover at step 3g-20 and requests to the target eNB, at step 3g-25, for adding an SeNB for dual connectivity via Xn signaling (inter-gNB control signaling, e.g., X2 signaling). The request message includes PDCP configuration information for a PDCP entity reserved per SCell to be added (no PDCP configuration is performed in requesting for adding SeNBs in the legacy LTE) and split bearer configuration information for the handover.

Upon receipt of the request message, the target gNB performs PDCP establishment and establishes RLC and MAC entities for a split bearer at step 3g-30 and transmits an SeNB addition response (SeNB ADDITION RESPONSE) message to the source gNB. The response message including the content of the received SeNB addition request message may be retransmitted at step 3g-35.

Upon receipt of the SeNB addition response message, the source gNB transmits an RRC Reconfiguration Request (rrcReconfigReq) message to the UE at step 3g-40. This message may include SCG configuration information of the target gNB, SRB and DRB split bearer configuration information, and RRC diversity configuration information.

If the UE receives the RRC diversity configuration information, PDCP SDUs are sent to the RLC entities for the PCell and PSCell in the UE until the RRC diversity configuration is deactivated. The uplink RRC diversity may be deactivated when the SRB is reconfigured from a split bearer to an MCG bearer or an explicit deactivation instruction is received via an RRC message (e.g., handover command message). At step 3g-45, the UE establishes S-MAC and S-RLC entities for the SeNB and reconfigures the MCG bearers, i.e., all SRBs and DRBs, into split bearers according to the received RRC message.

Next, the UE performs a random access procedure to the target gNB at step 3g-50 and performs uplink transmission/downlink transmission to/from source and target gNBs at steps 3g-55, 3g-60, 3g-65, and 3g-70. The UE is capable of establishing connections to the source and target gNBs simultaneously to perform data communication without any time interruption in Phase 1 as denoted by reference numbers 3g-15 to 3g-70.

After Phase 1, if the measurement value of the UE indicates, at step 3g-75, an event triggering a handover to the target gNB, the source gNB makes a handover determination (Phase 2) at step 3g-80. The measurement value may indicate an event where the signal strength from the source gNB decreases and the signal strength from the target gNB increases at the UE; it may be possible to reuse handover determinative LTE events or add new events.

If the source gNB requests to the target gNB for a Type 2 handover via Xn signaling at step 3g-85, the target gNB activates PDCP entities and links PDCP entities to corresponding RLC entities at step 3g-90. Next, the target gNB transmits a Type 2 handover response to the source gNB via Xn signaling at step 3g-95, and the source gNB transmits received PDCP SDUs to the target gNB via Xn signaling at step 3g-100.

The source eNB transmits a Type 2 handover command to the UE via an RRC message (RRCConnectionReconfiguration) at step 3g-105. This RRC message explicitly or implicitly includes a configuration indicative of switching roles between the PCell and the PSCell belonging to the source and target gNBs.

The UE performs the Type 2 handover to the PSCell of the target gNB at step 3g-110 and transmits an RRC message, i.e., Type 2 handover complete message, through the PSCell of the source gNB and the PCell of the target gNB at step 3g-115. During the Type 2 handover, the UE maintains the old Layer 1 communication, cancels configuration of PHR in Layer 2 (MAC), and adjusts locations of PHs in the PHR according to the change of the PCell and PSCell. In Layer 3, radio link monitoring (RLM) for determining radio link failure (RLF) is adjusted according to the change of the PCell and PSCell. That is, as the PCell (Cell1) is changed to the PSCell, a secondary RLM (sRLM) configuration condition is activated.

Likewise, the measurement value report is adjusted according to the change of the PCell and the SCell, and the index (ServCellIndex) of the serving cell is adjusted. That is, the serving cell index of Cell1 (old PCell) is changed from index 0 to index x, and the serving cell index of Cell3 (old PSCell) is changed from index y to index 0. The ServCellIndex of the old PCell may be configured according to one of the following methods.

Option 1: A SCellindex is explicitly transmitted via the Type 2 handover command message at step 3g-105 or the RRC connection reconfiguration message at step 3g-40.

Option 2: The SCellindex used by the new PCell (Cell2) is automatically allocated.

Next, the UE maintains uplink transmissions/downlink receptions to/from the source and target gNBs at steps 3g-120, 3g-125, 3g-130, and 3g-135. The UE is capable of switching roles between the PCell of the source gNB and the PSCell of the target gNB and establishing connections simultaneously to the two gNBs for data communication without any timer interruption in Phase 2 as denoted by reference numbers 3g-75 to 3g-135.

After Phase 2, if the measurement value of the UE indicates, at step 3g-140, an event indicative of releasing the connection to the source gNB, the target gNB determines to release the dual connectivity configured with the source gNB (Phase 3) at step 3g-145. The measurement value may indicate an event where the signal strength from the source gNB is less than a predetermined threshold value at the UE and inappropriate for communication; it may be possible to reuse LTE events or add new events.

The target gNB instructs the source gNB, at step 3g-150, to release the SCG via Xn signaling and notifies the UE of the SCG release at step 3g-155 via an RRC message. Afterward, the UE and the target gNB maintain the uplink/downlink communications at steps 3g-160 and 3g-165.

Figure 3H:
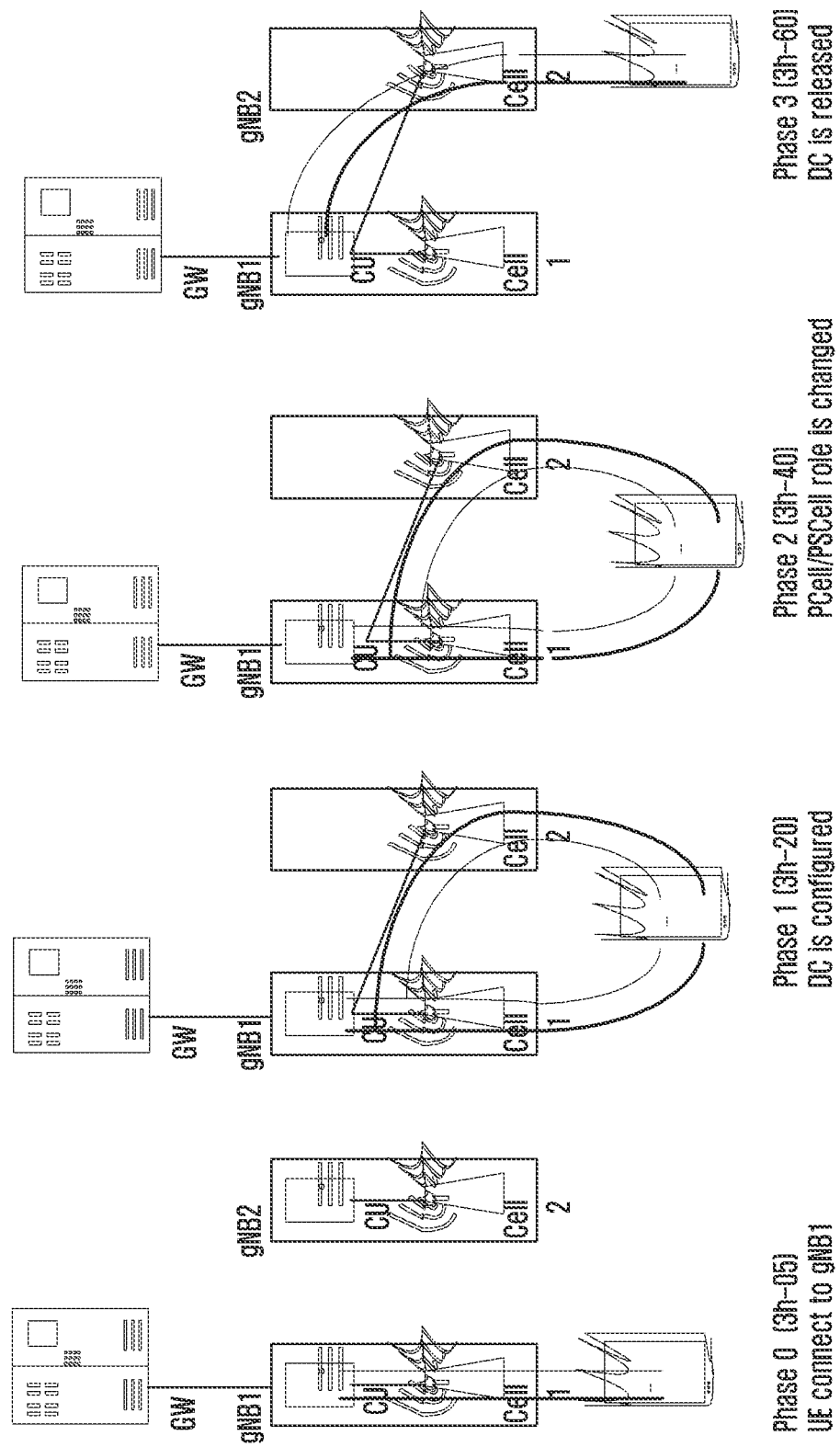
FIGS. 3HA and 3HB are schematic diagrams for explaining a DC- and RLC split bearer-based inter-gNB handover operation and a protocol structure according to embodiment 3-1 of the disclosure.
Figure 3H:
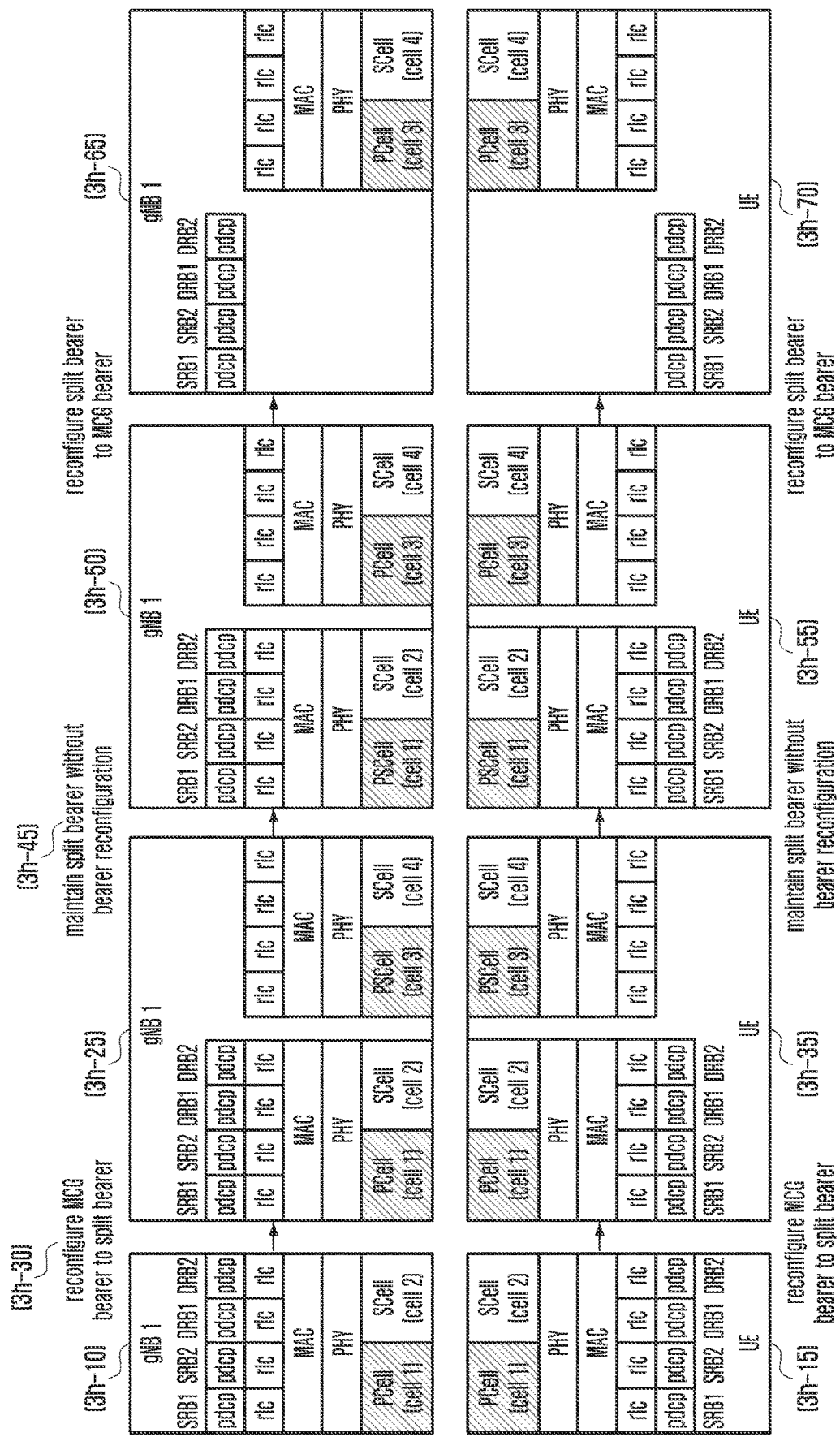
Figure 31A:
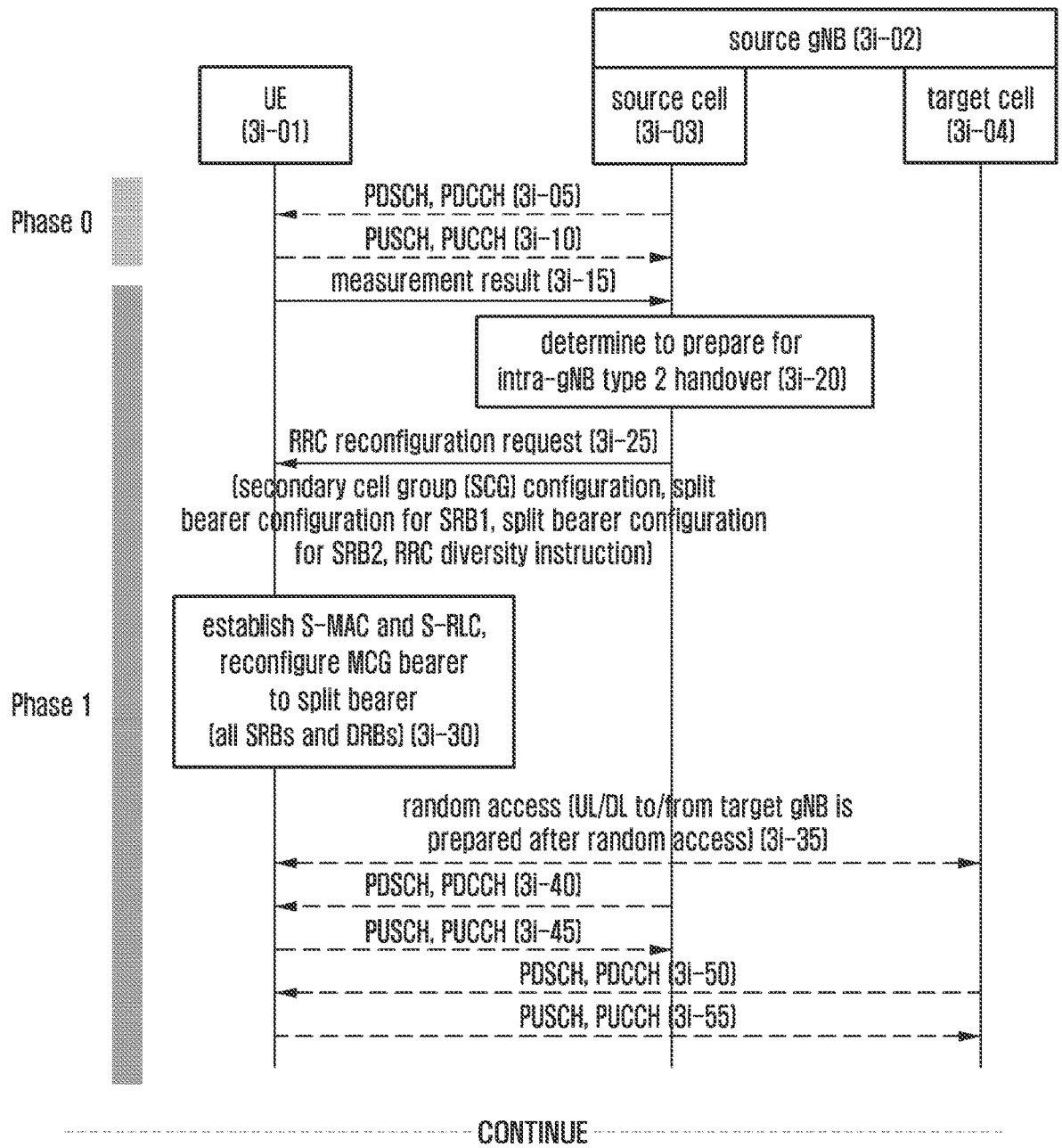

FIGS. 3HA and 3HB are schematic diagrams for explaining a DC- and RLC split bearer-based inter-gNB handover operation and a protocol structure according to embodiment 3-1 of the disclosure.

In Phase 0, a UE is connected to gNB 1 for basic data communication in the NR system as denoted by reference number 3h-05. In the disclosure, it is assumed that the gNB 1 hosts a PCell and an SCell for convenience of explanation. In this phase, the gNB 1 configures an MCG bearer for data communication only through a serving cell of an MeNB, and each PDCP entity is connected to one RLC, which is connected to a MAC entity via a logical channel as denoted by reference number 3h-10. The UE configures PDCP, RLC, and MAC according to the bearer configuration with the gNB 1 and receives a control signal and data through the PCell (Cell1). The UE also transmits HARQ feedback, scheduling requests, and CSI through the PCell (Cell1) and performs data communication through the SCell (Cell2). The SCell transitions between an activated state and a deactivated state repeatedly under the control of the gNB 1 as denoted by reference number 3h-15.

If the gNB 1 makes a dual connectivity determination for a handover upon fulfilment of a predetermined condition, dual connectivity is configured in Phase 1 as denoted by reference number 3h-20. In this phase, the handover is determined to be made to the target cell belonging to the gNB 1. Next, the source cell (MCG) of the gNB 1 establishes dual connectivity with a target cell (SCG) including a PSCell (Cell3) as an additional PUCCH serving cell and an SCell (Cell4) and reconfigures the old MCG bearer into a split bearer at steps 3h-25 and 3h-30. This means that the source cell PDCP entities of the gNB 1 are split to establish links to the RLC entities for the source and target cells. In this phase, PDCP reordering is not performed in the target cell because there is no need of any PDCP reordering operations for a handover between the cells belonging to the same gNB.

As the dual connectivity is established, the UE establishes additional RLC entities and resets a new MAC entity while maintaining the old PDCP reordering operations for SRB and DRB and RLC and MAC configurations for the source cell as denoted by reference number 3h-35.

If the gNB 1 detects an event triggering a handover from a measurement report value of the UE, e.g., if a signal strength from the target cell is greater than the signal strength from the source cell over a predetermined threshold value, this leads to Phase 2 in which the roles are switched between the PCell and the PSCell as denoted by reference number 3h-40. In this phase, the roles are switched between the PCell and the PSCell with no change of the old bearer configuration, and the S1-U connection to the old gNB 1 is also maintained as denoted by reference numbers 3h-45 and 3h-50.

As in the gNB, in the UE the roles are switched between the PCell and the PSCell while maintaining the old protocol configurations, which leads to canceling of a previous configuration of a PHR and adjusting locations of PHs in the PHR as denoted by reference number 3h-55.

If the gNB 1 detects an event triggering dual connectivity release of the source cell from a measurement report value of the UE, e.g., if the signal strength from the source cell becomes equal to or less than a predetermined threshold value, this leads to Phase 3 in which the dual connectivity is released as denoted by reference number 3h-60.

In this phase, the split bearer is reconfigured into an MCB bearer and the bearer configuration for the source cell is released as denoted by reference number 3h-65; an SCG release request signal is transmitted to the UE. Likewise, the UE releases the RLC and MAC as denoted by reference number 3h-70 and performs data communication with the newly configured target cell.

Figure 3I:
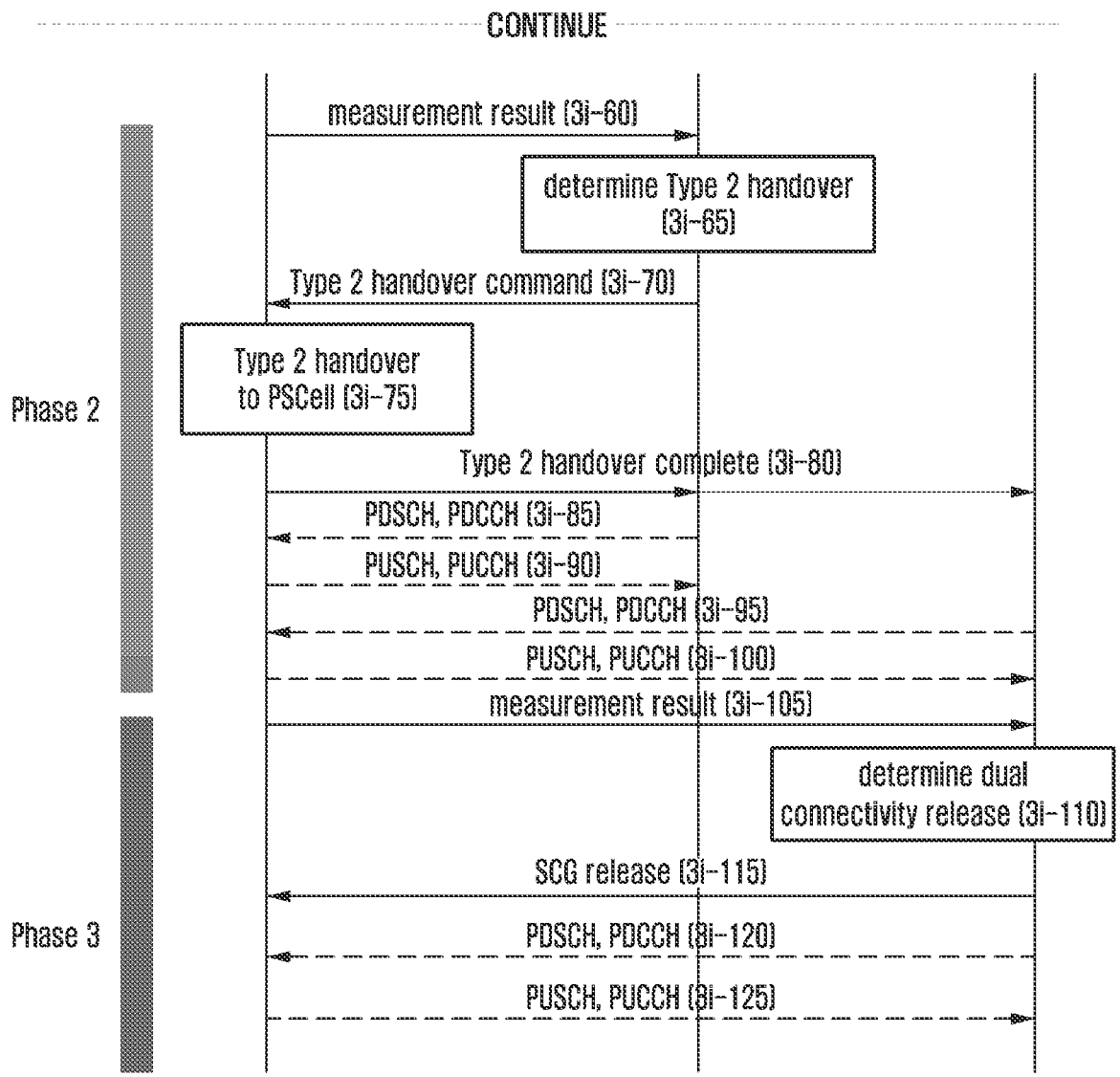
FIGS. 3IA and 3IB are signal flow diagrams illustrating a DC- and RLC split bearer-based handover procedure according to embodiment 3-2 of the disclosure.

FIGS. 3IA and 3IB are signal flow diagrams illustrating a DC- and RLC split bearer-based handover procedure according to embodiment 3-2 of the disclosure.

A description is made of the per-phase signal flows in the DC- and RLC split bearer-based inter-gNB handover procedure in detail with reference to FIGS. 3IA and 3IB.

It is assumed that the UE 3i-01 in the state of being connected to a source cell 3i-03 of a source gNB 3i-02 receives a downlink control signal (PDCCH) and data (PDSCH) at step 3i-05 and transmits an uplink control signal (PUCCH) and data (PUSCH) at step 3i-10 in Phase 0. In this phase, it may be possible to receive the downlink control signal and transmit the uplink control signal through the PCell of the source gNB and perform further data transmission/reception through an SCell under the control of the gNB.

The UE measures neighboring cells periodically or as configured by the gNB and, if a predetermined condition is fulfilled, it transmits to the corresponding source cell, at step 3i-15, a measurement value indicating the necessity of dual connectivity for a handover, which leads to Phase 1. The measurement value may indicate an event where the signal strength from the source cell decreases and the signal strength from the target cell increases at the UE; upon receipt of the measurement value, the source cell may recognize UE mobility and prepare for an intra-gNB handover.

That is, the source cell prepares for the intra-gNB Type 2 handover at step 3*i*-20 and establishes a split bearer for performing the handover to the target cell. If a dual connectivity preparation step is completed, the source cell transmits an rrcReconfigReq message to the UE at step 3*i*-25. This message may include CSG configuration information of the target cell, SRB and DRB split bearer configuration information, and RRC diversity configuration information.

If the UE receives the RRC diversity configuration information, PDCP SDUs are sent to the RLC entities for the PCell and PSCell in the UE until the RRC diversity configuration is deactivated. The uplink RRC diversity may be deactivated when the SRB is reconfigured from a split bearer to an MCG bearer or an explicit deactivation instruction is received via an RRC message (e.g., handover command message).

At step 3*i*-30, the UE establishes S-MAC and S-RLC entities for the SCG and reconfigures the MCG bearers, i.e., all SRBs and DRBs, into split bearers according to the received RRC message. Next, the UE performs a random access procedure to the target gNB at step 3*i*-35 and performs uplink transmission/downlink transmission to/from source and target gNBs at steps 3*i*-40, 3*i*-45, 3*i*-50, and 3*i*-55. The UE is capable of establishing connections to the source and target gNBs simultaneously to perform data communication without any time interruption in Phase 1 as denoted by reference numbers 3*i*-15 to 3*i*-55.

After Phase 1, if the measurement value of the UE indicates, at step 3*i*-60, an event triggering a handover to the target cell, the source cell makes an handover determination (Phase 2) at step 3*i*-65. The measurement value may indicate an event where the signal strength from the source cell decreases and the signal strength from the target cell increases at the UE; it may be possible to reuse handover determinative LTE events or add new events.

If the source cell receives the above message, it performs an operation for switching roles between the PCell and the PSCell. The source cell transmits a Type 2 handover command to the UE via an RRC message (RRCConnectionReconfiguration) at step 3*i*-70. This RRC message explicitly or implicitly includes a configuration indicative of switching roles between the source cell and the PCell and the PSCell belonging to the target gNB.

The UE performs the Type 2 handover to the PSCell of the target cell at step 3*i*-75 and transmits an RRC message, i.e., Type 2 handover complete message, to the PSCell of the source cell and the PCell of the target cell at step 3*i*-80. During the Type 2 handover, the UE maintains the old Layer 1 communication, cancels a configuration of PHR in Layer 2 (MAC), and adjusts locations of PHs in the PHR according to the change of the PCell and PSCell. In Layer 3, radio link monitoring (RLM) for determining radio link failure (RLF) is adjusted according to the change of the PCell and PSCell. That is, as the PCell (Cell1) is changed to the PSCell, a secondary RLM (sRLM) configuration condition is activated.

Likewise, the measurement value report is adjusted according to the change of the PCell and the SCell, and the index (ServCellIndex) of the serving cell is adjusted. That is, the serving cell index of Cell1 (old PCell) is changed from index 0 to index x, and the serving cell index of Cell3 (old PSCell) is changed from index y to index 0. The ServCellIndex of the old PCell may be configured according to one of the following methods.

Option 1: A SCellIndex is explicitly transmitted via the Type 2 handover command message at step 3*i*-70 or the RRC connection reconfiguration message at step 3*i*-25.

Option 2: The SCellIndex used by the new PCell (Cell2) is automatically allocated.

Next, the UE maintains uplink transmissions/downlink receptions to/from the source and target gNBs at steps 3*i*-85, 3*i*-90, 3*i*-95, and 3*i*-100. The UE is capable of switching roles between the PCell of the source gNB and the PSCell of the target gNB and establishing connections simultaneously to the two gNBs for data communication without any timer interruption in Phase 2 as denoted by reference numbers 3*i*-75 to 3*i*-135.

After Phase 2, if the measurement value of the UE indicates, at step 3*i*-105, an event indicative of releasing the source cell, the target cell determines to release the dual connectivity configured with the source cell (Phase 3) at step 3*i*-110. The measurement value may indicate an event where the signal strength from the source gNB is less than a predetermined threshold value at the UE and inappropriate for communication; it may be possible to reuse LTE events or add new events.

The source gNB reconfigures the split bearer into an MCG bearer, releases the bearer configuration (MAC and RLC) for the source cell, and notifies the UE of the SCG release via an RRC message at step 115. Afterward, the UE and the target cell maintain uplink transmission/downlink reception at steps 3*i*-120 and 3*i*-125.

FIG. 3J is a flowchart illustrating a DC- and RLC split bearer-based Type 2 handover procedure of a UE according to an embodiment of the disclosure.

If the UE in uplink/downlink data communication with a gNB through a source cell at step 3*j*-01 (this state is referred to as Phase 0) detects a change in a measurement value at step 3*j*-05 as it moves, it reports the measurement value indicative of a type of the event to a gNB. The current state of the UE and the measurement determines a subsequent operation.

The disclosure proposes a DC- and RLC split bearer-based handover method for zeroing time interruption. If the UE operating in Phase 0 detects a measurement value corresponding to Phase 1, it transmits the measurement value to a gNB at step 3*j*-10.

The UE receives dual connectivity configuration information, at step 3*j*-15, from the gNB, which determines a necessity of dual connectivity and transmits the dual connectivity configuration information and configures a split bearer for dual connectivity at step 3*j*-20. The split bearer configuration is applied to all SRBs and DRBs, and the UE establishes S-MAC and S-RLC entities according to an SCG configuration (SCG-Config). Next, the UE performs dual connectivity uplink/downlink data communication at step 3*j*-25.

While operating in Phase 1, if the UE detects an event indicative of a necessity of a handover to a target cell, i.e., an event triggering Phase 2, at step 3*j*-05, it transmits the measurement value indicative of a type of the event to the gNB at step 3*j*-10.

Next, the UE receives, at step 3*j*-30, an RRC message instructing a Type 2 handover to a target cell from the gNB and changes the roles and configurations of the PCell and PSCell at step 3*j*-35. During the Type 2 handover, the UE maintains the old Layer 1 communication, cancels an old configuration of PHR in Layer 2 (MAC), and adjusts locations of PHs in the PHR according to the change of the PCell and PSCell. In Layer 3, the RLM for determining RLF is adjusted according to the change of the PCell and PSCell. That is, as the PCell (Cell1) is changed to the PSCell, an sRLM configuration condition is activated.

Likewise, the measurement value report is adjusted according to the change of the PCell and PSCell, and the ServCellIndex is adjusted too. After switching the roles between the PCell and PSCell, the UE performs dual connectivity uplink/downlink data communication at step 3j-40.

While operating in Phase 1, if the UE detects an event indicative of a necessity of releasing the source cell, i.e., an event triggering Phase 3, at step 3j-05, it transmits the measurement value indicative of a type of the event to the gNB at step 3j-10.

Next, the UE receives, at step 3j-45, an RRC message instructing release of the SCG bearer of the source cell from the gNB and releases the SCG bearer-related MAC and RLC at step 3j-50. Afterward, the UE performs uplink/downlink data communication through the target cell at step 3j-55.

The UE operation varies according to the cell to which the UE belongs. In the disclosure, the descriptions are made of the Type 2 handover procedures in association with 4 cells with reference to FIGS. 3FA, 3FB, 3HA, and 3HB. Tables 2a and 2b summarize operations of a UE before and after receiving a Type 2 handover command. It is preferable to understand that the contents of Tables 2a and 2b are associated with each other.

TABLE 2a

|  | Cell 1 | Cell 3 | Cell 2, 4 |
|---|---|---|---|
| Before receipt of Type 2 handover command | PCell | PSCell | SCell |
| After receipt of Type 2 handover command | PSCell | PCell | SCell |
| Layer 1 (Cell group) | UE continues performing current operation in this cell: i.e., PUCCH/PUSCH tx PDCCH/PDSCH rx | UE continues performing current operation in this cell: i.e., PUCCH/PUSCH tx PDCCH/PDSCH rx | UE continues performing current operation in this cell: i.e., PUSCH tx (if uplink is configured) PDCCH/PDSCH rx |

TABLE 2b

| Layer 2 (MAC) | Cancel triggered PHR and change locations of PHs in PHR (move Type 2 PH from first octet to third octet and Type 1 PH from second octet to fourth octet in PHR MAC CE. For reference, $0^{th}$ octet indicates SCell index of MAC CE) | Cancel triggered PHR and change locations of PHs in PHR (move Type 2 PH from third octet to first octet and Type 1 PH from fourth octet to second octet in PHR MAC CE. For reference, $0^{th}$ octet indicates SCell index of MAC CE) | Continue performing current operation |

TABLE 2b-continued

| Layer 3 (RRC) | Continue RLM operation using parameter for sRLM (if RLF is detected, trigger sRLF-related operations). Stop monitoring for paging. Start considering measurement result of this serving cell as measurement result of PSCell. Update ServCellIndex from 0 to x*. | Continue RLM operation using parameter for sRLM (if RLF is detected, trigger sRLF-related operations). Start monitoring for paging. Start considering measurement result of this serving cell as measurement result of PCell. Update ServCellIndex from y to 0**. | Continue performing current operation |

In the above Layer 3 operation, ServCellIndex of the old PCell is configured according to one of the two methods as follows.

Option 1: The SCellIndex is explicitly transmitted via a Type 2 handover command or RRC connection reconfiguration.

Option 2: The SCellIndex used in the new PCell (Cell2) is automatically assigned.

The bearer management method is changed according to the change of Phase in the UE. In the disclosure, an MCG bearer and a split bearer are configured according to Phase because a dual connectivity-based handover is performed. Table 3 summarizes SRB, DRBo and MAC management according to Phase transition.

TABLE 3

|  |  | Phase 0→Phase 1 DC is configured | Phase 1→Phase 2 Type 2 handover | Phase 2→Phase 3 DC is released |
|---|---|---|---|---|
| SRB | PDCP | Continue PDCP reordering operation. | Continue PDCP reordering operation. | Continue PDCP reordering operation. Trigger PDCP status report. |
|  | RLC | Configure additional RLC (RLC B) Maintain RLC (RLC A) continuously. | Maintain RLC A and RLC B continuously. | Maintain RLC B and release RLC A. |
| DRB | PDCP | Identical with SRB | Identical with SRB | Identical with SRB |
|  | RLC | Identical with SRB | Identical with SRB | Identical with SRB |
|  | MAC | Maintain MAC A continuously. Reset new MAC (MAC B) | Reconfigure MAC A** Reconfigure MAC B** | Maintain MAC B Release MAC A |

Here, it is assumed that the PDCP reordering operation is always possible for the SRB and that the MAC reconfiguration follows the MAC configuration in Table 2.

The above UE operation is applicable to the inter-gNB and inter-gNB Type 2 handovers in the same manner, and the UE characteristics may be summarized in comparison with the Type 1 handover in the disclosure. Table 4 summarizes the legacy LTE Type 1 handover and the DC- and RLC split bearer-based Type 2 handover proposed in the disclosure in a manner of a comparison.

TABLE 4

|  | Type 1 HO | Type HO |
|---|---|---|
| Radio interface-based pre-phase | No | Add secondary cell group (SCG) |
| Radio interface-base post-phase | No | Release secondary cell group (SCG) |
| RRC message triggering | Type 1 handover command e.g., rcConnectionReconfiguration (target cell ID, target frequency, C-RNTI) including mobilityControlInfo | Type 2 handover command e.g., rrcConnectionReconfiguration indicating Type 2 handover |
| Target cell identifier and absolute radio-frequency channel number (ARFCN) of target frequency | Included in mobilityControlInfo of HO command message | Included in mobilityControlInfoSCG included in SCG addition message in previous phase |
| L1 | Stop L1 operation using source Start L1 operation using target | Maintain L1 operation using source and target |
| SCell | Deactivate SCell upon Type 1 HO command | Maintain SCell status upon Type 2 HO command |

Figure 3K:
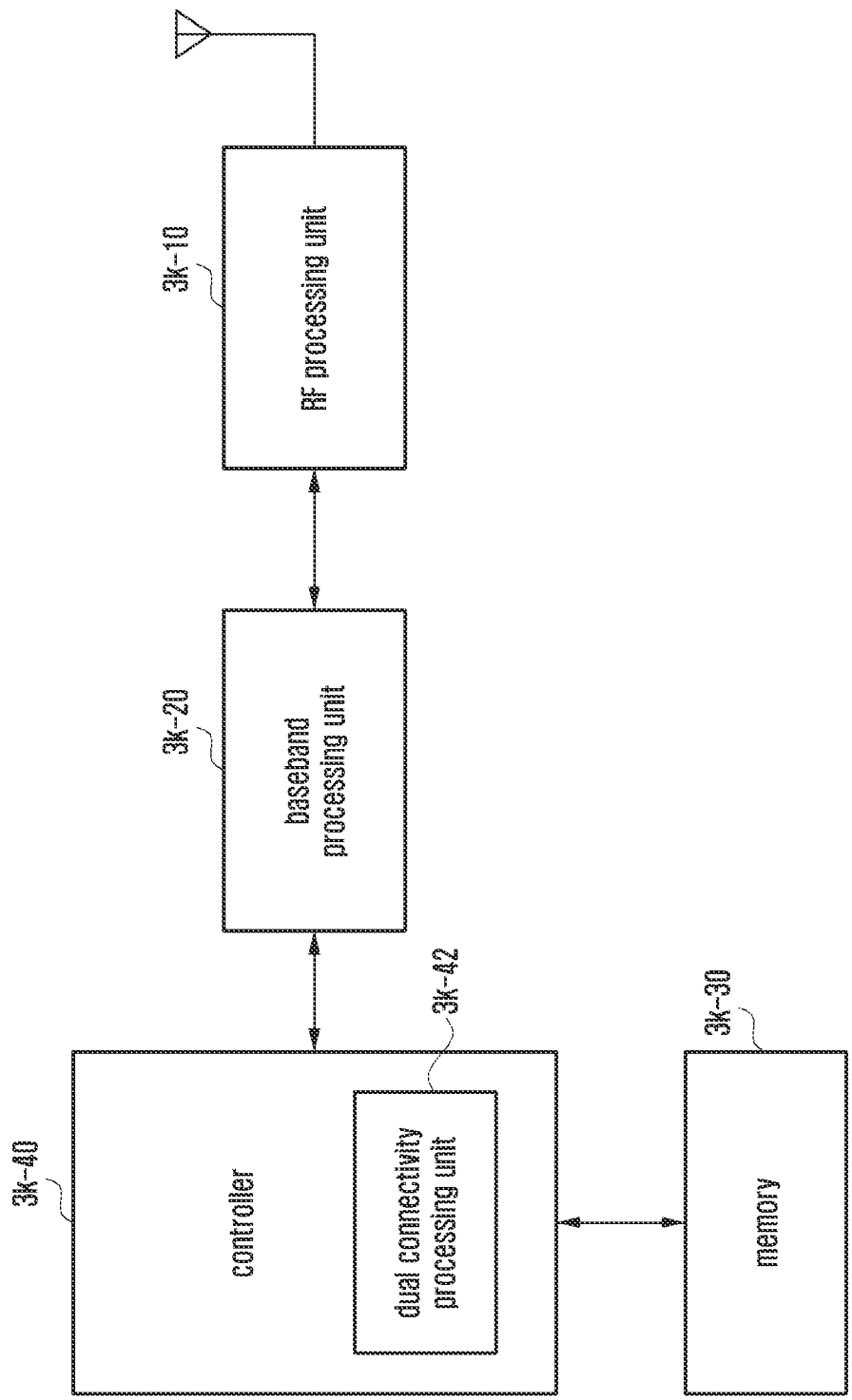
FIG. 3k is a block diagram illustrating a configuration of a UE according to an embodiment of the disclosure.

FIG. 3k is a block diagram illustrating a configuration of a UE according to an embodiment of the disclosure.

In reference to FIG. 3K, the UE includes a radio frequency (RF) processing unit 3k-10, a baseband processing unit 3k-20, a memory 3k-30, and a controller 3k-40.

The RF processing unit 3k-10 takes charge of signal band conversion and amplification for transmitting signals over a radio channel. That is, the RF processing unit 3k-10 up-converts a baseband signal output from the baseband processing unit 3k-20 to an RF band signal for transmission through antennas and down-converts an RF band signal received through the antenna to a baseband signal.

For example, the RF processing unit 3k-10 may include a transmission filter, a reception filter, an amplifier, a mixer, an oscillator, a digital-to-analog converter (DAC), and an analog-to-digital convertor (ADC). Although one antenna is depicted in the drawing, the terminal may include a plurality of antennas. The RF processing unit 3k-10 may include a plurality of RF chains. The RF processing unit 3k-10 may perform beamforming. For beamforming, the RF processing unit 3k-10 may adjust the phases and sizes of the signal transmitted/received through the antennas or antenna elements. The RF processing unit 3k-10 may perform a MIMO operation to receive a signal on multiple layers.

The baseband processing unit 3k-20 takes charge of conversion between baseband signals and bit strings according to a physical layer protocol of the system. For example, the baseband processing unit 3k-20 performs encoding and modulation on the transmit bit strings to generate complex symbols in data transmission mode. The baseband processing unit 3k-20 also performs demodulation and decoding on the baseband signal from the RF processing unit 3k-10 to recover the received bit strings in data reception mode.

For the case of an orthogonal frequency division multiplexing (OFDM) system, the baseband processing unit 3k-20 performs encoding and modulation on the transmit bit strings to generate complex symbols, maps the complex symbols to subcarriers, performs inverse fast Fourier transform (IFFT) on the subcarriers, and inserts a cyclic prefix (CP) to generate OFDM symbols in the data transmission mode. The baseband processing unit 3k-20 splits the baseband signal from the RF processing unit 3k-10 into OFDM symbols, recovers the signals mapped to the subcarriers through fast Fourier transform (FFT), and performs demodulation and decoding to recover the bit strings in the data reception mode.

The baseband processing unit 3k-20 and the RF processing unit 3k-10 take charge of transmitting and receiving signals as described above. Accordingly, the baseband processing unit 3k-20 and the RF processing unit 3k-10 may be referred to as a transmission unit, a reception unit, a transceiver, or a communication unit. At least one of the baseband processing unit 3k-20 and the RF processing unit 3k-10 may include a plurality of communication modules for supporting different radio access technologies. At least one of the baseband processing unit 3k-20 and the RF processing unit 3k-10 may include a plurality of communication modules for processing different frequency bands signals. Examples of the radio access technologies include WLAN (e.g., IEEE 802.11) and cellular network (e.g., LTE). Examples of the different frequency bands may include super high frequency (SHF) band (e.g., 2.5 GHz and 5 GHz) and millimeter wave (mmWave) bands (e.g., 60 GHz).

The memory 3k-30 stores basic programs for operation of the terminal, application programs, and data such as configuration information. In particular, the memory 3k-30 may store information related to a second access node that performs radio communication using a second radio access technology. The memory 3k-30 provides the stored data in response to a request from the controller 3k-40.

The controller 3k-40 controls overall operations of the terminal. For example, the controller 3k-40 controls the baseband processing unit 3k-20 and the RF processing unit 3k-10 to transmit/receive signals. The controller 3k-40 also writes and reads data to and from the memory 3k-30. In order to accomplish this, the controller 3k-40 may include at least one processor. For example, the controller 3k-40 may include a communication processor (CP) for controlling communication and an application processor (AP) for providing higher layer processing, e.g., application layer protocol processing.

Figure 3L:
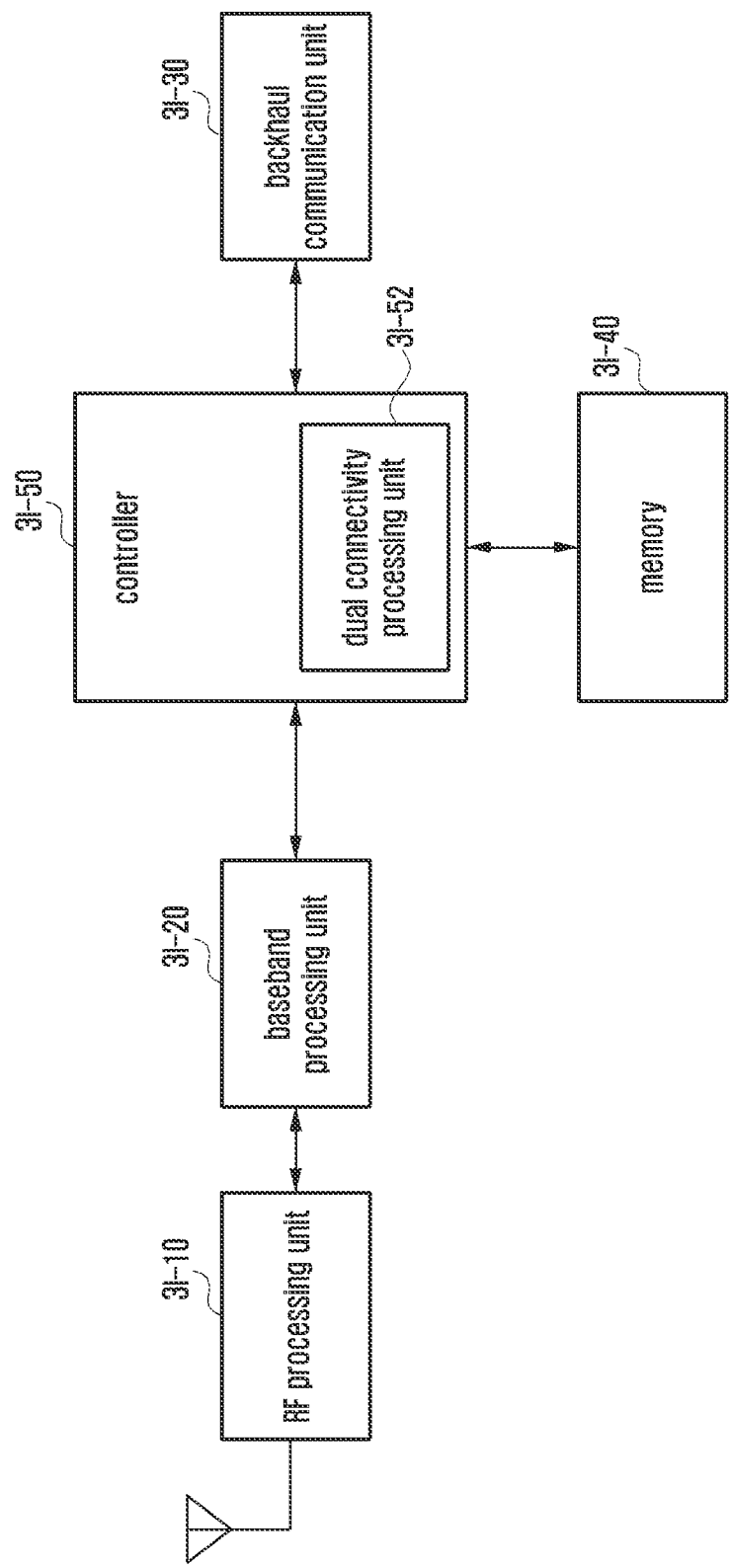
FIG. 3L is a block diagram illustrating a configuration of an NR gNB according to an embodiment of the disclosure.

FIG. 3L is a block diagram illustrating a configuration of an NR gNB according to an embodiment of the disclosure.

As shown in the drawing, the NR gNB includes an RF processing unit 3l-10, a baseband processing unit 3l-20, a backhaul communication unit 3l-30, a memory 3l-40, and a controller 3l-50.

The RF processing unit 3*l*-10 takes charge of signal band conversion and amplification for transmitting signals over a radio channel. That is, the RF processing unit 3*l*-10 up-converts a baseband signal output from the baseband processing unit 3*l*-20 to an RF band signal for transmission through antennas and down-converts an RF band signal received through the antennas to a baseband signal.

For example, the RF processing unit 3*l*-10 may include a transmission filter, a reception filter, an amplifier, a mixer, an oscillator, a DAC, and an ADC. Although one antenna is depicted in FIG. 3*l*, the NR gNB may include a plurality of antennas. The RF processing unit 3*l*-10 may include a plurality of RF chains. The RF processing unit 3*l*-10 may perform beamforming. For beamforming, the RF processing unit 3*l*-10 may adjust the phases and sizes of the signal transmitted/received through the antennas or antenna elements. The RF processing unit 3*l*-10 may perform a downlink MIMO operation to transmit a signal on multiple layers.

The baseband processing unit 3*l*-20 takes charge of converting between baseband signals and bit strings according to a physical layer protocol of a first radio access technology. For example, the baseband processing unit 3*l*-20 performs encoding and modulation on the transmit bit strings to generate complex symbols in data transmission mode. The baseband processing unit 3*l*-20 also performs demodulation and decoding on baseband signals from the RF processing unit 3*l*-10 to recover the received bit strings in data reception mode.

For the case of an OFDM system, the baseband processing unit 3*l*-20 performs encoding and modulation on the transmit bit string to generate complex symbols, maps the complex symbols to subcarriers, performs IFFT on the subcarriers, and inserts a CP to generate OFDM symbols in the data transmission mode. The baseband processing unit 3*l*-20 splits baseband signals from the RF processing unit 3*l*-10 into OFDM symbols, recovers the signals mapped to the subcarriers through FFT, and performs demodulation and decoding to recover the bit strings in the data reception mode. The baseband processing unit 3*l*-20 and the RF processing unit 3*l*-10 take charge of transmitting and receiving signals as described above. Accordingly, the baseband processing unit 3*l*-20 and the RF processing unit 3*l*-10 may be referred to as a transmission unit, a reception unit, a transceiver, or a communication unit.

The backhaul communication unit 3*l*-30 provides an interface for communication with other network nodes. That is, the backhaul communication unit 3*l*-30 converts a bit string transmitted from an NR gNB to another node, e.g., secondary base station and core network, to a physical signal and converts a physical signal received from another node to a bit string.

The memory 3*l*-40 stores basic programs for operation of the NR gNB, application programs, and data such as configuration information. In particular, the memory 3*l*-40 may store the information on the bearers allocated to the connected terminal and a measurement result reported by the terminal. The memory 3*l*-40 may also store the information as criteria for determining whether to enable or disable multi-connectivity for the terminal. The memory 3*l*-40 provides the stored data in response to a request from the controller 3*l*-50.

The controller 3*l*-50 may control overall operations of the NR gNB. For example, the controller 3*l*-50 controls the baseband processing unit 3*l*-20, the RF processing unit 3*l*-10, and the backhaul communication unit 3*l*-30 for transmitting/receiving signals. The controller 3*l*-50 also writes and reads data to and from the memory 3*l*-40. In order to accomplish this, the controller 3*l*-50 may include at least one processor.

An embodiment of the disclosure may include the following characteristics.

1. Characteristics of UE performing Type 2 handover
    Method for handover to a serving cell satisfying a predetermined condition among preconfigured serving cells.
    A method for configuring a bearer differently according to handover phase
    Configure split bearers for all SRBs and DRBs except for SRB 0 and provide target cell information, target frequency information, random access parameter information, etc. in preparation phase
    UE operation in Type 2 HO execution phase (method for changing roles between PCell and PSCell)
    Change locations of PCell and PSCell in PHR in UE MAC operation
    Change parameter for RLM in UE RRC operation
    Update serving cell index value for measurement report in UE RRC operation
    Method for performing data recovery in wrap-up phase
2. Difference between Type 2 handover and Type 1 handover
    Presence/Absence of pre-step (adding SCG) before handover
    Presence/Absence of post-step (releasing SCG) after handover
    Method for commanding Type 2 handover via RRC connection reconfiguration
    Method for transmitting target cell ID and frequency information via SCG addition message
    Method for performing L1 transmission continuously through source and target cells
    Method for maintaining SCell status continuously when receiving Type 2 handover command
3. RRC diversity execution and stop operation in Type 2 handover
    Method for deactivating RRC diversity when split bearer is reconfigured into MCG bearer
    Method for deactivating RRC diversity when being explicitly indicated via RRC message (e.g., handover command message.

In the embodiments of the disclosure, the components are described in singular or plural forms depending on the embodiment. However, the singular and plural forms are selected appropriately for the proposed situation just for explanatory convenience without any intention of limiting the disclosure thereto; thus, the singular form includes the plural forms as well, unless the context clearly indicates otherwise.

Although the description has been made with reference to particular embodiments, the disclosure can be implemented with various modifications without departing from the scope of the present invention. Thus, the disclosure is not limited to the particular embodiments disclosed, and it will include the following claims and their equivalents.

The invention claimed is:

1. A method performed by a base station in a wireless communication system, the method comprising:
    transmitting, to a terminal, a message for configuring a data radio bearer (DRB), the message including first information configuring a transmission when two radio link control (RLC) entities are associated with a protocol data convergence protocol (PDCP) entity for the DRB, wherein the message further includes second information associated with a primary RLC entity of the two RLC entities, third information on a threshold associated with an amount of data, and fourth information indicating a predetermined ratio for a split bearer, and wherein the two RLC entities configured by the first information belong to different cell groups; and receiving, from the terminal, data packets including PDCP protocol data units (PDUs), wherein, in case that an amount of the data packets is greater than the threshold, first data packets among the data packets are transmitted via a first RLC entity of the two RLC entities of the terminal and second data packets among the data packets are transmitted via a second RLC entity of the two RLC entities of the terminal, based on the fourth information, and wherein, in case that the threshold is set to infinity based on the third information, the data packets are transmitted via the primary RLC entity of the terminal.

2. The method of claim 1, wherein the different cell groups include a master cell group and a secondary cell group for a split bearer.

3. The method of claim 2,
wherein a radio access technology (RAT) of the master cell group is different from a RAT of the secondary cell group, and
wherein the message is a radio resource control (RRC) message.

4. The method of claim 1, wherein the second information indicates a cell group of the primary RLC entity.

5. A method performed by a terminal in a wireless communication system, the method comprising:
receiving, from a base station, a message for configuring a data radio bearer (DRB), the message including first information configuring a transmission when two radio link control (RLC) entities are associated with a protocol data convergence protocol (PDCP) entity for the DRB, wherein the message further includes second information associated with a primary RLC entity of the two RLC entities, third information on a threshold associated with an amount of data, and fourth information indicating a predetermined ratio for a split bearer, and wherein the two RLC entities configured by the first information belong to different cell groups;
identifying an amount of data packets for the two RLC entities, based on the split bearer being configured for the DRB, the data packets including PDCP protocol data units (PDUs);
in case that the amount of the data packets is greater than the threshold, allocating first data packets among the data packets to a first RLC entity of the two RLC entities and second data packets among the data packets to a second RLC entity of the two RLC entities; and
transmitting, to the base station, the first data packets via the first RLC entity and the second data packets via the second RLC entity,
wherein, in case that the threshold is set to infinity based on the third information, the data packets are transmitted via the primary RLC entity determined based on the second information.

6. The method of claim 5, wherein the different cell groups include a master cell group and a secondary cell group for a split bearer.

7. The method of claim 6,
wherein a radio access technology (RAT) of the master cell group is different from a RAT of the secondary cell group, and
wherein the message is a radio resource control (RRC) message.

8. The method of claim 5, wherein the second information indicates a cell group of the primary RLC entity.

9. A base station in a wireless communication system, the base station comprising:
a transceiver; and
a controller configured to:
transmit, via the transceiver to a terminal, a message for configuring a data radio bearer (DRB), the message including first information configuring a transmission when two radio link control (RLC) entities are associated with a protocol data convergence protocol (PDCP) entity for the DRB, wherein the message further includes second information associated with a primary RLC entity of the two RLC entities, third information on a threshold associated with an amount of data, and fourth information indicating a predetermined ratio for a split bearer, and wherein the two RLC entities configured by the first information belong to different cell groups, and
receive, via the transceiver from the terminal, data packets including PDCP protocol data units (PDUs),
wherein, in case that an amount of the data packets is greater than the threshold, first data packets among the data packets are transmitted via a first RLC entity of the two RLC entities of the terminal and second data packets among the data packets are transmitted via a second RLC entity of the two RLC entities of the terminal, based on the fourth information, and
wherein, in case that the threshold is set to infinity based on the third information, the data packets are transmitted via the primary RLC entity of the terminal.

10. The base station of claim 9, wherein the different cell groups include a master cell group and a secondary cell group for a split bearer.

11. The base station of claim 10,
wherein a radio access technology (RAT) of the master cell group is different from a RAT of the secondary cell group, and
wherein the message is a radio resource control (RRC) message.

12. The base station of claim 9, wherein the second information indicates a cell group of the primary RLC entity.

13. A terminal in a wireless communication system, comprising:
a transceiver; and
a controller configured to:
receive, via the transceiver from a base station, a message for configuring a data radio bearer (DRB), the message including first information configuring a transmission when two radio link control (RLC) entities are associated with a protocol data convergence protocol (PDCP) entity for the DRB, wherein the message further includes second information associated with a primary RLC entity of the two RLC entities, third information on a threshold associated with an amount of data, and fourth information indicating a predetermined ratio for a split bearer, and wherein the two RLC entities configured by the first information belong to different cell groups,
identify an amount of data packets for the two RLC entities, based on the split bearer being configured for the DRB, the data packets including PDCP protocol data units (PDUs), in case that the amount of the data packets is greater than the threshold, allocate first data packets among the data packets to a first RLC entity of the two RLC entities and second data packets among the data packets to a second RLC entity of the two RLC entities, and transmit, via the transceiver to the base station, the first data packets via the first RLC entity and the second data packets via the second RLC entity, wherein, in case that the threshold is set to infinity based on the third information, the data packets are transmitted via the primary RLC entity determined based on the second information.

14. The terminal of claim 13, wherein the different cell groups include a master cell group and a secondary cell group for a split bearer.

15. The terminal of claim 14, wherein a radio access technology (RAT) of the master cell group is different from a RAT of the secondary cell group, and wherein the message is a radio resource control (RRC) message.

16. The terminal of claim 13, wherein the second information indicates a cell group of the primary RLC entity.

* * * * *